United States Patent [19]
Ball et al.

[11] Patent Number: 5,155,955
[45] Date of Patent: Oct. 20, 1992

[54] FRAME BASED OFFICE SPACE DIVIDING SYSTEM

[75] Inventors: Douglas C. Ball, Quebec, Canada; Sherman M. Robbins, Strongsville, Ohio; Michel J. Fischer; Leon Goldik, both of Quebec; Donald J. Staufenberg, North Ridgeville, Ohio; Roland A. Mentessi, North Royalton, Ohio; George E. Sherbourne, Southington Township, Trumbull County, Ohio; Jeffrey M. Gioitta, South Euclid, Ohio; Eric J. Armstrong, Spinnertown; James B. Eldon, III, Barto, both of Pa.; Richard L. Raith, Solon, Ohio

[73] Assignee: Westinghouse Electric Corp., Pittsburgh, Pa.

[21] Appl. No.: 519,513

[22] Filed: May 2, 1990
(Under 37 CFR 1.47)

[51] Int. Cl.5 .............................. E04B 2/82
[52] U.S. Cl. .................... 52/126.4; 52/239; 52/241
[58] Field of Search .................. 52/238-241, 52/126.4

[56] References Cited

U.S. PATENT DOCUMENTS

| | | | |
|---|---|---|---|
| 4,123,879 | 11/1978 | Blodee | 52/511 |
| 4,391,073 | 7/1983 | Mollenkopf | 52/126.4 |
| 4,443,911 | 4/1984 | Bannister | 52/239 |
| 4,535,577 | 8/1985 | Tenser | 52/242 |
| 4,555,880 | 12/1985 | Gzym | 52/126.4 |
| 4,682,457 | 7/1987 | Spencer | 52/239 |
| 4,817,538 | 4/1989 | Michaelsen | 52/239 |
| 4,905,428 | 3/1990 | Sykes | 52/126.4 |
| 4,918,886 | 4/1990 | Benoit | 52/241 |
| 4,949,518 | 8/1990 | Nagel | 52/239 |
| 4,991,368 | 2/1991 | Amstutz | 52/126.4 |

FOREIGN PATENT DOCUMENTS 292833  11/1988  European Pat. Off. ............ 52/239

Primary Examiner—David A. Scherbel
Assistant Examiner—Creighton Smith
Attorney, Agent, or Firm—D. R. Lackey

[57] ABSTRACT

An office space dividing system comprising office furniture components in combination with a plurality of structural rectangular frames having openings which may be left open or closed in varying degrees with a wide variety of fill options, which may be readily changed, to create the desired degree of privacy. The system combines the advantages of a full height office partition system with lockable doors, and an open plan panel system. An enlarged cornice accommodates both wiring and ambient lighting, with a cornice to ceiling space being left open or closed with a clerestory, as desired, without compromising the ability to install lighting fixtures and wiring. The rectangular frames have mitered stiles which, when assembled with other frames, and/or mitered fill pieces, create columns defining vertical wire ways which communicate with cornice wiring, work surface height wiring, and/or base wiring, as desired.

92 Claims, 32 Drawing Sheets

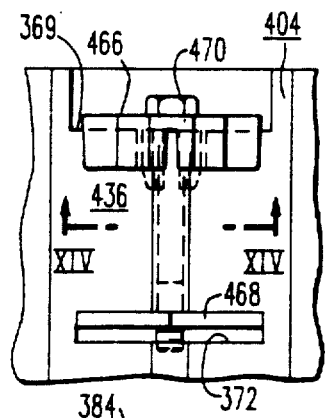
FIG.13
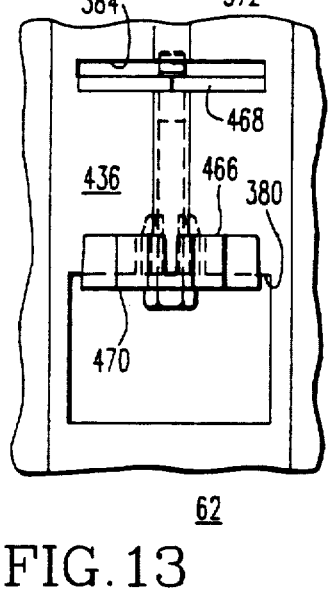
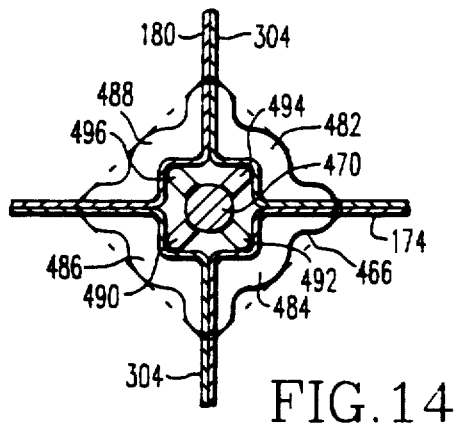
FIG.14
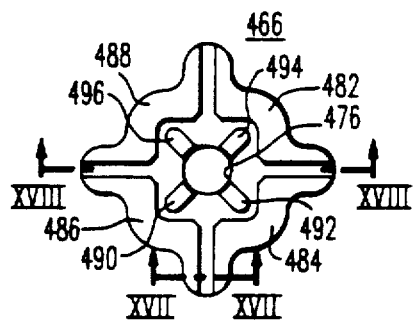
FIG.15
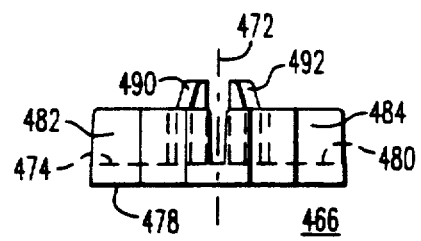
FIG.16
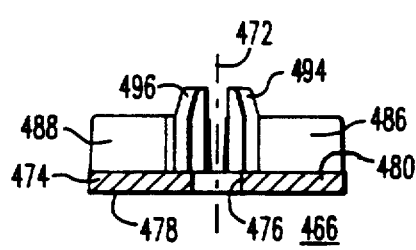
FIG.18
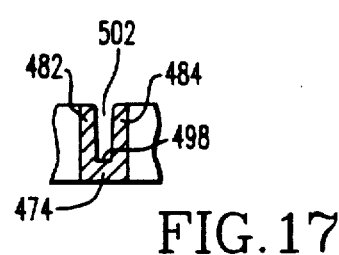
FIG.17

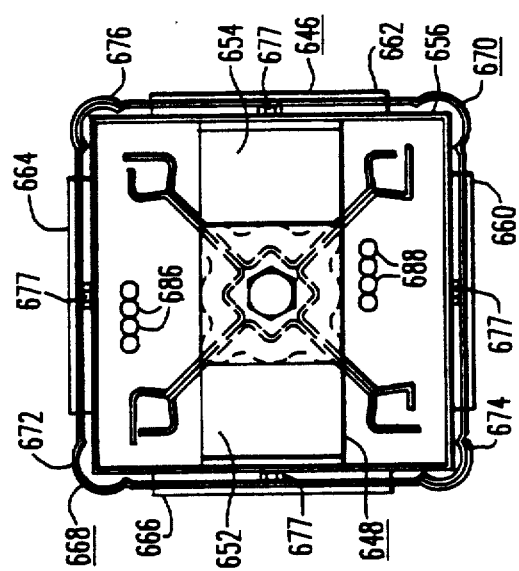
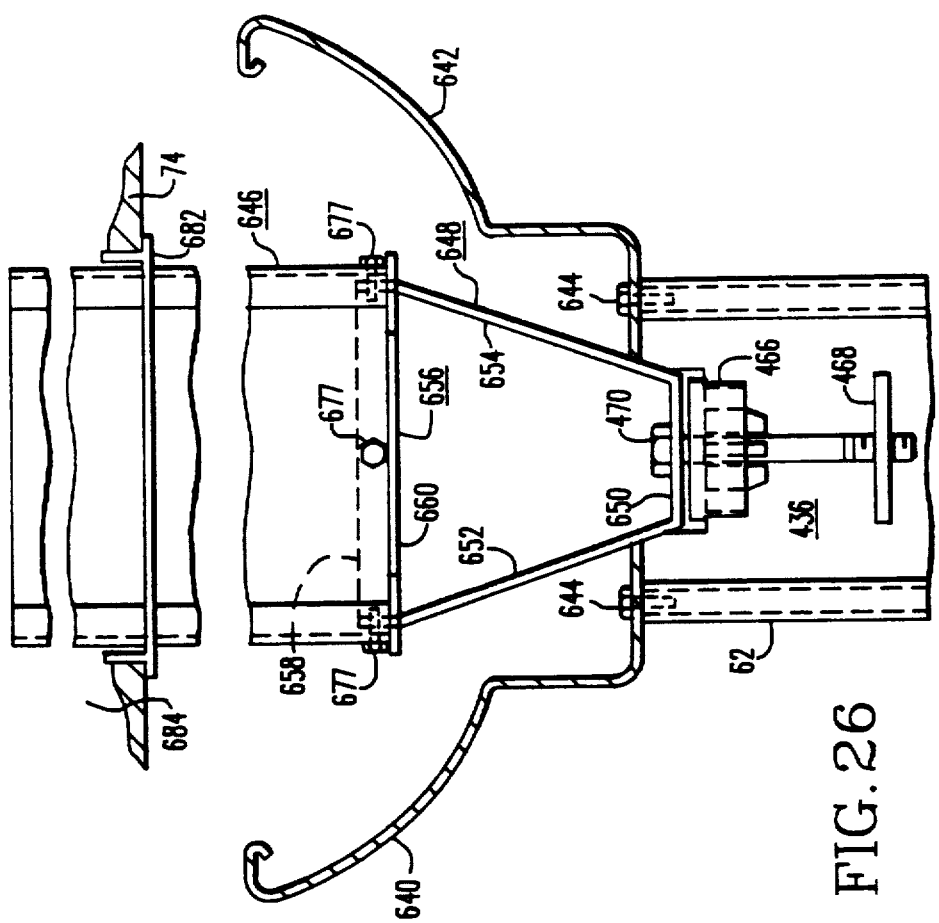

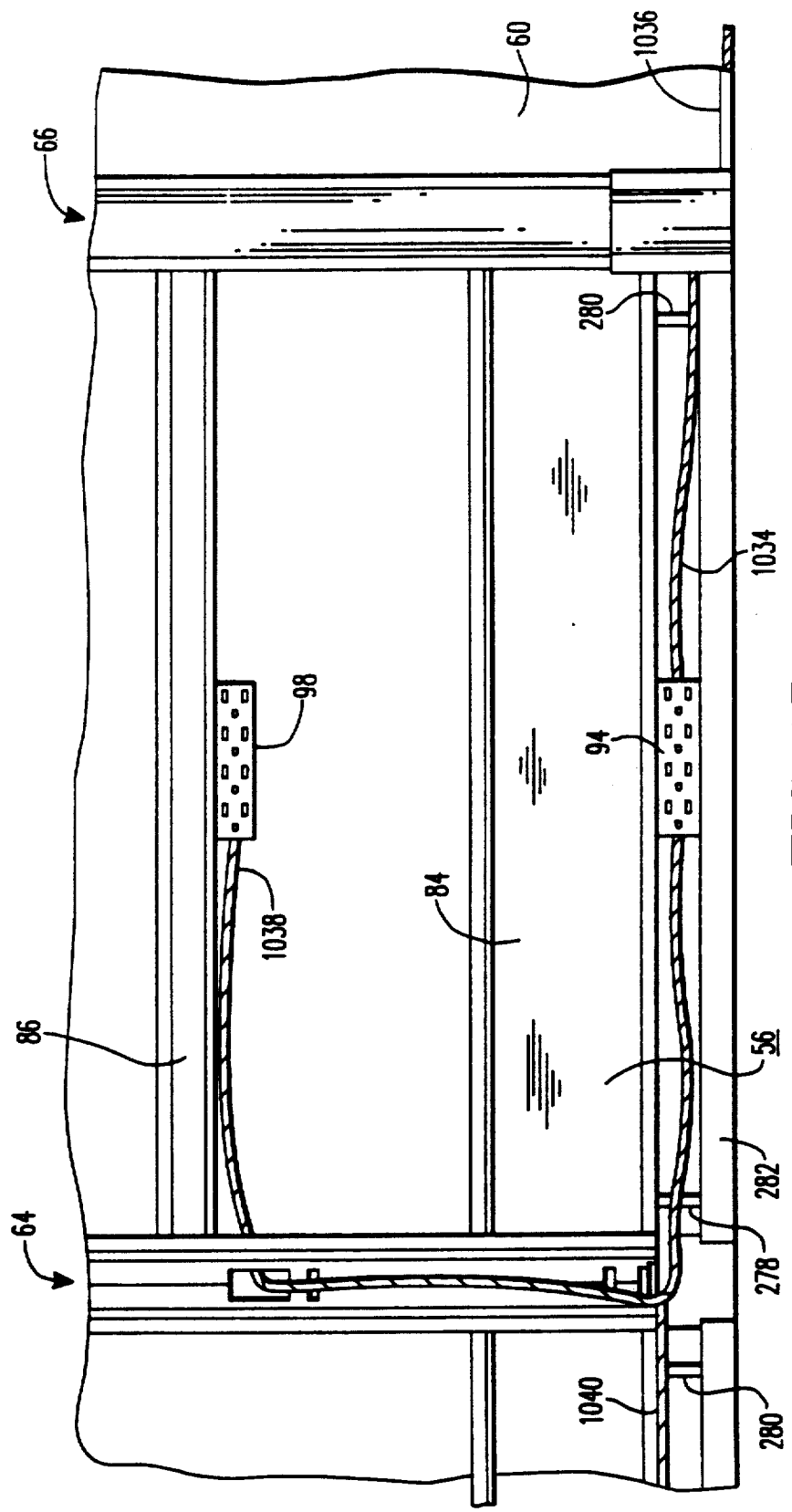

FRAME BASED OFFICE SPACE DIVIDING SYSTEM

TECHNICAL FIELD

The invention relates in general to office space dividing systems, and more particularly to frame-based office space dividing systems.

BACKGROUND ART

Various and distinct types of office space dividing systems have developed over the years including demountable or movable partition systems which may include doors; post or pole-based systems; frame or panel based systems which do not use a post; and spine, beam or work surface height systems.

In a movable wall or partition system, which systems usually extend from floor to ceiling, office furniture and accessories, such as desks and storage units, are usually free standing. Although such systems provide a strong sense of territory or privacy, full height movable wall systems tend to be monolithic and the components cannot be used to provide substantial variety. When a full height system is adapted to support work surfaces and other accessories, such work surfaces and accessories are usually sized to suit a panel width rather than a user's needs, i.e., the items are supported by vertical slots at each vertical edge of the panels. Because accessories and work tops are limited in both size and location in such systems, a storage and inventory problem may be created for the user. Examples of movable wall or partition systems may be seen in U.S. Pat. Nos. 4,018,019 and 4,251,968.

In a pole based system, such as disclosed in assignee's U.S. Pat. No. 3,762,116, space dividing panels having slotted standards at each vertical edge are attached to posts, such as by hooks disposed at the vertical edges of the panels and by cooperative hook-receiving cups on the poles. The poles have the advantage of providing "center line modularity", fixing the dimension for a string of panels regardless of how many branches are created at each pole. As discussed above relative to the movable wall systems, hang-on accessories must be sized according to panel width in order to be supported by the slotted standards at the vertical edges of the panels.

Most panel and frame based systems merely have gaps between the walls created by the frames to provide entry ways to offices, which does not provide a strong sense of privacy. Such gaps create problems in the distribution of electrical energy, as well as the routing of communications wiring. Frame based systems may increase the length of a string of frames at each branch from a linear string of frames, referred to as "creep", as they are usually not centerline modular. Most frame base systems tie the widths of hang-on accessories to the width of the frames, similar to the movable wall and post systems. Examples of frame based systems are in U.S. Pat. Nos. 4,535,577 and 4,876,835.

A spine type system utilizes interconnected beams at work surface height supported by posts. While spine systems are able to provide large communication and electrical raceways at work surface height for electrical energy intense applications, and they often provide excellent horizontal furniture flexibility by connecting work surfaces at any location along the work surface height beam, they usually lack a strong sense of territory or privacy. Examples of spine type systems may be found in U.S. Pat. Nos. 4,224,769; 4,771,583 and 4,883,330.

It would be desirable, and it is an object of the invention, to combine the advantages of the various types of systems, such as the strong sense of privacy of the movable partition systems, the center line modularity of the pole systems, the horizontal flexibility and electrical capacity of the spine systems, in a new and improved frame based office space dividing system, without offsetting disadvantages.

SUMMARY OF THE INVENTION

Briefly, the present invention is a new and improved frame based office space dividing system which combines office furniture components with a high strength structural frame system. The structural frame of the system, which is rectangular in configuration, may be left open or closed in varying degrees with a wide variety of fill options which are easily incorporated into openings defined by stiles and rails of the frames, and just as easily removed if required, while using the external outwardly facing surfaces of the stiles and rails as part of an overall visual effect, regardless of the degree of fill or closure.

The system is basically an above door height system, i.e., higher than door or entry way height, about 88 inches high, for example, but it is less than average ceiling height. An enlarged cornice is provided at the top of the frames, with the space between the cornice and ceiling being left open, or closed with a clerestory, as desired according to the degree of privacy required. While being basically an above door height system, the system also provides base frames which may be extended upwardly to different heights between the base height and the full height frame, to provide lower height walls when desired.

The enlarged cornice, while adding to the aesthetics of the system, also accommodates both wiring and ambient lighting fixtures. Outwardly flared, symmetrically curved sides on the cornice provide ample space for the lighting fixtures and a large number of communication wires, telephone wires and electrical power wiring, as well as providing surfaces which reflect light from the ambient lighting fixtures to the ceiling.

An important feature of the invention is the way adjacent frames are joined to create two-way, three-way or four-way intersections without changing the spacing between frames, and thus preserving the desired center line modularity. The novel connection arrangement between adjacent frames also spaces each frame about 0.375 inch away from the centerline of a column cooperatively formed by the adjacent edges of the frames. The vertical edges of the frames, defined by first and second vertical stiles, have cross sectional configurations which are W-shaped or mitered, which, in addition to providing the desired hereinbefore mentioned offset from center, creates a central opening for accommodating a tie bolt used in a three-part fastener for rigidly holding adjacent frames together.

The cooperatively formed columns between frames utilizes the mitered edges of the frames being joined, as well as an elongated W-shaped fill piece for each of four possible frame positions unoccupied by a frame at any particular column. When four frames are joined in a four-way connection, no fill pieces are employed. When three frames are joined in a three-way connection one fill piece is employed. When two frames are joined, straight or corner, two fill pieces are employed. Removable column covers over the fill pieces laterally enlarge the columns to a location tangent with circular edge curls which are located at the four corners of the column, increasing the cross sectional area available for running communication and power wiring in the columns. One edge curl is integral with each W-shaped edge miter and each fill piece, resulting in four edge curls or column beads when they are assembled. The four edge curls strengthen the column and provide a visual reveal at each column edge.

In addition to the wiring capability provided by the cornices and columns, each frame has a chair rail and a base rail, with horizontal wiring capability being provided at each location. The chair rail supports communication and power wiring at work surface height, which wiring may communicate with the vertical wiring in the columns, and/or with horizontal chair rail height wiring of adjacent frames. The base rail is elevated above floor level by levelers, with the space below the base rail providing a large space for communication and power wiring. Base wiring also has the option of communicating with wire ways in the columns and/or base rail wiring of adjacent frames.

The three-part fastener, includes a wedge clamp portion, which fits over adjacent edges of the W-shaped miters and fill pieces, a tapped tie plate spaced from the clamp portion, and the hereinbefore mentioned tie bolt which links the clamp portion and tie bolt to pull the frames into horizontal alignment and rigidly hold the frames in assembled relation.

The base rail of each frame is a vertically enlarged, box-like structural member which, although well below work surface height, is constructed strong enough to support work surfaces and other accessories via high strength brackets. Thus the work surfaces and accessories may be located horizontally along the base rail where desired, and the length of the work surfaces and accessories may be selected without regard to frame width.

A slightly projecting rail tile may be mounted between adjacent columns, above the chair rail, for hanging accessories such as storage cabinets, shelves, trays, etc. The projection enables the accessories to span a column by connecting them to rail tiles on opposite sides of a column. Thus, the accessories, similar to the work surfaces, are not limited in size or position by the system.

A wide variety of fill options are provided for filling the open spaces between the stiles and rails of each frame, with glazing panels and some partially open panels being centered relative to the depth of a frame, and with solid opaque panels being mounted back to back on opposite sides of a frame. The fill panels, whether centered or mounted back to back may be quickly positioned within a frame opening, and just as quickly removed, and neither cover or extend over the exposed vertically oriented flat surfaces of the frames on either side, preserving the stiles, base rail, chair rail and top rail as part of the esthetics regardless of the degree of fill utilized.

BRIEF DESCRIPTION OF THE DRAWINGS

The invention will become more apparent by reading the following detailed description in conjunction with the drawings which are shown by way of example only, wherein:

FIG. 13 is an enlarged fragmentary elevational view of a column with a column cover removed to more clearly illustrate the positions of an upper and an intermediate clamping arrangement used to rigidly hold adjacent frames together and create a column;

FIG. 14 is a section taken between and in the direction of arrows XIV—XIV in FIG. 13, illustrating how the clamping arrangement tightly clamps adjacent walls of adjacent W-sections together;

FIG. 15 is a bottom plan view of the clamp or wedge portion of the three-part frame connector;

FIG. 16 is a side elevational view of the wedge portion of the three-part frame connector shown in FIG. 15;

FIG. 17 is a cross sectional view of the wedge portion of the frame connector, taken between and in the direction of arrows XVII—XVII in FIG. 15;

FIG. 18 is a cross sectional view of the wedge portion of the frame connector, taken between and in the direction of arrows XVIII—XVIII in FIG. 15.

FIG. 26 is a section through a cornice similar to the section shown in FIG. 24, except illustrating a wiring enclosure from the cornice to a power feed above the ceiling;

FIG. 27 is a top plan view of the wiring enclosure shown in FIG. 26;

FIG. 45 is a fragmentary front elevational view of the lower portion of a frame, illustrating prewired terminal blocks which may be mounted below the chair rail and base rail;

DESCRIPTION OF PREFERRED EMBODIMENTS

Figure 1:
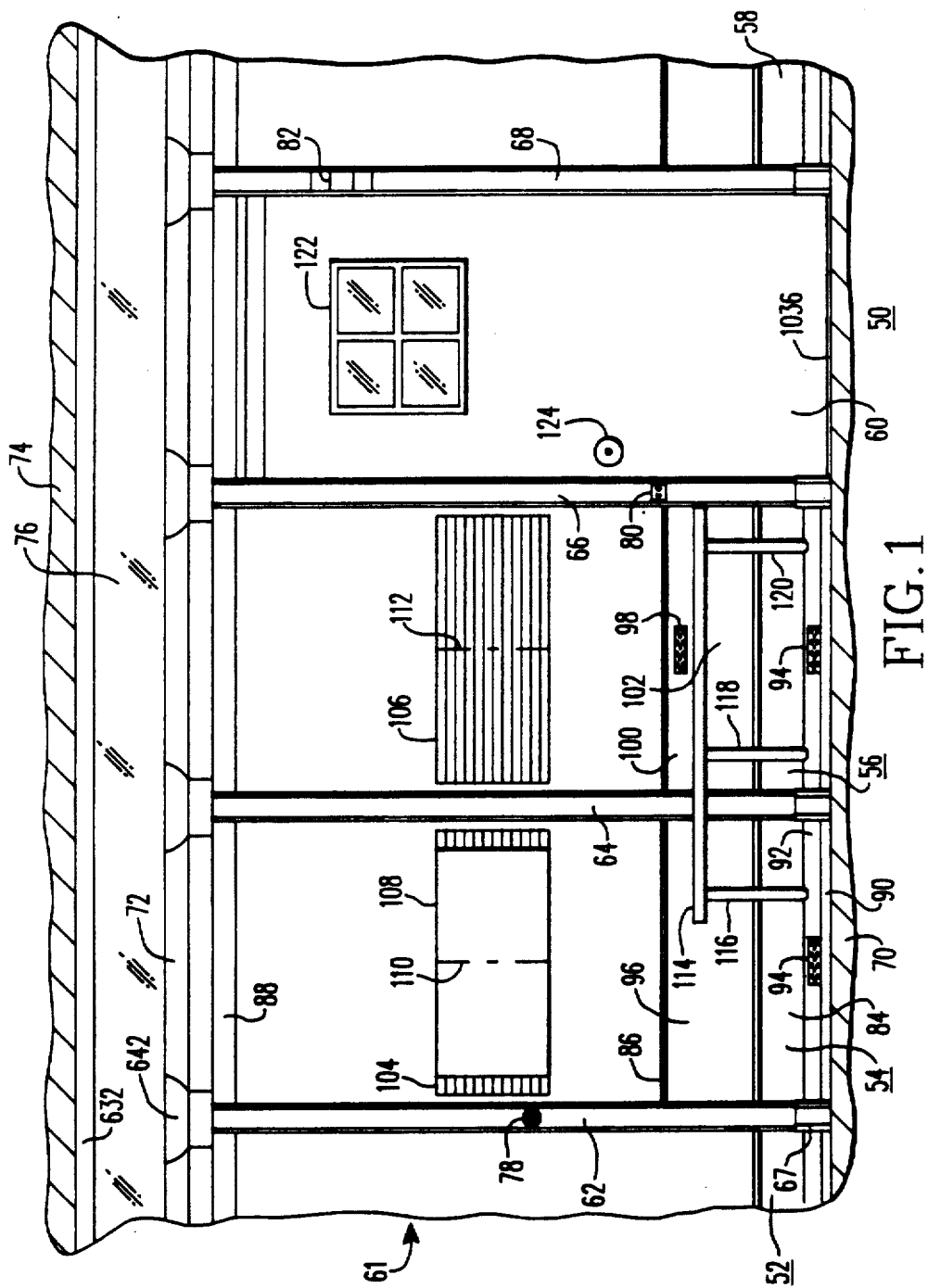
FIG. 1 is a fragmentary front elevational view of a cornice height office space dividing system in accordance with the present invention.
Figure 2:
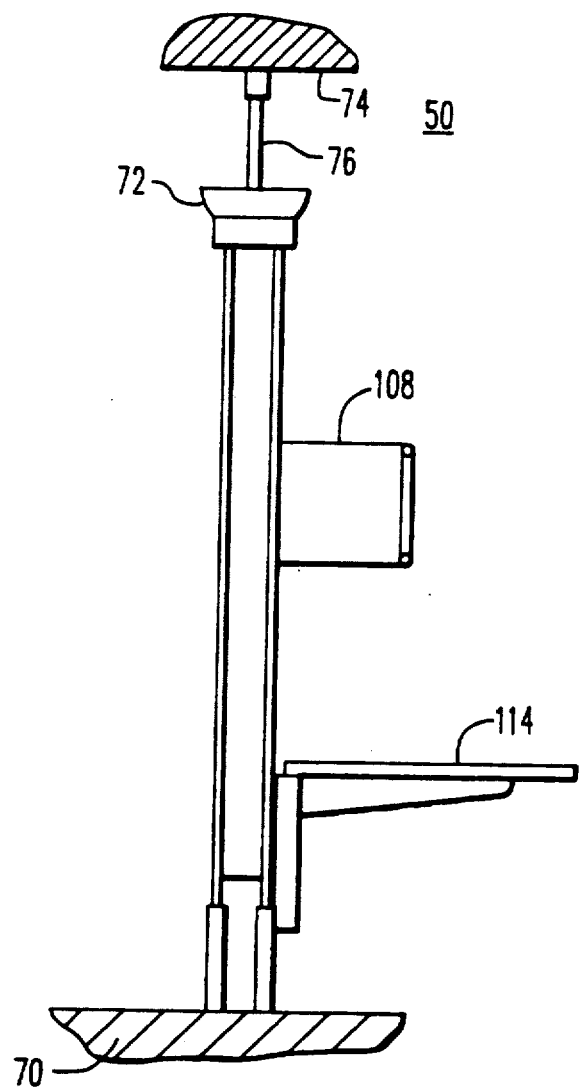
FIG. 2 is an end elevational view of the cornice height system shown in FIG. 1 illustrating a work surface and an upper storage unit supported on a base rail and rail tile, respectively.

Referring now to the drawings, and to FIGS. 1 and 2 in particular, there is shown a cornice height office space dividing and furniture enclosure system 50 constructed according to the teachings of the invention. System 50 includes a plurality of cornice height rectangular frames 52, 54, 56, and 58, with the latter two being disposed on opposite sides of a door 60. The term "cornice height" as used herein means above normal door or entry way level height, such as about 88 inches. The frames may be arranged to provide walls, hallways, rooms or offices with or without a door, work spaces with or without a door, closed rooms with adjacent open secretarial stations, and the like. For purposes of example, FIGS. 1 and 2 illustrate one wall 61 on the inside of an office closable with the door 60.

As will be hereinafter described in detail, frames 52, 54, 56, and 58 each include first and second vertical stiles having mitered portions which are interconnected to cooperatively form enlarged columns 62 and 64 and door jambs 66 and 68. Columns and door jambs are of like construction. The columns are referred to as being "enlarged" because, as will be hereinafter explained, the columns extend outwardly past the opposite outwardly facing sides or parallel opposed vertical faces of the frames. The columns and door jambs may be provided with decorative plinths, such as plinths 67 and 69 associated with column 62.

The columns 62 and 64 and door jambs 66 and 68 extend from a floor 70 to an enlarged cornice 72. The enlarged cornice 72 is above the level of door 60, but lower than the height of a ceiling 74. The space between the top of cornice 72 and ceiling 74 may be left open, or it may be closed by cornice to ceiling panels or a clerestory 76, depending upon the degree of privacy required.

The columns and door jambs may incorporate signage, lighting, speakers, and other visual and audio cuing devices, with a speaker 78 being illustrated on column 62, a switch plate and switches 80 on door jamb 66, and a lighting fixture 82 on door jamb 68.

Each of the cornice height frames 52, 54, 56 and 58, in addition to the hereinbefore mentioned first and second vertical stiles, includes a base rail, a chair rail, and a top rail, all of which run horizontally between the stiles, such as base rail 84, chair rail 86 and top rail 88 associated with frame 54. Top rail 88 is just above normal door height, chair rail 86 is at normal chair rail height, which is just above an average work surface height of about 28 to 29 inches. The bottom of the base rail 84, when assembled in an office space dividing system, is lifted about six inches above floor level. The base rail 84 has a height dimension of about ten inches, and thus the top of the base rail 84 in a space dividing system 50 is about sixteen inches above floor level, which is about one-half the distance from floor level to the chair rail 86. In all frames of the space dividing system 50, including frames to be hereinafter described which are lower than those shown in FIGS. 1 and 3, the chair rails 86 are aligned with one another and the base rails 84 are aligned with one another.

Each frame is supported by adjustable feet or levelers which are attached to and extend downwardly from the base rail 84 to a floor channel 90. The space between the base rail 84 and floor channel 90 is covered by base panels through which electrical outlets may be accessed, such as base panel 92 associated with electrical outlets 94.

The space between the top of the base rail 84 and the bottom of the chair rail 86 may be filled with a single panel per frame side, such as panel 96 associated with frame 54. When electrical receptacles or outlets are provided just below the chair rail 86, such as electrical receptacle 98 associated with frame 56, this space may be covered by two panels 100 and 102; or, the single panel 96 may be provided with an opening through which the work surface height electrical receptacle may be accessed, as desired.

Above the chair rail 86, rail mounts may be mounted between the inner facing surfaces of the first and second stiles of a frame, such as rail tile 104 associated with frame 54 and rail mount 106 associated with frame 56. Rail mounts 104 and 106 are used to support a wide variety of furniture accessories which are functional above the chair rail height, such as a storage cabinet 108 supported by rail mount 104. Because of the unique configuration of the rail tiles and their supporting brackets, to be hereinafter described, the upper storage cabinets and other accessories may span the enlarged column 64 located between the adjacent rail mounts 104 and 106, with the broken lines 110 and 112 indicating the ends of storage cabinet 108 when it spans column 64 and is supported by both of the rail mounts 104 and 106. Thus, the accessories above chair rail height may have complete horizontal adjustability, without regard to frame width or width of the accessory, simply by employing appropriately located rail mounts. Of course, furniture and accessories which extend above the chair rail may be free standing, if desired, such as floor supported storage files.

Work surfaces, furniture and accessories which are functional below the chair rail 86 may be free standing or supported from the base rail 84, as desired. For purposes of example a work surface 114 is shown in FIGS. 1 and 2 supported from the base rail 84 by brackets 116, 118 and 120. The brackets may be of the cantilever type, as illustrated, and they may be in the form of right angle brackets having a very short horizontal leg attached to the bottom of the work surface. The base rail 84 provides complete horizontal adjustability, without regard to frame width or accessory width, as illustrated relative to work surface 114, with work surface 114 being shown spanning enlarged column 64 for purposes of example.

Door 60 may be completely opaque or provided with a window 122, as desired. Door knob and associated latch assembly 124 may include conventional locking hardware, to prevent unauthorized entry.

Figure 3:
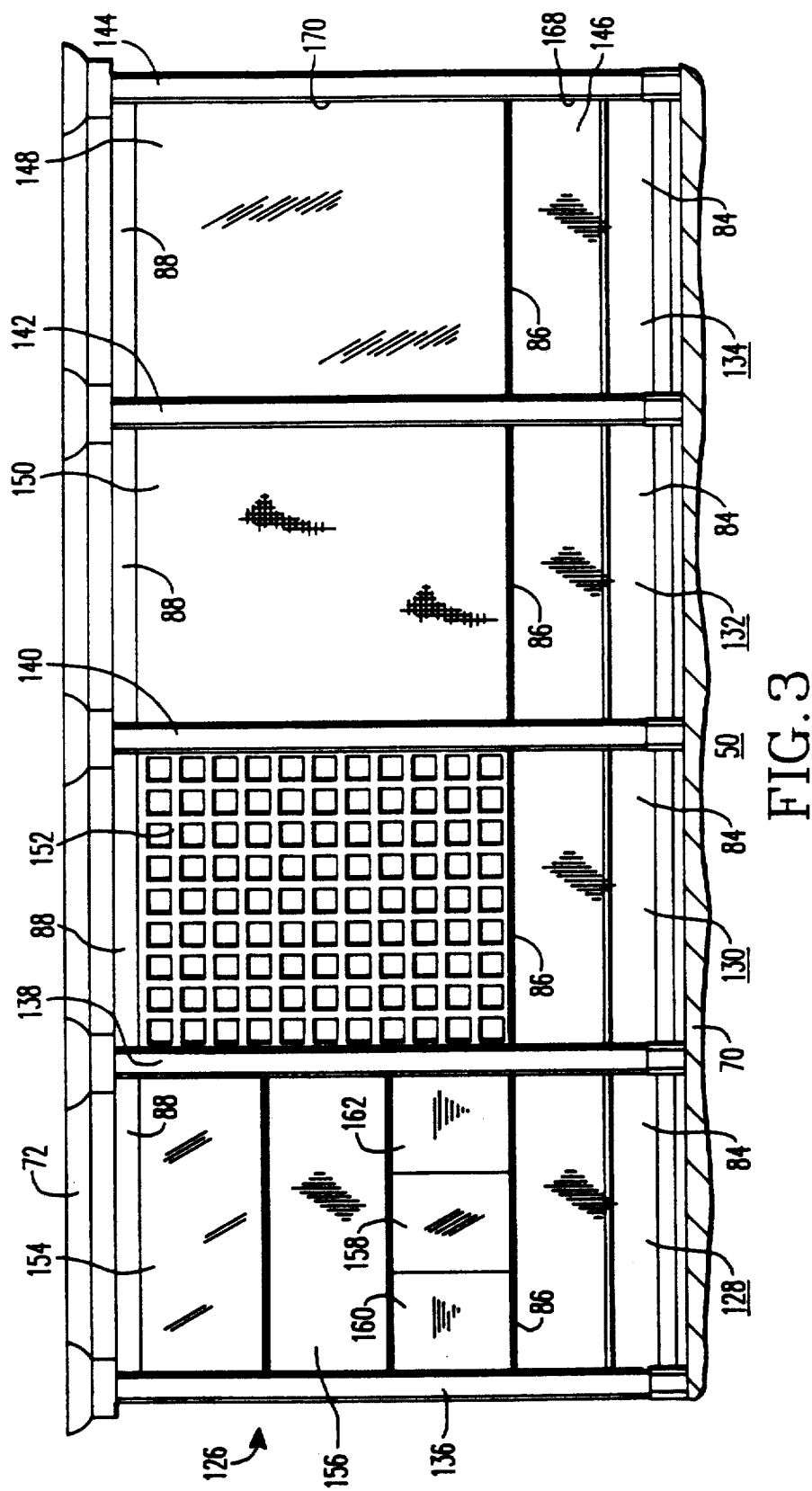
FIG. 3 is a view similar to FIG. 1, illustrating a variety of fill panels or inserts which may be used.

The private office associated cornice height wall 61 shown in FIGS. 1 and 2 provides essentially total privacy, with the frame openings defined by the stiles and rails of each rectangular frame being completely filled with opaque panel inserts. FIG. 3 illustrates a wall 126, which is also part of the overall office space dividing system 50 of the invention, with wall 126 being constructed of four cornice height frames 128, 130, 132 and 134 which form five enlarged columns 136, 138, 140, 142, and 144. Wall 126 is one which does not require the same degree of privacy as wall 61, such as a wall which defines one side of a hallway, on the side viewed in FIG. 3. The office space on the other side of wall 126 is one which does not demand complete privacy, such as a space utilized by a team of people working together on a project, secretaries, and the like. While all frame openings are illustrated in FIG. 3 with some sort of fill, in many instances no fill at all will be required at certain locations of the frames for certain applications of the system 50. The metallic stiles and rails of each frame are completely finished with a thick durable paint of any desired color, such as black, and the outwardly facing surfaces on both major sides of each frame are never covered regardless of the degree of fill utilized in the frame openings. Thus, the outwardly facing surfaces of the frames are always an important part of the aesthetics of office space dividing system 50.

More specifically, FIG. 3 illustrates some of the fill options which may be used. Since all of the frames have the same stile and rail construction, the rails of all frames will be given the same reference numerals used relative to frame 54 in FIG. 1. For purposes of example, the space between the base rail 84 and chair rail 86 of each frame is illustrated filled with a single opaque panel, such as opaque panel 146 in frame 134.

In the right hand frame 134, a large glass panel 148 is shown extending all the way from the chair rail 86 to the top rail 88. In the adjoining frame 132, this same space is filled with a single large fabric covered opaque panel 150. In the next adjacent frame 130, this same space is filled with an open lattice structure 152, such as an attractively finished wooden lattice. In the final frame 128, the space between the chair rail 86 and top rail 88 is filled with a series of panels, with the illustrated three equal height levels of panels being the preferred maximum number of vertical levels above the chair rail 86. The uppermost level is illustrated as having a single glass panel 154, the intermediate level is illustrated as having a single opaque panel 156, and the lowest level is illustrated as having a panel comprised of three small sections, a glass intermediate section 158 and opaque outer sections 160 and 162. Another option would be to leave the section occupied by the glazing section 158 open, to provide a pass-through opening in the center of the frame above the chair rail. Still additional options include electrical outlet panels, below the chair rail 86 and below the base rail 84, such as illustrated relative to frame 56 in FIG. 1.

As hereinbefore stated, regardless of the type and degree of fill utilized, the base rail 84, chair rail 86, and top rail 88, as well as the columns constructed of the vertical stiles of the frames, are always completely exposed on both sides of the frame. FIG. 3 simply serves to illustrate the wide variety of fill panels which may be installed within the frame openings defined by the stiles and rails of each cornice height frame, to provide an attractive variety which is not normally available in monolithic movable partition systems.

Figure 4:
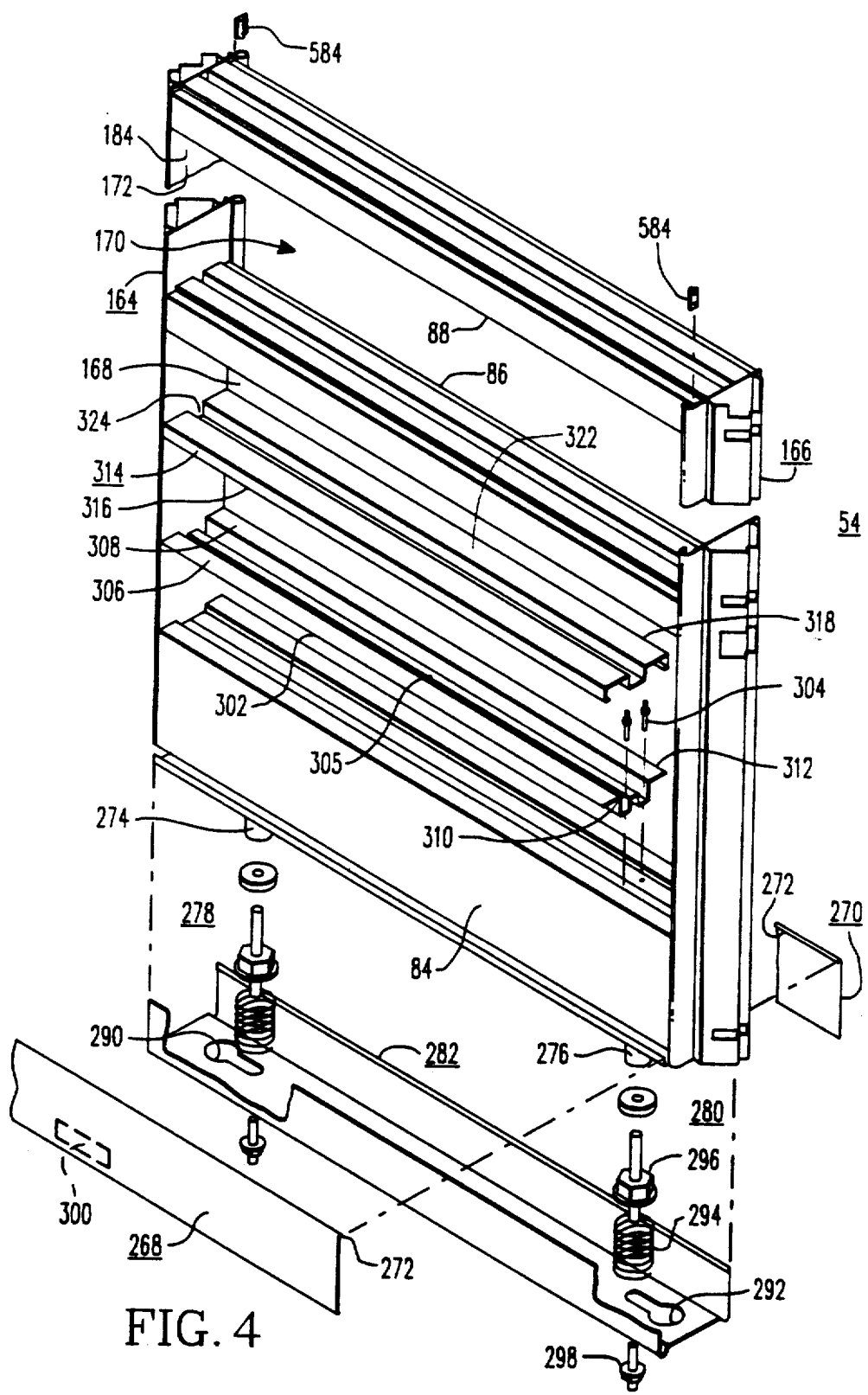
FIG. 4 is an enlarged fragmentary, partially exploded perspective view of a cornice height frame constructed according to the invention.
Figure 5:
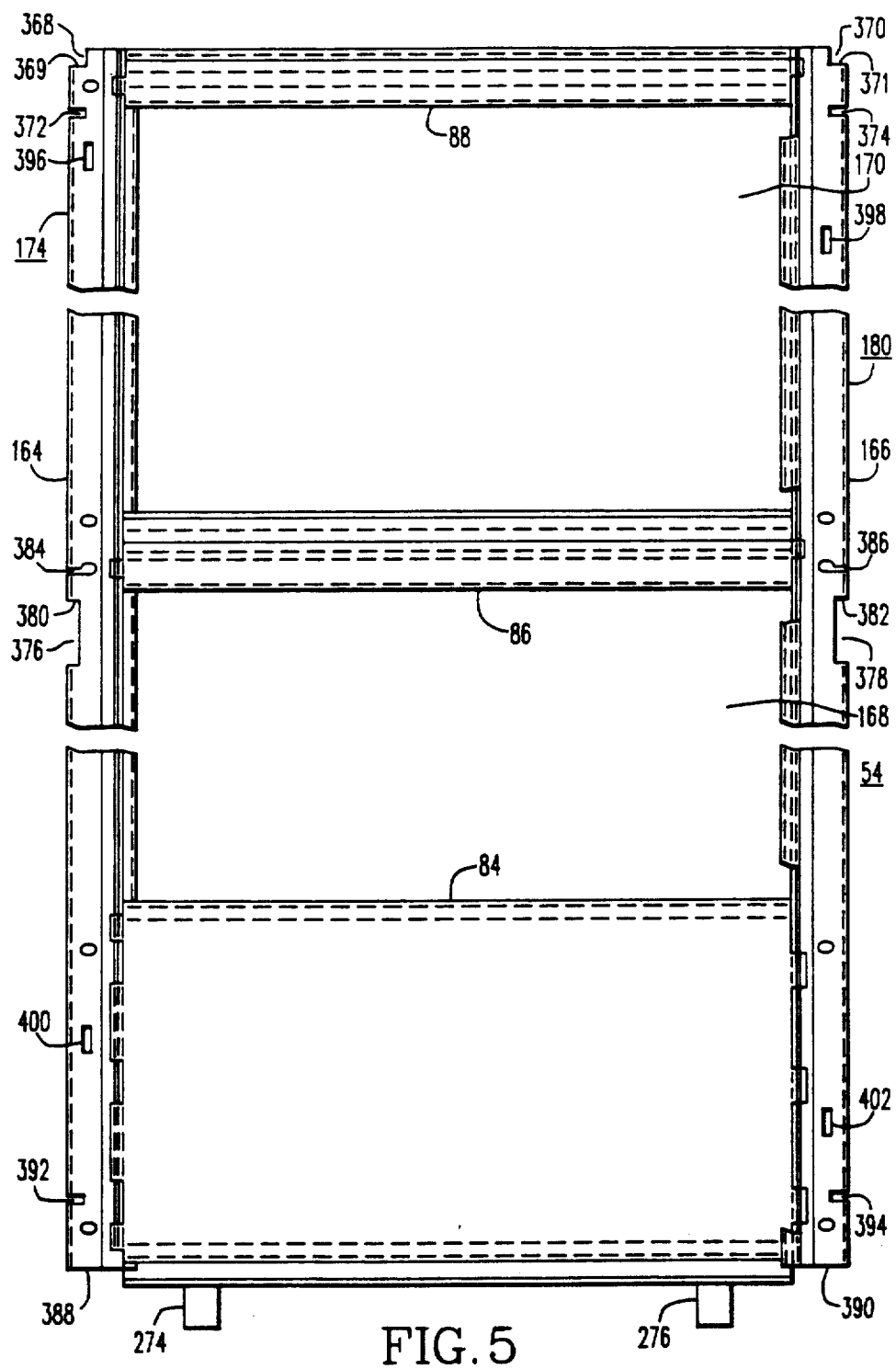
FIG. 5 is a front elevational view of the frame shown in FIG. 4.
Figure 6:
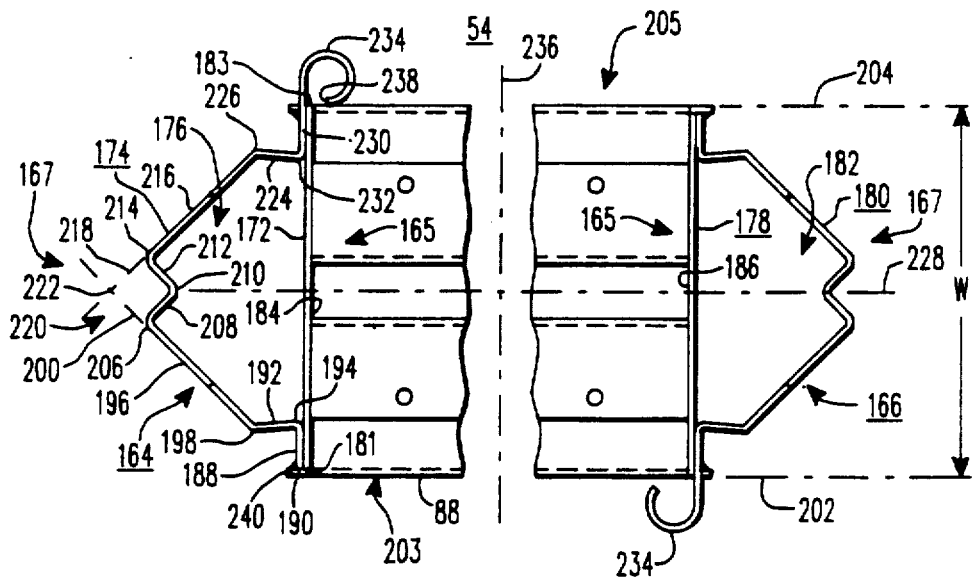
FIG. 6 is a fragmentary top plan view of the frames shown in FIGS. 4 and 5, illustrating more clearly vertical stiles of the frame and their W-shaped outwardly extending miter portions.

The building block of the office space dividing system 50 is the frame, and the frame will now be described in detail with reference to FIGS. 4, 5 and 6. For purposes of example, the frame shown in FIGS. 4, 5 and 6 will be referred to as frame 54 shown in FIG. 1, but it will be understood that each cornice height frame is identical in construction. FIG. 4 is a perspective view of frame 54, with associated floor channels and base covers being exploded therefrom. FIG. 5 is a front elevational view of frame 54 without the floor channel and base covers. FIG. 6 is a top plan view of frame 54.

In general, frame 54 includes first and second end portions, top and bottom portions, and front and back surfaces disposed in parallel front and back planes. The first and second end portions are defined by first and second vertical stiles 164 and 166 each having inner and outer sides 165 and 167, respectively. The term "inner side" refers to the side of the stile which faces the rectangular frame opening, and the term "outer side" refers to the directly opposite side. The first and second vertical stiles are interconnected at the bottom by a bottom rail 84 which defines the bottom portion of the frame, by a chair rail 86 at slightly above normal work surface height, and at the top by a top rail 88 which defines the top portion of the frame. The stiles and rails thus cooperatively define a lower opening 168 located between the base rail 84 and chair rail 86, and an upper opening 170 located between the chair rail 86 and top rail 88. As shown most clearly in the top plan view of FIG. 6, each stile 164 and 166 is a two part weldment, with stile 164 having a flat inner plate 172 an inner side 165 and a miter portion 174 on the outer side 167 which will also be referred to as W-section 174, because of its W-shaped cross sectional configuration. W-section 174 and flat plate 172 are welded together to form a high strength tubular structure defining a central opening 176.

In like manner, the second stile 166 includes a flat plate 178 member on inner side 165, and a W-section 180 on outer side 167, which are welded together to form a hollow, tubular structure defining an opening 182. The inner plates 172 and 178 have vertical edges 181 and 183 spaced by a dimension which is substantially equal to the depth D of the frame 54, with inner plates 172 and 178 defining parallel inner surfaces 184 and 186 which face one another. Plates 172 and 178 each have a plurality of holes and slots formed therein, accessible via the parallel inner facing surfaces 184 and 186, for attaching fill inserts, as will be hereinafter described relative to FIG. 19.

With reference primarily to FIG. 6, W-section 174 includes a short flat portion 188 adjacent a first longitudinal edge 190, with portion 188 being parallel to and abutting the flat inner plate 172. Portion 188 joins another relatively short portion 192 via a bend 194 which is slightly less than 90 degrees. Portion 192 joins a first miter wall 196 via a bend 198. Bend 198 places the first miter wall 196 in a plane 200, extensions of which intersect major vertical parallel planes 202 and 204 at a 45 degree angle. Planes 202 and 204 are disposed through the two opposite faces of frame 54, i.e., through the outwardly facing front and back surfaces, generally referenced 203 and 205, respectively. W-section 174 is then successively bent via a first right angle bend 206 to form a short inwardly directed portion 208, via a second right angle bend 210 to form a short outwardly directed portion 212, and via a third right angle bend 214 into a second miter wall 216. Bend 214 places the second miter wall 216 into a plane 218 which intersects vertical parallel planes 202 and 204 at 45 degree angles.

The three successive right angle bends in opposite directions form a right angle inwardly directed notch 220 at the projected intersection 222 of the first and second miter walls 196 and 216. As will be hereinafter explained, intersection 222 will be located on the longitudinal centerline of a column constructed between adjacent frames, and thus W-section 174, plus other W-sections which cooperatively construct the column, are all spaced away from the centerline of the column, allowing frames to be added to or taken away from any frame intersection without disturbing any of the other frames at the intersection.

The second miter wall 216 joins a short portion 224 via an obtuse bend 226 which is a mirror image of angle 198 relative to a horizontal longitudinal central axis 228 of frame 54. Short portion 224 joins a portion 230 via a bend 232, with bend 232 being a mirror image of bend 194, placing portion 230 in abutment with flat inner plate 172. Portion 230, instead of stopping at face 205 of frame 54 defined by major plane 204, extends beyond face 205, forming a circular edge curl 234 which extends toward a central transverse axis 236 of frame 54. The circular edge curl 234 is tangent with portion 230, and it has a sufficiently large diameter such that the second edge 238 of the W-section is near both the frame face 205 and portion 230. Except for the outwardly extending edge curl 234, W-section 174 is symmetrical about horizontal longitudinal frame axis 228.

Stiles 164 and 166 are identical, and thus W-section 18 associated with the second stile 166 is identical to the just described W-section 174 of stile 164, and the same reference numerals are thus used to describe like elements of the stiles. The fact that stiles 164 and 166 are identical places the edge curl 234 of stile 166 adjacent to face 203 of frame 54 which is associated with plane 202.

In the embodiment illustrated, the W-sections 174 and 180 are welded to the flat inner plates 172 and 178, respectively, which are in turn welded to the horizontal base, chair and top rails 84, 86 and 88. To facilitate such welding the horizontal rail members may be provided with projecting tabs, such as indicated at 240. While welding of the rails to the stiles is preferred and utilized with most frame widths, it will be appreciated that frame widths may be utilized which may make it difficult to ship and transport the frames to the point of installation, e.g., frames having a width of five or six feet. Thus, a knock down version of the cornice height frame may be provided in which the three horizontal rails are secured to the stiles by fasteners.

Figure 19:
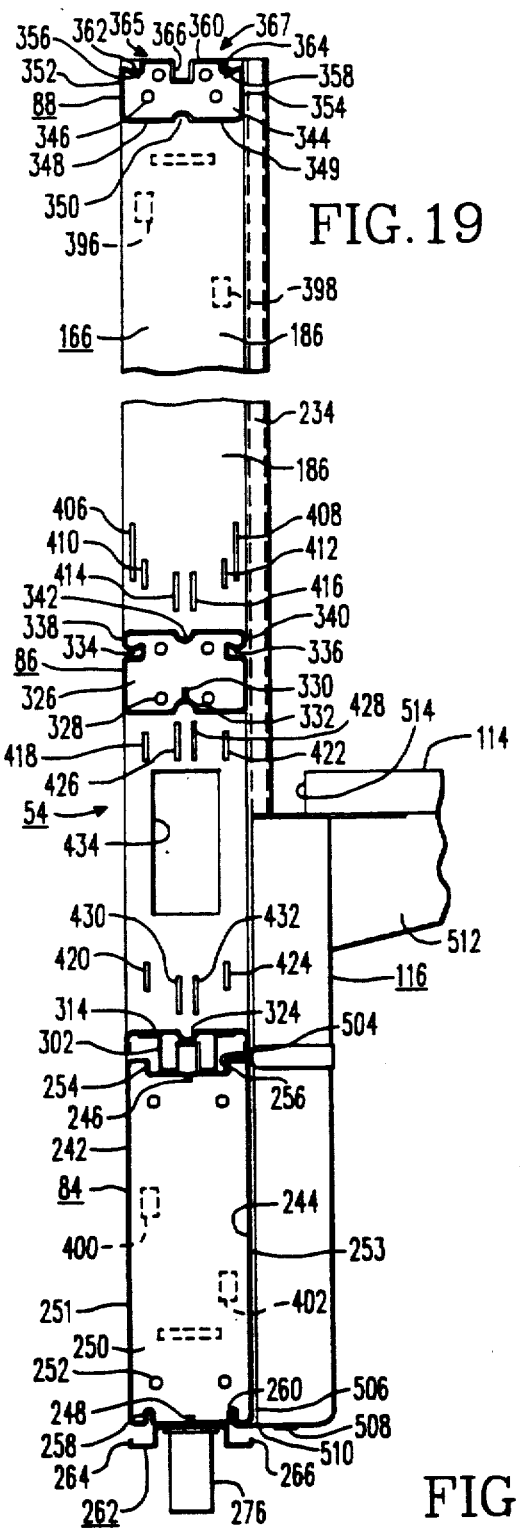
FIG. 19 is a fragmentary vertical section through a cornice height frame, showing a work surface mounted on the base rail.
Figure 19A:
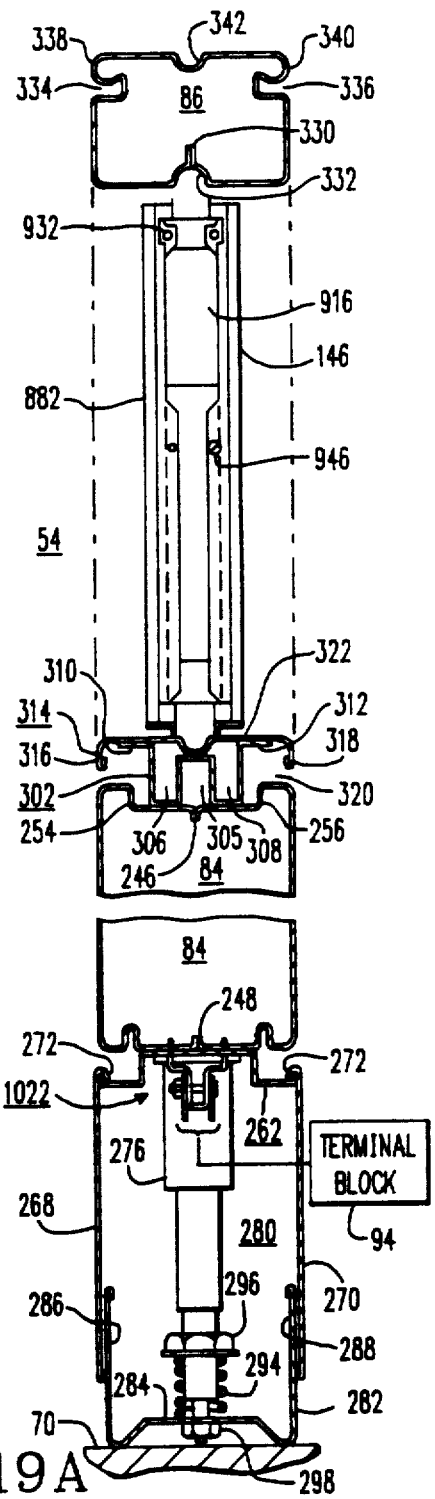
FIG. 19A is a vertical section of a frame from the floor to the chair rail, illustrating base covers disposed to conceal a wire way disposed between the bottom of the base rail and the floor.

Referring to FIG. 19 and 19A, which are sectional views through frame 54 which more clearly illustrate the construction of the frame rails, the base rail 84 is constructed of two formed back-to-back metallic sections 242 and 244 which are welded where they abut in mating flanges at the top and bottom of the rail, as indicated at 246 and 248. Each open end of the resulting high strength tubular structure is closed by an end plate member which is welded thereto, such as end plate member 250. The end plate members may be provided with a plurality of fastener openings 252 in knockdown versions of the frame.

The top of the base rail 84, extending outwardly from the abutting flanges 246 steps upwardly adjacent each outer face 251 and 253 of the base rail 84, providing shoulders 254 and 256. The bottom of the base rail 84, extending outwardly from the abutting flanges 248, is provided with grooves 258 and 260 adjacent the outer faces 251 and 253, respectively. Shoulder 254 and groove 258 enable bracketry to be mounted adjacent to face 251, and shoulder 256 and groove 260 enable bracketry to be mounted adjacent to face 253, such as for supporting work surfaces, as will be hereinafter explained.

A strip 262 having a hat shaped cross section is secured to the bottom of base rail 84, with the edges thereof having upturned lips 264 and 266 adjacent to each side of frame 54 and vertically spaced below the bottom of the base rail 84. Lips 264 and 266 support upper edges of base panels 268 and 270 shown in FIGS. 4 and 19A, with the upper edges of base panels 268 and 270 having down turned upper flanges 272 so that the base panels may simply be hung on the hook-shaped lips 264 and 266.

As shown in FIG. 4, a pair of hub members 274 and 276 are also fixed to the bottom of base rail 84, which accommodate height adjustable leveler assemblies 278 and 280, respectively. A floor channel 282, more clearly shown in FIG. 19A, is disposed below frame 54. Floor channel 282 includes a bight or bottom 284, which has a slightly elevated center portion, and upstanding legs 286 and 288. The bottom 284 includes keyhole slots 290 and 292, with the lower ends of the leveler assemblies 278 and 280 respectively engaging the keyhole slots 290 and 292. Each leveler assembly is of like construction, and thus only leveler assembly 280 will be described in detail. Leveler assembly 280 includes a compression spring 294 which maintains any selected height position of the assembly. Spring 294 extends between bottom 284 and an adjustable nut 296. A nut 298 below bottom 284 secures the assembly 280 to the floor channel 282. Frame 54 is adjustably supported from floor channel 282 such that the bottom of the base rail 84 is approximately six inches above the level of floor 70. The base panels 268 and 270 may be provided with openings or knockouts, such as knockout 300, for providing access to electrical receptacle 94 shown in FIG. 1.

As shown in FIGS. 4 and 19A, a rail cap 302 is fixed to the top of the base rail 84 via fasteners 304. Rail cap 302 has an inverted U-shaped center channel 305 which joins U-shaped outer channels 306 and 308, the upper edges of which are bent outwardly and folded at 310 and 312. A channel shaped rail cover 314 in the orientation of an inverted U has depending legs 316 and 318 which snap over the folded edges 310 and 312 of the rail cap 302, while retaining access spaces 320 to shoulders 254 and 256. Rail cover 314 has a bight 322 which defines a centered, longitudinally extending groove 324 for supporting fill inserts, as will be hereinafter explained.

As shown in FIG. 19, the chair rail 86 is a rolled member provided with end walls, such as end wall 326, which may be provided with openings 328 for fasteners in a knockdown version. The chair rail is a single rolled sheet of metal with the edges joined in the bottom portion of the rail at abutting flanges as indicated at 330, just above a centered, longitudinally extending, downwardly opening groove 332. Opposite sides of the chair rail 86 include inwardly extending grooves 334 and 336, with the projections above such grooves being somewhat enlarged and rounded, as indicated at 338 and 340. Accessories may be hooked or snapped into grooves 334 and 336. The top center of the chair rail 86 is provided with a centered, longitudinally extending groove 342 for supporting fill inserts.

The top rail 88 of frame 54, as shown in FIG. 19, is provided with end plates, such as end plate 344 which defines a plurality of openings 346 in a knockdown version. Top rail 88 includes a channel shaped lower portion 348 having a bight or bottom 349 which defines a centered longitudinally extending groove 350. Upwardly extending legs 352 and 354 of the channel shaped lower portion 348 are bent inwardly and downwardly at a slight angle to provide support flanges 356 and 358. Top rail 88 is completed by an upper portion 360 which has slightly upturned edge flanges 362 and 364 which rest upon and are fixed to the support flanges 356 and 358. Upper portion 360 defines a centered, longitudinally extending stiffening channel 366. The downwardly bent flanges 356 and 358 of the bottom portion 348 and the upwardly bent flanges 362 and 364 cooperatively define grooves or shoulders 365 and 367 adjacent faces 203 and 205 of frame 54 over which accessories may be hooked.

Referring to FIG. 5, it will be noted that the tops of the W-sections of stiles 164 and 166 are provided with notches 368 and 370, which provide horizontal fastening edges 369 and 371 at the top of the W-sections somewhat recessed from the top of frame 54. Spaced below notches 368 and 370 are horizontal slots 372 and 374, respectively.

Just below chair rail 86, the W-sections are provided with horizontally aligned rectangular notches 376 and 378 which provide horizontally aligned fastening edges 380 and 382. Horizontal slots 384 and 386 are respectively provided above fastening edges 380 and 382.

The bottoms of the W-sections provide fastening edges 388 and 390, and horizontal slots 392 and 394 are respectively provided above edges 388 and 390. The just described fastening edges and associated horizontal slots provide lower, intermediate and upper locations used by frame connectors to be hereinafter described, to rigidly join adjacent frames in two-way, three-way and four-way intersections, as well as to form door jambs.

Figure 10:
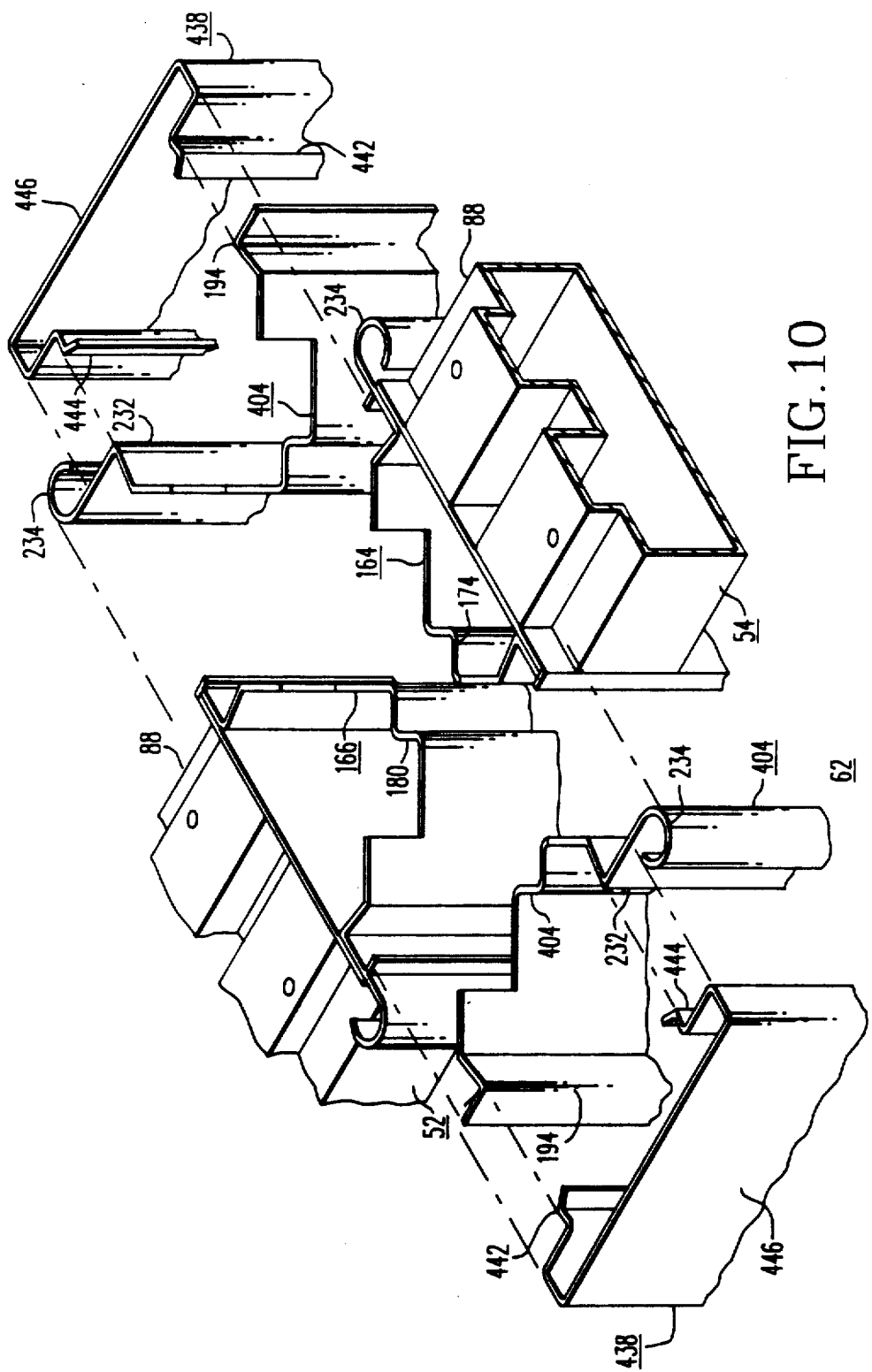
FIG. 10 is a fragmentary perspective view of the two-way connection shown in FIG. 9, with the two frames retaining their assembled positions and with the fill pieces and covers being exploded.

The miter walls of stiles 164 and 166 are provided with rectangular slots 396, 398, 400 and 402 which facilitate column and door jamb construction. As will be hereinafter explained, each column 62 and 64 and each door jamb 66 and 68 is formed from four W-sections. When less than four frames are joined, a "loose" W-section 404, best shown in FIG. 10, is provided at each location which could receive a frame. The rectangular slots 396, 398, 400 and 402 enable loose W-sections 404 to be attached to adjacent W-sections, either W-sections of stiles 164 and 166 or loose W-sections 404. A loose W-section 404 has exactly the same configuration as the W-sections 174 and 180 hereinbefore described relative to frame 54, and a loose W-section will not be described in detail. A loose W-section 404 is simply not welded to a back-up plate, as in a stile. A loose W-section 404 has vertically spaced pairs of outwardly and downwardly extending tab hooks, illustrated at 440 in FIG. 7, for connection to adjacent W-sections. Tab hooks 440 enter selected pairs of the hereinbefore mentioned rectangular slots 396, 398, 400 and 402, when a loose W-section 404 is assembled with other W-sections in a column or door jamb.

FIG. 19 illustrates the series of vertical slots which are provided in the inner flat plates 172 and 178 of the stiles 164 and 166 of frame 54, for mounting rail tiles, fill panel inserts, and glazing panels. Vertically elongated slots 406 and 408 are used to install rail mounts, such as the rail mounts 104 and 106 shown in FIG. 1, accepting lower brackets of rail mounts disposed on opposite sides of frame 54. Similarly located and sized slots are vertically spaced above to receive upper brackets of a rail mount. Slots similar to slots 406 and 408 are arranged to provide a total of four pairs of slots to provide two lower zones above the chair rail 86 and thus two vertical positions on each side of frame 54 for rail mounts 104 and 106.

Slots 410 and 412 are arranged in six pairs above chair rail 86 for mounting up to three opaque fill panels or inserts on each side of frame 54, as illustrated in the left hand frame 128 in FIG. 3.

Slots 414 and 416 are arranged in six pairs above chair rail 86 so that glazing panels may be positioned in any or all of the three zones above the chair rail 86, again as illustrated relative to frame 128 in FIG. 3. Glazing panels are centered within the depth D of the frame, instead of being mounted back-to-back, as are the opaque panels.

Slots 418, 420, 422, 424, 426, 428, 430 and 432 are provided between the chair rail 86 and base rail 84 provide room for one opaque panel mounting channel on each stile which supports two back-to-back opaque panels, or one glazing channel on each stile which supports one glazing panel. Since there is room in FIG. 19 below chair rail 86 to show both the upper and lower slots of associated pairs, they clearly illustrate how the vertically spaced pairs of slots above the chair rail 86 are used. For example, slots 418 and 422 are used to support an upper end of an opaque panel mounting channel, and slots 420 and 424 are used to support the lower end of the same mounting channel. Upper slots 426 and 428 support the upper end of a glazing channel, and slots 430 and 432 support the lower end of the same glazing channel.

Immediately below the chair rail 86, a large rectangular opening 434 is provided to enable electrical wiring at work surface height to pass from frame to frame, and/or between a column and a frame.

Figure 7:
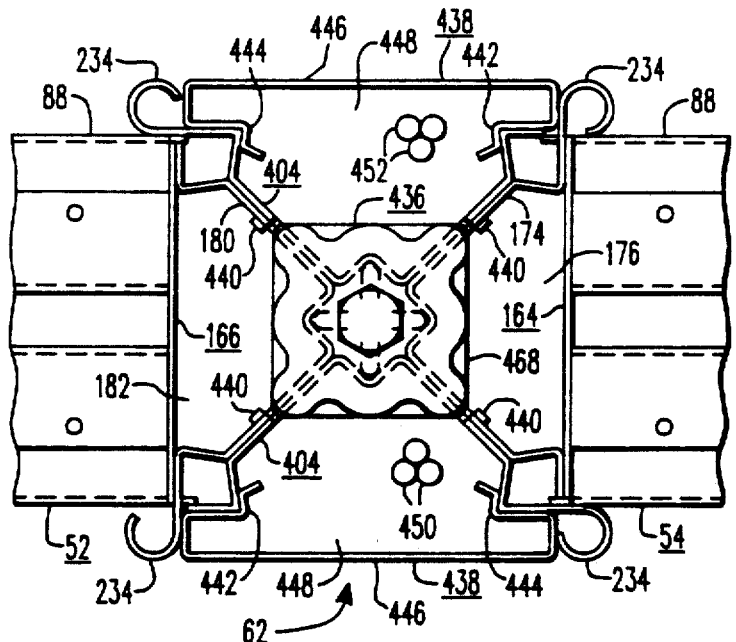
FIG. 7 is a top plan view of a column formed by a two-way straight connection between two frames, two W-shaped fill pieces, two column covers, and a connector which aligns and rigidly holds the frames together.
Figure 8:
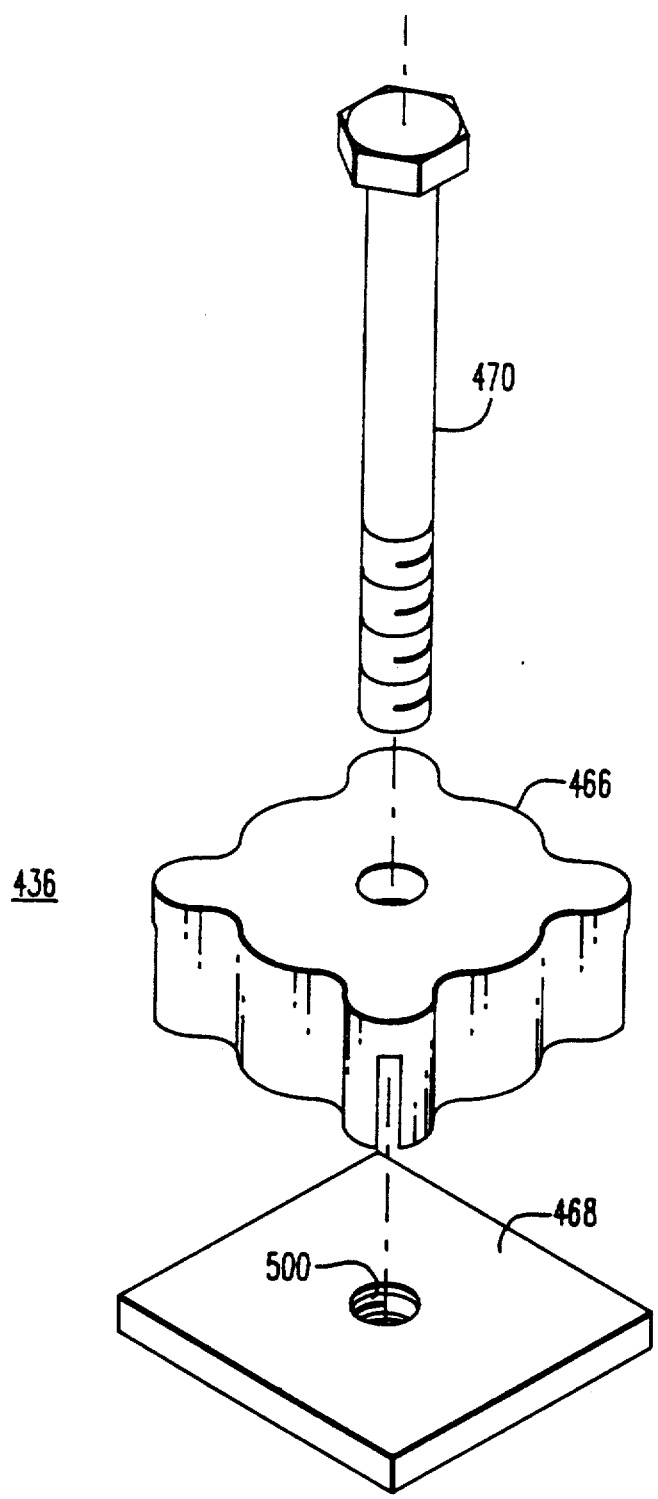
FIG. 8 is an exploded perspective view of the frame connector shown in FIG. 7, clearly illustrating the three parts thereof.
Figure 9:
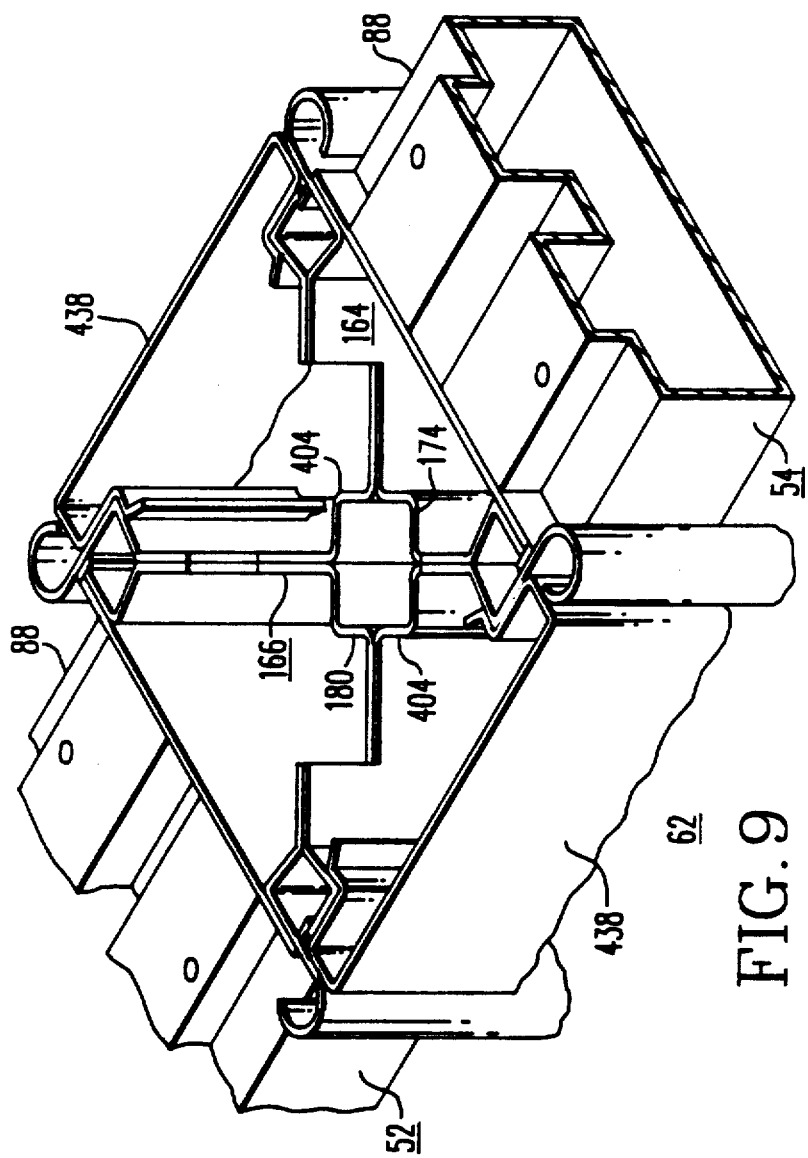
FIG. 9 is a fragmentary perspective view of the two-way connection shown in FIG. 7, without the frame connector.

Referring now to FIGS. 7, 8, 9 and 10 there is shown how an enlarged column is formed in a two-way intersection between frames. FIG. 7 is a plan view of column 62 shown without the cornice 72, FIG. 8 is an exploded perspective view of a three-part frame-to-frame connector 436 shown in FIG. 7, FIG. 9 is a perspective view of column 62, shown without frame connector 436, and FIG. 10 illustrates the same perspective view of the frames as shown in FIG. 9, with loose W-sections 404 and column covers 438 exploded away from the frames.

Column 62 is formed by the W-sections 180 and 174 of stiles 166 and 164 of frames 52 and 54, two loose W-sections 404, and two column covers 438. Each loose W-section 404 is provided with down turned tab hooks 440 which engage slots 396, 398, 400 and 402 of W-sections 174 and 180. Thus, loose W-sections 404 may be quickly and readily secured to the opposed W-sections 174 and 180. Once the loose W-sections 404 and the W-sections 174 and 180 of the frames are in approximately the desired assembled relation, three frame-to-frame connector assemblies 436 are used to force alignment of cornice height frames and to rigidly hold this alignment. As hereinbefore stated, with the cornice height frames, three connector assemblies 436 are used, one each at the tops and bottoms of the frames, and one at an intermediate position. The edge curls 234 of the loose W-sections 404 and of the two frame-associated W-sections extend outwardly from the major side planes 202 and 204 of the frames, they strengthen the column and ensure proper assembly, they receive fastener inserts for cornice parts on cornice height frames, they receive column caps 464 shown in FIG. 20 on lower height frames, and they function as three dimensional edge reveals at the column and insert edges in addition to pleasingly adding to the esthetics of the columns.

After the three frame connector assemblies 436 are positioned and secured, column covers 438 are snapped on to the loose W-sections 404. Each column cover 438 has a pair of flexible legs 442 and 444 which are flexed by shoulders formed by bends 194 and 232 as the column covers are snapped into position on the column. The outer surface 446 of cover 438 of the column covers 438 is substantially flush with a plane disposed tangent to the laterally projecting edges of the edge curls 234, defining vertically extending interior passageways 448 which are larger than the hollow openings 176 and 182 defined by the stiles 164 and 166. Thus, communication and power wiring 450 and 452 may be easily laid into the large passageways or wire ways 448 before the column covers 438 are snapped into position, providing electrical and communication service between the cornice 72, work surface height requirements, and base requirements of the system 50. The somewhat smaller openings 176 and 182 may also be used as wire ways for wiring, if desired.

Figure 11:
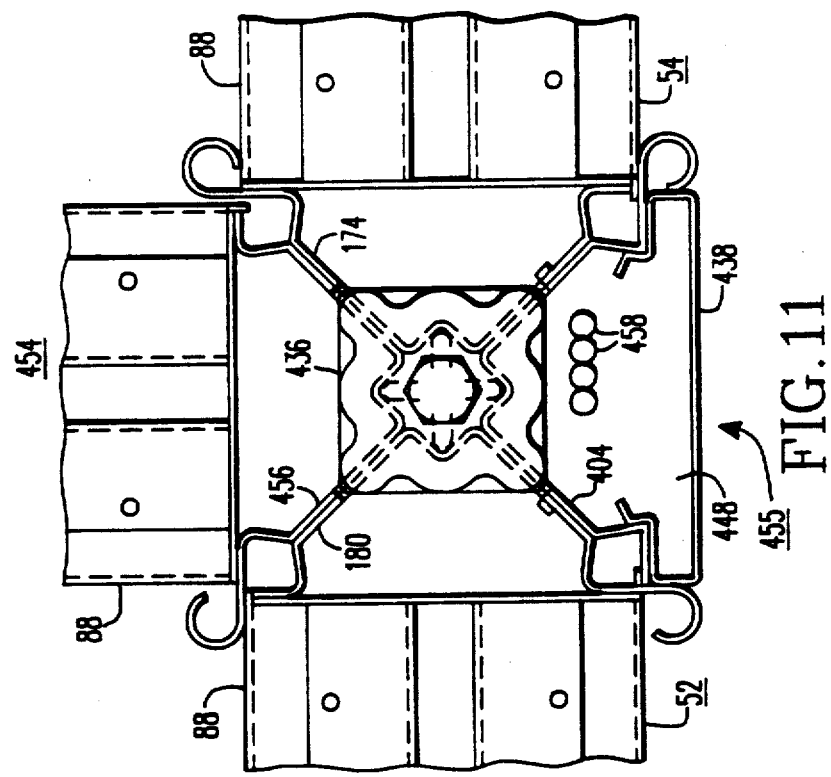
FIG. 11 is a top plan view of a column similar to that of FIG. 7 except formed by a three-way connection between three frames, one W-shaped fill piece, one column cover, and a connector which aligns and rigidly holds the three frames together.

FIG. 11 is a plan view similar to that of FIG. 7, except illustrating a three-way frame connection in which a frame 454 is added to the intersection of the frames 52 and 54 shown in FIGS. 7, 9 and 10 to form a column 455. One of the loose W-sections 404 and one of the column covers 438 are simply replaced by the W-section 456 of the new frame 454. Only one enlarged wireway 448, illustrated with wiring 458, is created in a three-way frame connection.

Figure 12:
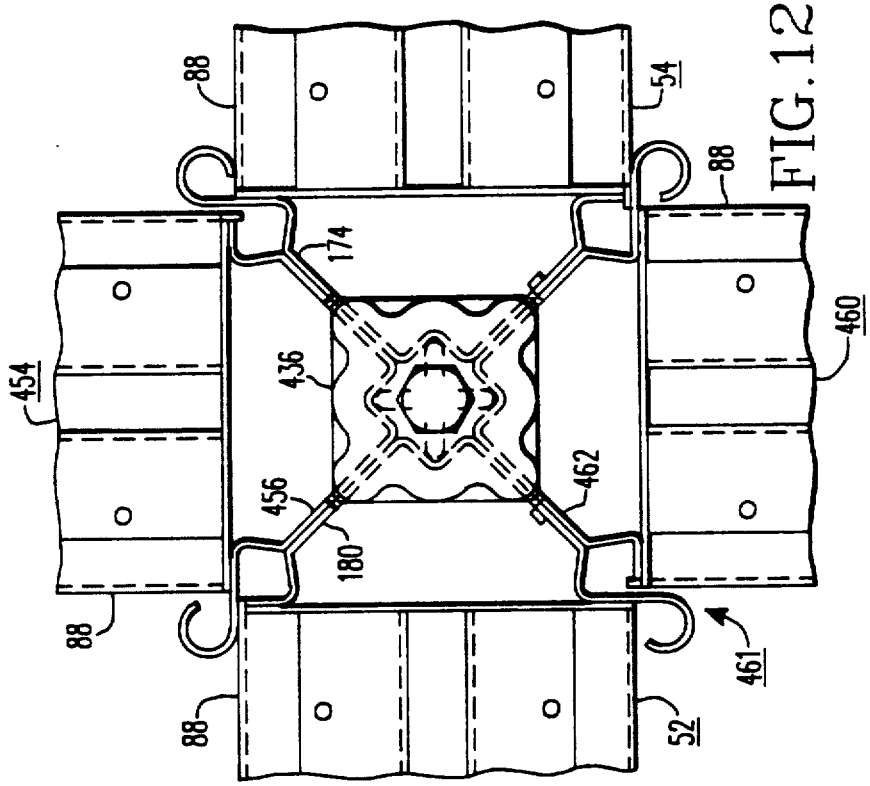
FIG. 12 is a top plan view of a column formed by a four-way connection between four frames, and a connector which aligns and rigidly holds the four frames together.

FIG. 12 is a plan view similar to that of FIG. 11, except illustrating a four-way frame connection in which a frame 460 having a W-section 462 is added to the intersection of frames 52, 54 and 454 to form a column 461. With a four-way intersection of frames, no loose W-sections 404 or column covers 438 are required. No enlarged wire-ways are created in a four-way frame intersection, but the smaller wire-ways may be used to carry communication wire and power wiring vertically in the system.

As shown in FIG. 8 the frame connector 436 is a three-part clamping assembly, including a wedge clamp member 466, a tapped hole tie plate 468, and a tie bolt 470. FIG. 13 is an elevational view of column 62 with the column cover 438 removed to more clearly illustrate clamping assemblies 436 in upper and intermediate locking positions. FIG. 14 is a section taken between and in the direction of arrows XIV—XIV in FIG. 13, illustrating how adjoining walls of the W-sections are held tightly together by the wedge clamp member 466. FIG. 15 is a plan view of the end of the wedge clamp member 466 which has openings for receiving the walls of the W-sections. FIG. 16 is an elevational view of wedge clamp member 466. FIGS. 17 and 18 are sections through wedge clamp member 466, taken between arrows XVII—XVII and arrows XVIII—XVIII in FIG. 15.

More specifically, as shown in FIGS. 16 and 18, wedge clamp connector 466 has a longitudinal axis 472, a relatively thin wall portion 474 which extends transverse to axis 472 which has first and second sides 478 and 480, and a central opening 476 which extends between sides 478 and 480 for receiving tie bolt 470. Side 478 is flat while side 480 has four W-shaped wall portions 482, 484, 486 and 488 and four locating fingers 490, 492, 494 and 496 extending outwardly therefrom. The outwardly extending arms of the W-shaped wall configuration are spaced apart and they converge towards one another as they approach side 480 of wall portion 474, forming wedge shaped slots having a spacing at their closest point 498, shown in FIG. 17, equal to the width of two wall thicknesses of the W-sections being joined.

As shown relative to the upper clamping assembly 436 in FIG. 13, after the four W-sections of a column are assembled close to their desired positions, the wedge clamp connector 466 is placed over the adjoining walls of the W-section. The tie plate 468, which is a square metallic plate having a centrally located tapped opening 500, is placed in the opening formed by the aligned slots 372. The tie bolt 470 is dropped through the opening 476 in the wedge clamp connector and it is threadably engaged with tapped opening 500 in tie plate 468. Turning the tie bolt 470 pulls the W-sections and their associated frames into horizontal alignment and the desired angular relationship as the edges 369 are forced to seat at point 498 of the wedge clamp connector. The same clamping operation is then performed via a second assembly 436 at the intermediate location of column 62 indicated in FIG. 13, and also via a third assembly 436 at the bottom of the column 62.

As shown in FIG. 14, the right angle notch walls 220 of each W-section are lined up to form a perfect square. The miter walls of the W-sections are brought into tightly abutting relation by the wedge-shaped slots or grooves formed between adjacent W-shaped walls of the wedge clamp connector 466, such as the wedge shaped slot 502 shown in FIG. 17, which has the hereinbefore mentioned seating point 498. The same identical direct and rigid connection is made whether or not one or more of the W-sections are loose W-sections 404. The described connecting arrangement enables the co-operatively formed miter columns to be quickly assembled and/or disassembled, and the frames to be connected together to form any desired office plan layout of system 50.

As shown in FIG. 19, work surface 114 is supported by a plurality of brackets, such as bracket 116. Bracket 116 includes a hook plate 504 having a down turned edge which is inserted into opening 320 shown in FIG. 19A and hooked over shoulder 256. The bottom of bracket 116 may have a piece of cork or other resilient material disposed between the bracket and base rail 84, such as indicated generally at 506. A threaded hub internal to the bottom of bracket 116 includes a screw 508 which is used to secure an anti-dislodgement clip 510 after the upper hook plate 504 is positioned over shoulder 256. Clip has an upwardly turned edge which enters groove 260 to firmly secure bracket 116 to the base rail 84. A cantilever strut 512 is fixed to the upper end of bracket 116, which extends outwardly to support the work surface 114 when no pedestal is provided for such support. When a pedestal is provided, such as for a bullet shaped work surface, a right angle member is fixed to bracket 116, which has a relatively short horizontally oriented upper leg to which work surface 114 is secured, compared with the long cantilever strut 512.

As illustrated in FIG. 19, the rear edge 514 of work surface 114 is spaced outwardly away from the edge curls 234, enabling work surface 114 to easily span a column, as illustrated in FIG. 1. The clearance between edge 514 and frames also enables ready wiring access from the work surface height power outlets 98, or from the columns themselves, to pass behind the work surfaces. A wire containment trough may be fastened below work surface 114 adjacent to the spacing, to enable wires of electrical devices used on the work surface to be placed out of sight.

Figure 20:
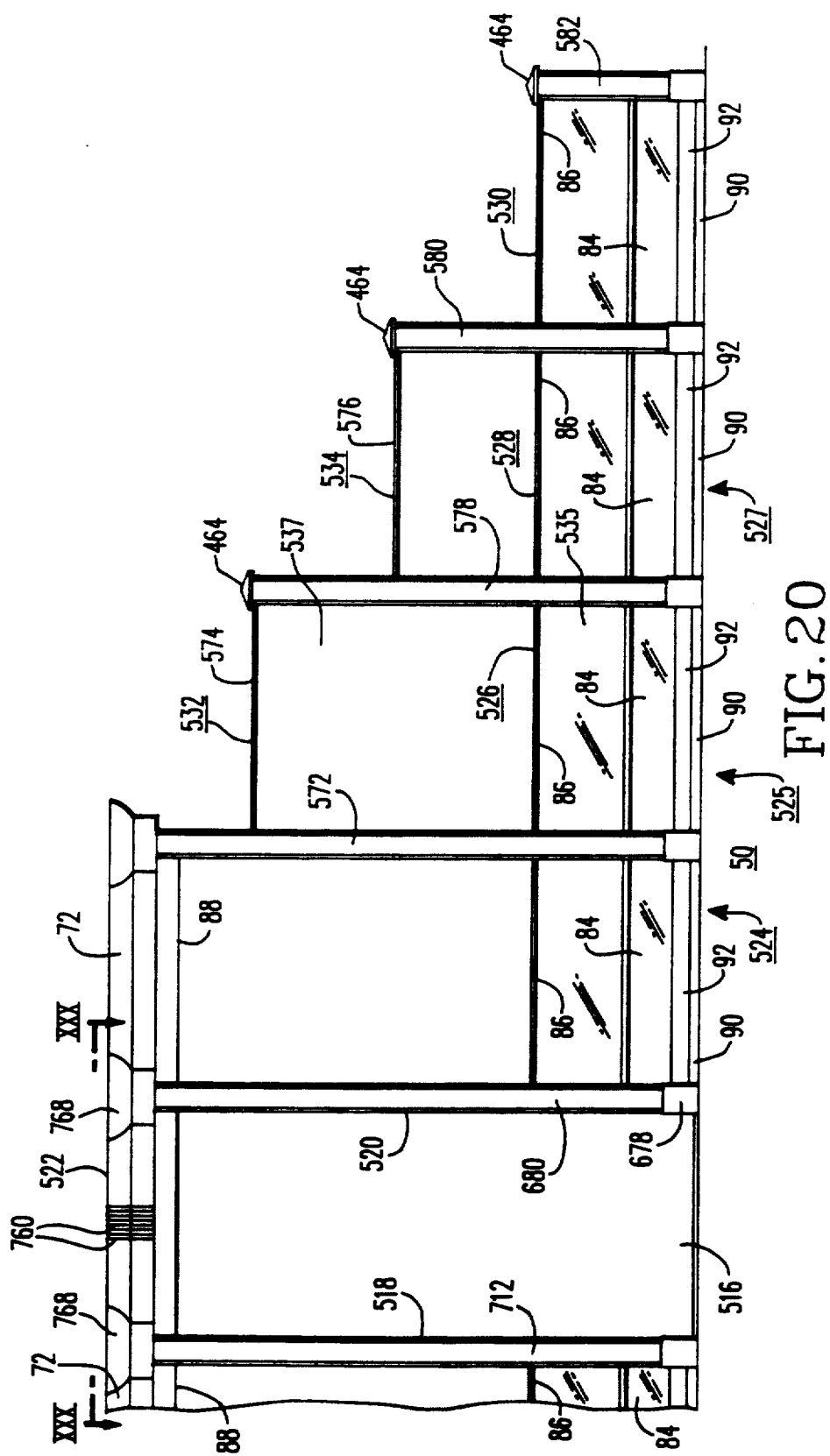
FIG. 20 is an elevational view of the office space dividing system, without fill, illustrating various heights below cornice height which may be obtained by using base frames and add-on frames.

Referring now to FIG. 20, there is shown another embodiment of space dividing system 50. In the embodiments described to this point the frames utilized have been cornice height frames. FIG. 20 illustrates an embodiment having frames at less than cornice height. At the left hand side of FIG. 20 there is illustrated a cornice height entryway 516 which includes columns or finished ends 518 and 520 and an overhead spanning cornice 522. Next adjacent the entryway 516 is a cornice height frame 524, as hereinbefore described.

Adjacent to and connected to the cornice height frame 524 are first, second and third frames 525, 527 and 530. Frames 525 and 527 are composite frame assemblies constructed of low or base frames 526 and 528, respectively, with base frames 526 and 528 having add-on frames 532 and 534, respectively. Frame 530 is a base frame with no add-on frame.

Base frames 526, 528 and 530 are identical to a cornice height frame from the base rail 84 up to and including the chair rail 86, and the same reference numerals are used to identify those components of the base frame. The stiles of the base frames 526, 528 and 530 are also the same as the stiles 164 and 166 of the cornice height frames except they terminate at the chair rail 86.

Figure 21:
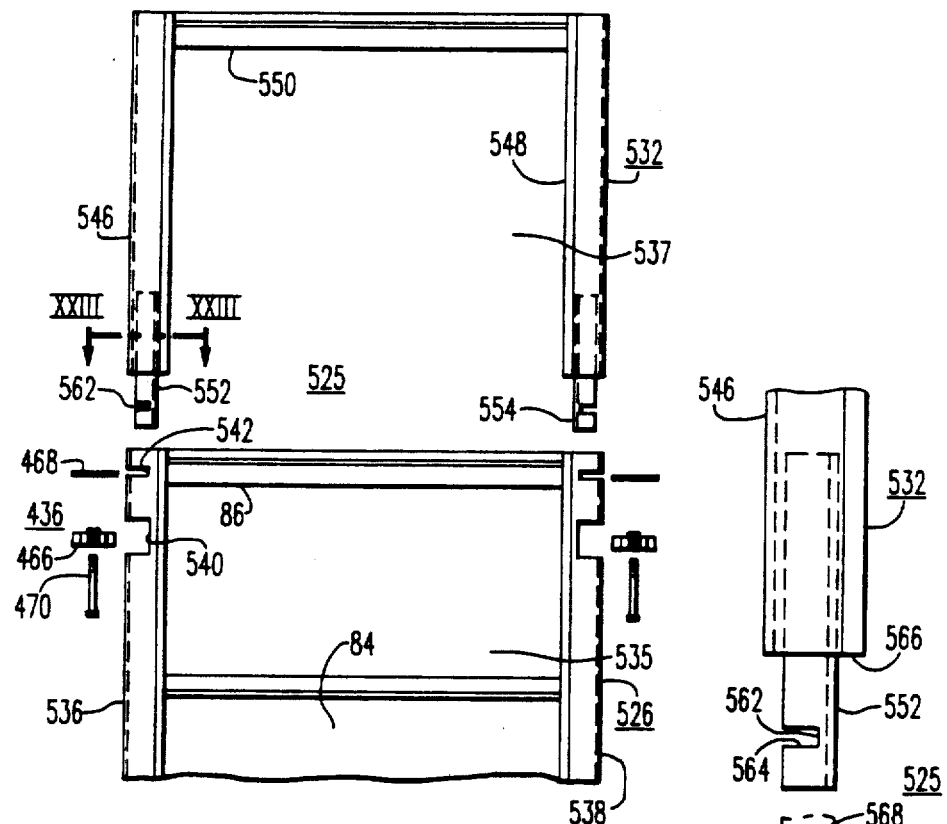
FIG. 21 is an exploded elevational view illustrating a base frame and an add-on frame.
Figure 22:
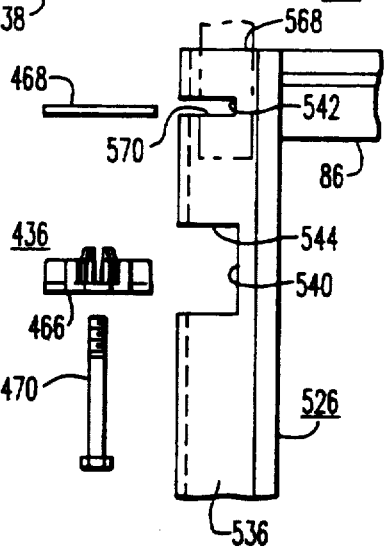
FIG. 22 is an enlarged fragmentary exploded view of a connection between a base frame and an add-on frame.

FIG. 21 is a fragmentary exploded view of composite frame 525, with composite frame 527 being of similar construction. Base frame 526 includes first and second upstanding stiles 536 and 538 which have W-shaped miter portions which are identical in cross section to stiles 164 and 166 of a cornice height frame, and horizontal base and rails 84 and 86, respectively, which extend between the stiles. Base frame 526 defines a rectangular frame opening 535. Each stile, such as stile 536, which is more clearly shown in FIG. 22, includes a wedge clamp connector slot 540 and a smaller slot 542 spaced above a clamping edge 544 of slot 540.

Figure 23:
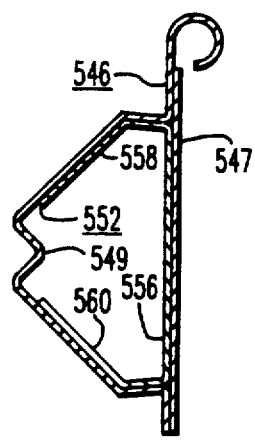
FIG. 23 is a further enlarged horizontal section taken between and in the direction of arrows XXIII—XXIII in FIG. 21.

The add-on frame 532 includes first and second stiles 546 and 548. As indicated in a cross sectional view of stile 546 in FIG. 23, which is taken between and in the direction of arrows XXIII—XXIII in FIG. 21, stile 546 includes an inner vertical plate 547 and a miter or W-section 549, identical to the stiles 164 and 166 of a cornice height frame. Add-on frame 532 further includes a top rail 550 which extends between stiles 546 and 548, with the top rail 550 being identical to the top rail 88 of a cornice height frame.

Stiles 546 and 548 include bayonet extensions 552 and 554, respectively, which are fixed within the lower tubular ends of stiles 546 and 548. As illustrated in the cross sectional view of stile 546 in FIG. 23, the bayonet extension 552 may be substantially channel shaped, having a web or bight 556 and first and second leg portions 558 and 560 which closely abut the interior of plate 547 and W-section 549. Bayonet extensions 552 and 554 may be welded to stiles 546 and 548 of add-on frame 532 to be rigid extensions thereof.

The depending exposed portions of the bayonets, such as bayonet 552, include an outwardly directed horizontal slot 562. The lower edge 564 of slot 562 is spaced from the lower end 566 of stile 546 by a distance which is slightly less than the distance from the top 568 of base frame stile 536 and the lower edge 570 of the tie plate receiving slot 542.

Add-on frame 532 is assembled with base frame 526 by inserting the bayonets 552 and 554 into the open tubular upper ends of stiles 536 and 538, such as upper end or top 568 of stile 536, cooperatively forming a rectangular frame opening 537 above chair rail 86.

When frame 525 is assembled with frame 524, slots 540 and 542 of base frame 526 are respectively aligned with slots 378 and 386 in stile 166 of frame 524, as well as with like slots in loose W-sections 404 used to complete the resulting column 572. A tie plate 468 of the hereinbefore described frame-to-frame connector assembly 436 is inserted into the aligned upper slots, which includes slot 542, the wedge clamp 466 is placed on the clamping edges of the aligned lower slots, which includes edge 544 of slot 540, and a tie bolt 470 is inserted through the wedge clamp 466 and into threaded engagement with tie plate 468. As the tie bolt 470 is tightened, the tie plate will bear against the lower edge 564 of notch 562 of the add-on frame 532, drawing the add-on frame 532 downwardly so that the lower end 566 of stile 546 butts tightly against the upper end 568 of base frame stile 536.

Thus, clamping assembly 436 simultaneously clamps one stile of add-on frame 532 to a stile of base frame 526, and it clamps composite frame 525 to frame 524. Another clamping assembly 436 would clamp the bottom of the base frame 526 to the bottom of frame 524, as hereinbefore described relative to connecting cornice height frames together. When composite frame 525 is attached to composite frame 527, another clamping assembly 436 will simultaneously fix the remaining end of add-on frame 532 to base frame 526, fix one end of add-on frame 534 to base frame 528, and fix composite frame 525 to composite frame 527. Should a composite frame be located at the end of a run, an end column would be constructed of the end stile and three loose W-sections 404 of appropriate height, and a clamping assembly 436 would simultaneously clamp the add-on frame to the base frame, and clamp the loose W-sections 404 to the stile.

The only difference between the add-on frames 532 and 534 in FIG. 20 is their height. Add-on frame 534 extends approximately one-third of the height of a cornice height frame above the chair rail 86, while add-on frame 532 extends two-thirds. The tops of the two add-on frames correspond generally to the three zones for the panel or glazing inserts above the chair rail 86 as illustrated at the left hand side of FIG. 3.

Add-on frames 532 and 534 may be provided with covers 574 and 576, respectively, on top of the upper rail 550. The exposed upper ends of the shorter columns 578, 580 and 582 are provided with column caps 464. Column caps 464 may have downwardly projecting dowels which snugly fit into the open upper ends of the edge curls 234 of the stiles; or, they may be secured by fasteners which include threaded inserts 584 shown in FIG. 4.

Figure 24:
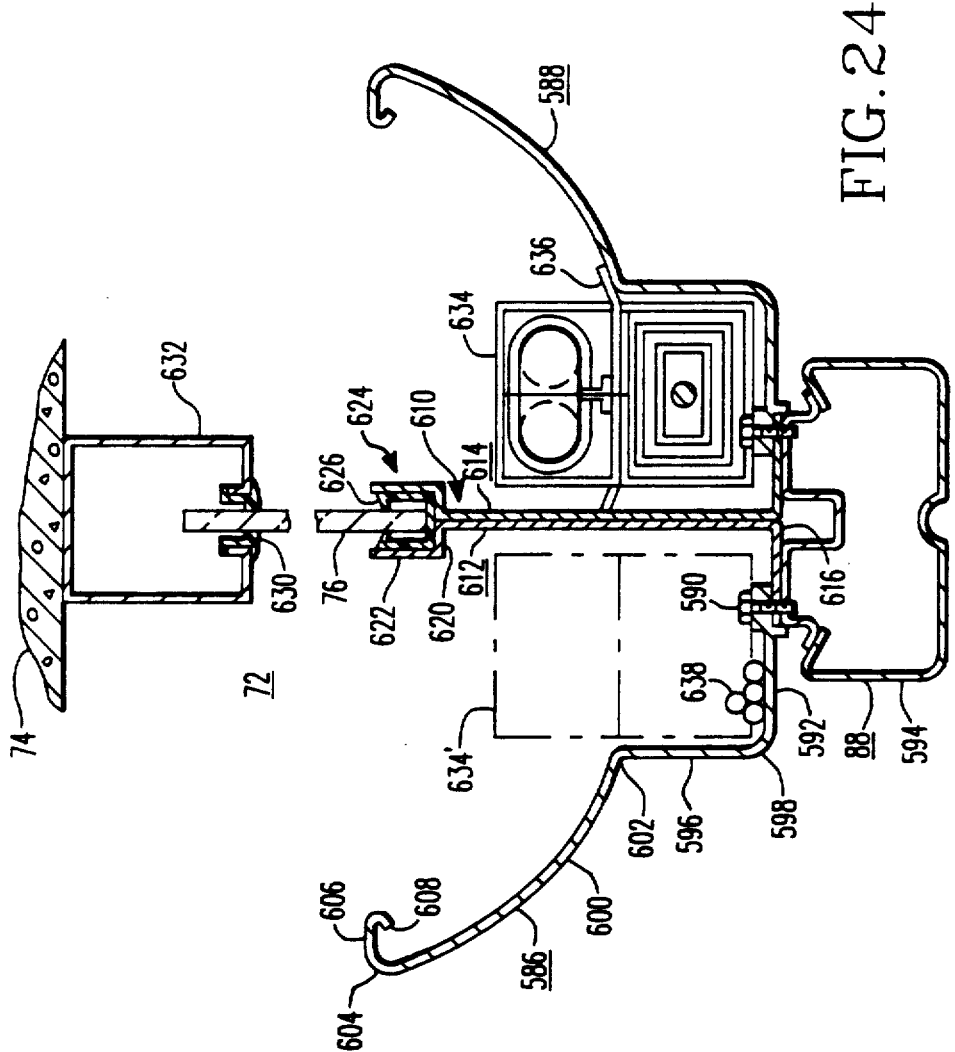
FIG. 24 is an enlarged transverse section of a cornice illustrating an ambient lighting fixture, a clerestory extension, and electrical and/or communication wiring.
Figure 25:
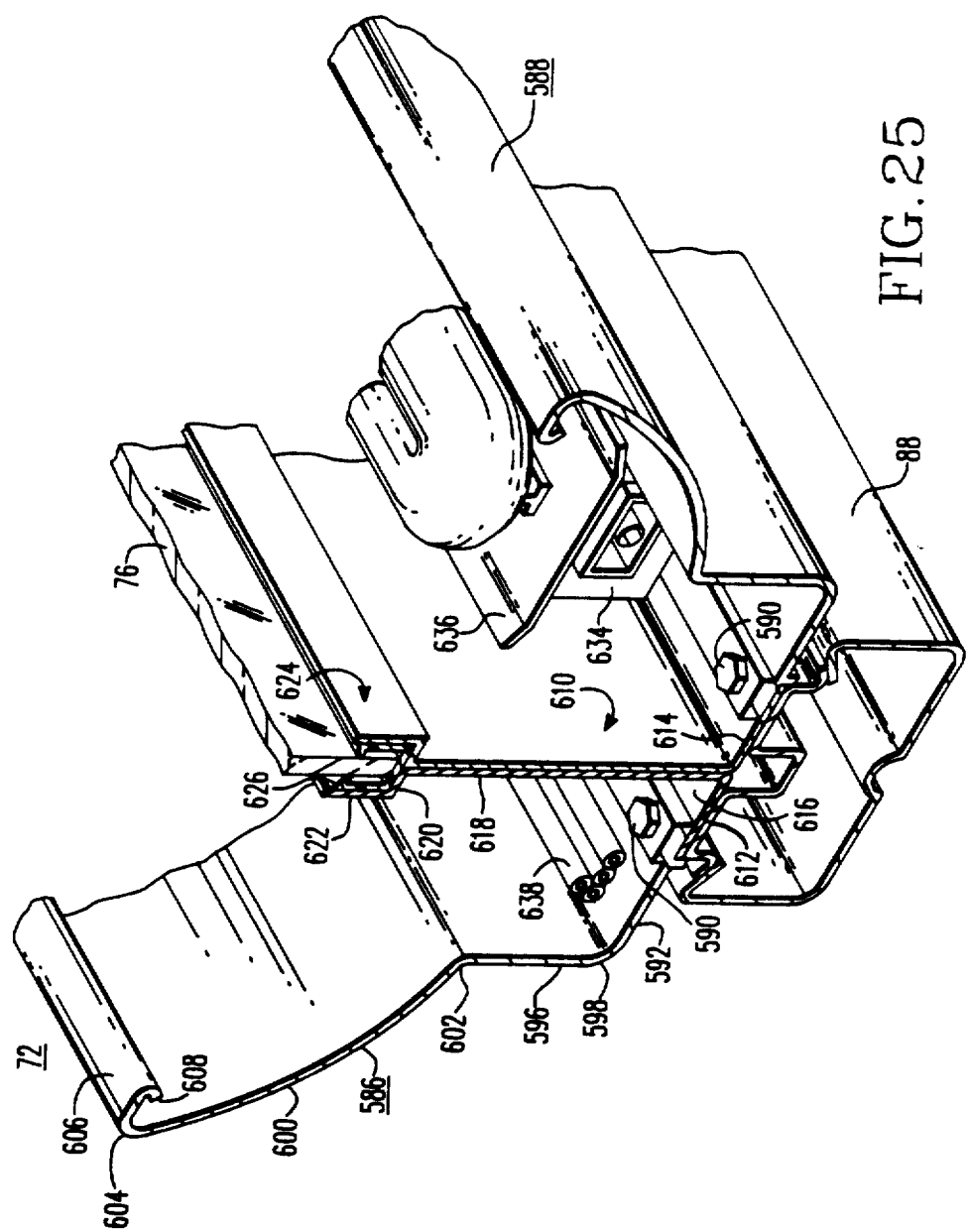
FIG. 25 is a fragmentary perspective view of the cornice shown in FIG. 24.

FIG. 24 is a cross sectional view of the enlarged cornice 72 shown in FIG. 1, and FIG. 25 is a fragmentary perspective view of a vertical section taken through cornice 72. Cornice 72 includes first and second elongated light seals 586 and 588 which are secured by a plurality of spaced fasteners 590 to top rail 88. Light seals 586 and 588 are of like construction, and thus only light seal 586 will be described in detail. Light seal 586 includes a horizontal bottom wall 592 which extends laterally beyond the face 594 of top rail 88 to an upstanding wall 596 via a right angle bend 598. At the end of vertical wall 596, light seal 586 includes a slightly concave wall portion 600 which flares outwardly and upwardly from wall 596 via a bend 602 which starts wall portion 600 at an angle of about 135 degrees from wall 596. At the upper end of wall portion 600 light seal 586 curves sharply inward via a curved portion 604 to an in-turned flange 606 which terminates in a folded edge 608.

Cornice 72 may be provided with a center septum 610 which is formed by first and second right angle members 612 and 614 which are of like construction. As best shown in FIG. 25, right angle member 612 includes a horizontal first leg member 616 which is secured to top rail 88 via the same fasteners 590 used to secure light seal 586 to top rail 88. Right angle member 612 includes a vertical second leg member 618 which extends upwardly to a short wall 620 which extends horizontally outward from vertical leg member 618. Short wall 620 terminates in a short vertical wall 622. When right angle members 612 and 614 are disposed back-to-back, the short walls 620 and 622 cooperatively define an upwardly open channel 624.

Channel 624 includes a seal 626 for receiving the lower edge of a panel such as the clerestory window pane 76 illustrated in FIG. 1. The upper edge of clerestory 76 extends through a seal 630 into a channel 632 secured to ceiling 74. When complete privacy is not required or desired, cornice 72 may be constructed without septum 610 and the associated clerestory 76.

An important feature of the cornice 72 is the ambient lighting provided by a modular lighting system having a plurality of lighting fixtures 634, which are concealed within the cornice when viewed from below, but which provide a pleasing distribution of light below the cornice 72 by reflection from ceiling 74. The modular lighting system uses a three-wire circuit that connects the lighting fixtures 634 together, one to the next, and the modular lighting system is mounted above each modular frame of 4 foot, 5 foot and 6 foot frame modules. In a preferred embodiment, low voltage switching is installed in the columns which provides individual control of a pattern of ambient lights, column lights, or pendant lights within an office. When a septum 610 is used, the lighting fixtures may be disposed on either side thereof, as indicated by the phantom outline of a light fixture 634', as the light from the fixtures will be transmitted through the clerestory 76. Fixture 634 may include a light reflector 636 which bridges the associated light seal 588 from the septum 610 to the lower end of concave wall portion 600. The adjoining surfaces of septum 610 and the inner surface of the concave wall portion 600 may be light reflective so that light from the fixtures 634 is directed upwardly to the ceiling 74 over a substantial area. The concave shape of wall portion 600 insures that light will reflect through the clerestory 76 and provide ample lighting on both sides of cornice 72.

Another important feature of cornice 76 is its ability to carry large amounts of horizontal wiring, indicated generally at 638, which moves through system 50 above door or entryway height. Wiring 638 may include communications wiring, wiring for the lighting fixtures 634, and power wiring for supplying the electrical requirements of the users of system 50, as required by a specific application of space dividing system 50. Wiring 638 may pass through suitable openings in septum 610 to avoid ambient lighting fixtures 634, such as when the lighting fixtures are staggered from side to side. When septum 610 is not used, the lighting fixtures 634 may be centered in the cornice 72, providing room on both sides of the lighting fixtures for accommodating wiring.

FIGS. 26 and 27 illustrate cornice 72 above a column, such as column 62 shown in FIG. 1. Cornice fillet lighting seals 640 and 642 are provided with the same sectional configuration as the lighting seals 586 and 588 disposed over the top rail 88. Fillets 640 and 642 may be secured to the top of column 62 by fasteners 644 which may engage the inserts 584 shown in FIG. 4, which are wedged into the top of the edge curls 234.

FIGS. 26 and 27 also illustrate a power column 646 supported on top of column 62, which may be employed to pass wiring from an electrical feed located above the ceiling 74 to the cornice 72 and/or to column 62, as desired. Power column 646 is supported by a substantially V-shaped bracket 648 which has a flat bottom wall 650 which is secured to and supported on the wedge clamp connector 466 by draw bolt 470. Bracket 648 includes spread legs 652 and 654 which support a square frame 656 having a short vertical peripheral wall portion 658 having relatively narrow horizontal shelves 660, 662, 664, and 666 projecting outwardly therefrom. Supported on such shelves are two right angle trim covers 668 and 670 of similar construction. Each trim cover, such as trim cover 668 includes a curved center section 672 and end curved portions 674 and 676 which snap over similar curved end portions of trim cover 670. Trim covers 668 and 670 may be secured to wall 658 via a plurality of fasteners 677. The enclosure formed by the trim covers 668 and 670 projects vertically through a mounting plate 682 and an appropriate opening therein into a plenum 684 above ceiling 74. Thus, wiring, shown generally at 686 and 688 may be readily passed from above ceiling 74 to the cornice 72 and/or to the column 62 on which wiring column 646 is supported.

Covers identical to trim cover 668 may be used at the base of a column constructed of two frames disposed at right angles to one another, such as at the trim location indicated at 678 at the base of column 680 in FIG. 20.

Figure 28:
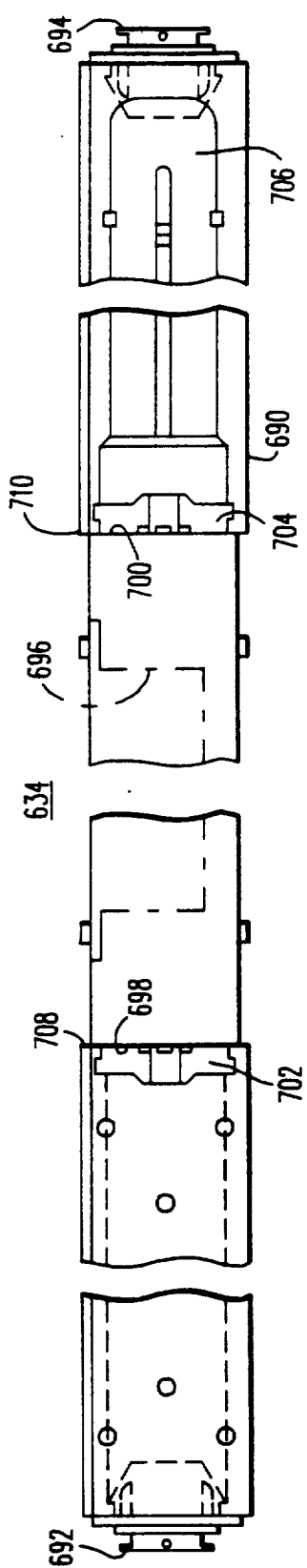
FIG. 28 is a fragmentary plan view of a lighting fixture which may be used in the cornice for ambient lighting.
Figure 29:
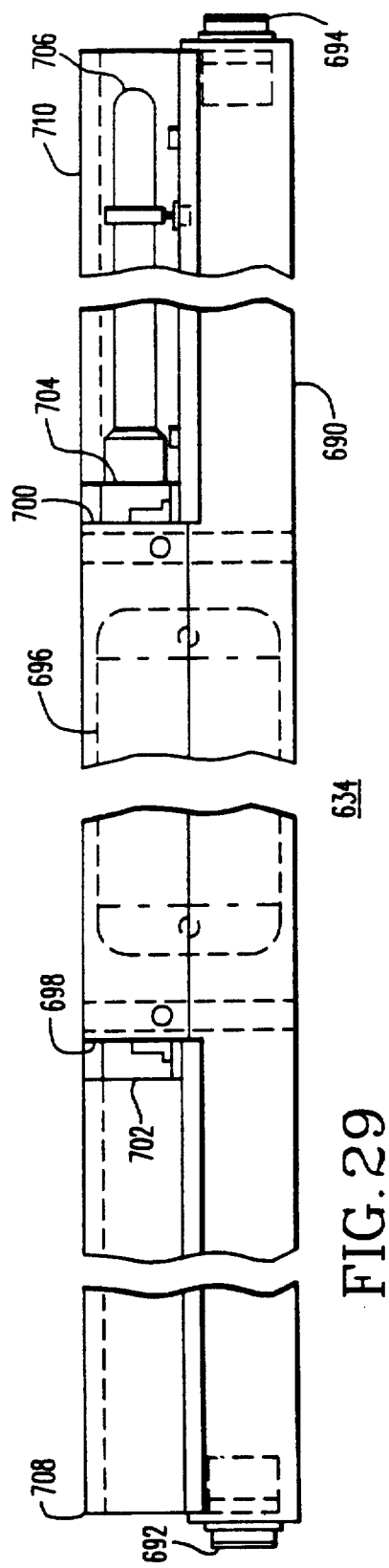
FIG. 29 is a fragmentary elevational view of the lighting fixture shown in FIG. 28.

A suitable ambient lighting fixture 634 is shown in plan and side elevational views in FIGS. 28 and 29. Fixture 634 includes a narrow elongated rectangular housing 690 having snap-in electrical receptacles 692 and 694 at opposite ends. The central portion of the housing 690 is vertically enlarged and includes a ballast 696. The enlarged central portion defines first and second vertical walls 698 and 700 on which are mounted horizontally projecting lamp holders 702 and 704. Each lamp holder, such as lamp holder 704, accommodates a U-shaped "biax" fluorescent lamp 706. A typical length of lamp 706 having a wattage of 39 watts is about 15 inches.

If desired, vertical reflectors 708 and 710 may be disposed along side each lamp so that a substantial amount of reflected light will impinge upon the concave surface of the light adjacent light seal. Lighting fixtures may be positioned anywhere along the cornice 72 on one or alternating sides of the septum 610. With the cornice lighting system of the invention, costly ceiling mounted lighting fixtures are not required.

Figure 30:
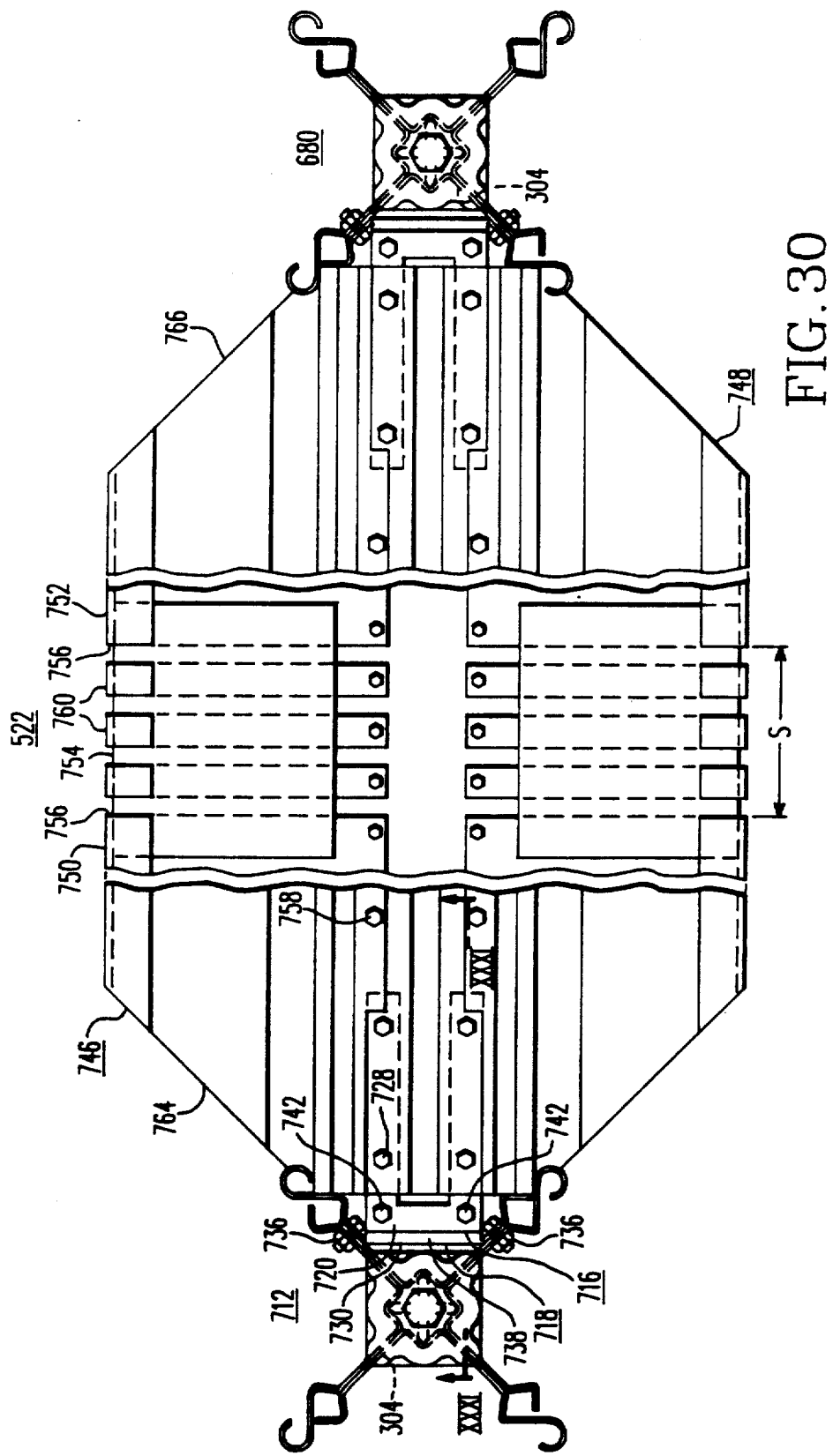
FIG. 30 is a fragmentary plan view of a spanning cornice over a passageway or corridor, taken between and in the direction of arrows XXX—XXX in FIG. 20.
Figure 31:
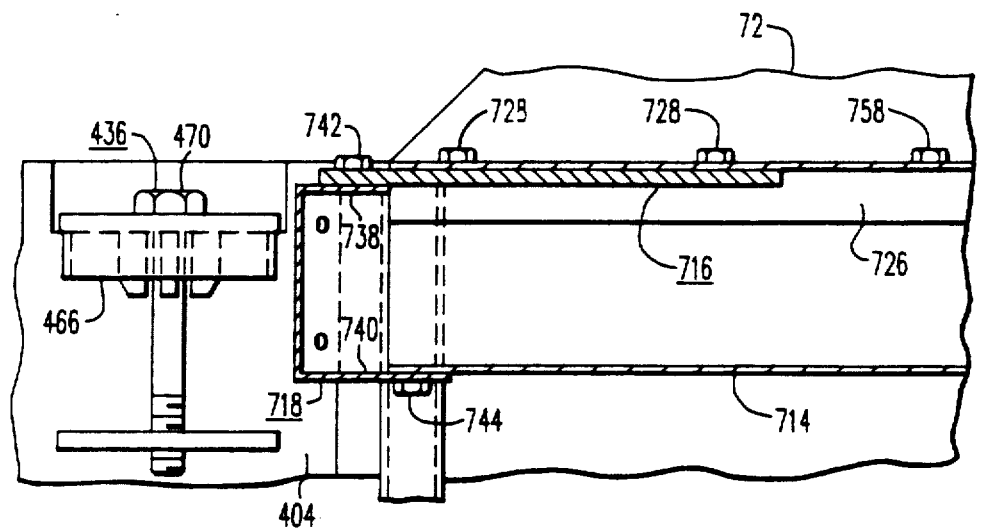
FIG. 31 is a fragmentary vertical section of the spanning cornice's column connection, taken between and in the direction of arrows XXXI—XXXI in FIG. 30.
Figure 32:
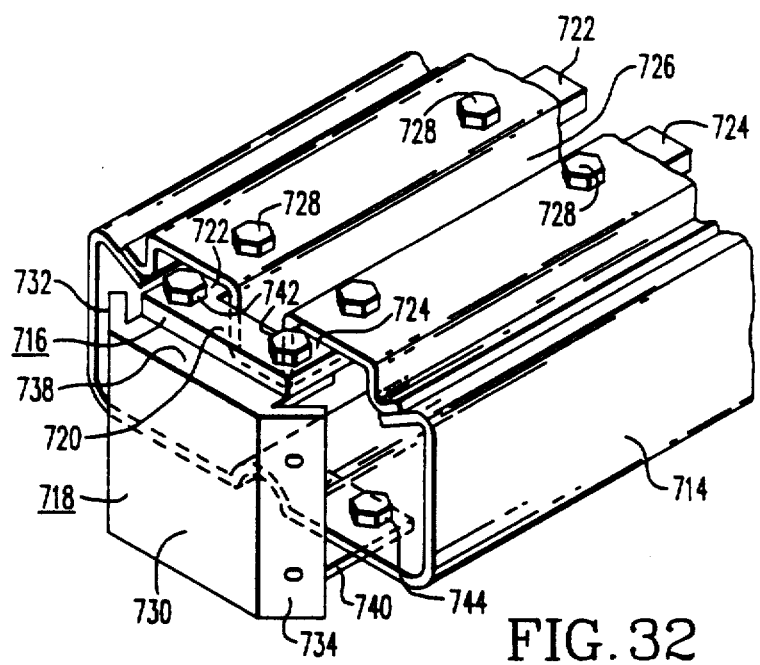
FIG. 32 is a fragmentary perspective view of the bracket shown in FIG. 31 which connects the spanning cornice to a column.

FIG. 30 is a plan view of the spanning cornice 522 shown in FIG. 20, taken between and in the direction of arrows XXX—XXX in FIG. 20. FIG. 31 is a sectional view which illustrates how spanning cornice 522 is attached to column 712, with the section being taken between and in the direction of arrows XXXI—XXXI in FIG. 30. FIG. 32 is a perspective view of the bracketry associated with the cornice to column connection.

A spanning cornice is used when a space between frames is not exactly on module. For a normal entryway or door frame, standard frames and cornices are used, and a spanning cornice is unnecessary. More specifically, a spanning cornice 522 may be used to span any two cornice height finished ends to create an entryway, it may be used to span the space from a finished end to a wall to create an entryway, and one or more may be located along a hallway for appearance and wall support, and the like.

Spanning cornice 522 includes a cornice rail 714, which is the same rail used in a basic rectangular frame 54 to form the top rail 88. Cornice rails will be available in different standard lengths, and non-standard requirements may be met by simply cutting a cornice rail to the desired length.

The support arrangement at each end of cornice rail 714 includes a flat U-shaped support plate 716 and a support bracket 718. The support plate 716 includes a bight 720 and first and second legs 722 and 724. The legs 722 and 724 are telescoped within an open end of the cornice rail 714, straddling a depending top channel 726 of the cornice rail 714. Legs 722 and 724 are fixed to the cornice beam 714 via a plurality of fasteners 728, and the bight 720 extends outwardly from the end of the cornice rail 714.

Support bracket 718 is secured to the adjacent column 712 and specifically to the W-section 304 which faces the spanning cornice 522. Support bracket 718 includes a vertical wall 730 having relatively short miter wing walls 732 and 734 which lie flat against the miter walls of W-section 304 and which are secured thereto with suitable fasteners 736. Upper and lower legs 738 and 740 project horizontally outward from vertical wall 738 of support bracket 718, with the lower leg 740 being longer than the upper leg.

After a U-shaped support plate 716 is fixed to each end of the cornice rail 714, and the support brackets 718 are secured to the columns 712 and 680, the cornice rail 714 is simply lowered on to the projecting legs of the support bracket 718, with the bottom of the cornice rail 714 resting upon the lower leg 740 and with the bight 720 of the support plate 716 resting upon the upper leg 738. The abutting parts are then fixed together, with fasteners 742 securing the bight 720 to the upper leg 738 and with fasteners 744 securing the lower leg 740 to the cornice rail 714.

Figure 33:
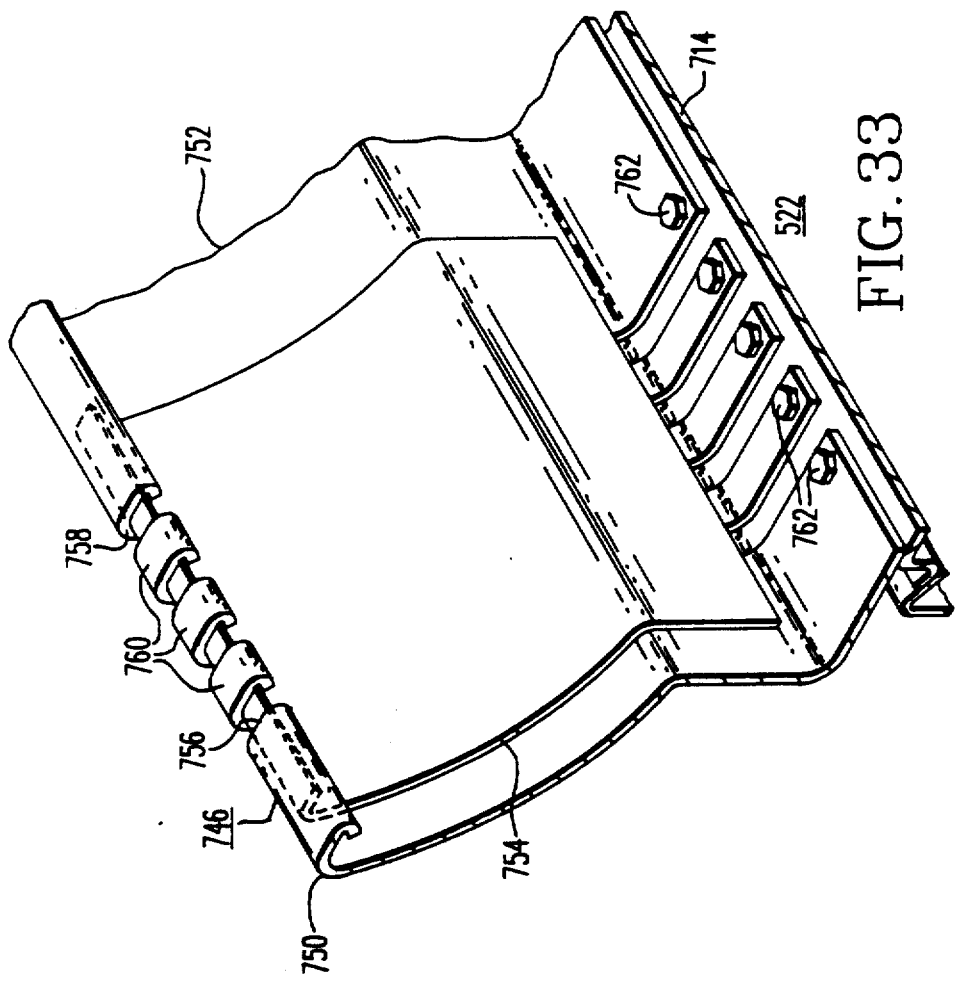
FIG. 33 is a fragmentary perspective view of one side of the spanning cornice shown in FIGS. 20 and 30, illustrating an adjustable length feature.

Spanning cornice 522 has light seals 746 and 748 mounted thereon which have the same configuration as the light seals 586 and 588. The cornice light seals 746 and 748 may be ordered to different standard lengths, and non-standard lengths may be cut to suit a particular application. FIGS. 30 and 33 illustrate an alternative light seal arrangement for a spanning cornice 522 which enables non-standard light seal lengths to be quickly obtained without cutting the light seals. FIG. 33 is a fragmentary perspective view of spanning cornice 522. Since the light seals 746 and 748 are of like construction, only light seal 746 will be described in detail.

Light seal 746 includes first and second sections 750 and 752 which are telescoped over a closely fitting internal sleeve member 754. The sections 750 and 752 are adjusted on the sleeve member 754 to approximately the length of the cornice rail 714, with the lengths of sections 750 and 752 being deliberately selected to provide a gap or spacing S between facing ends 754 and 756 of the two sections. A plurality of short standard length fill pieces 760 having the same configuration as the light seal sections 750 and 752 are then "hooked" over the sleeve 754 such that they may be uniformly spaced apart to fill the spacing S between the ends 756 and 758 of the light seal sections. The assembly is positioned on cornice rail 714, the positions of sections 750 and 752 and fill pieces 760 adjusted for uniform spacing, and then the sections and fill pieces are secured to cornice rail 714 via a plurality of fasteners 762.

The ends 764 and 766 of light seal sections 750 and 752 which are adjacent the ends of the cornice rail 714 may be mitered as illustrated in FIG. 30, to form fillet sections 768 shown in FIG. 20. The fillet sections 768 may be fixed to the threaded inserts 584 shown in FIG. 4, which are wedged into the tops of the edge curls 234. In addition, short inside and outside right angle corner light seal sections may be p ovided, as required to cause the cornice to match the configuration of system 50.

Figure 34:
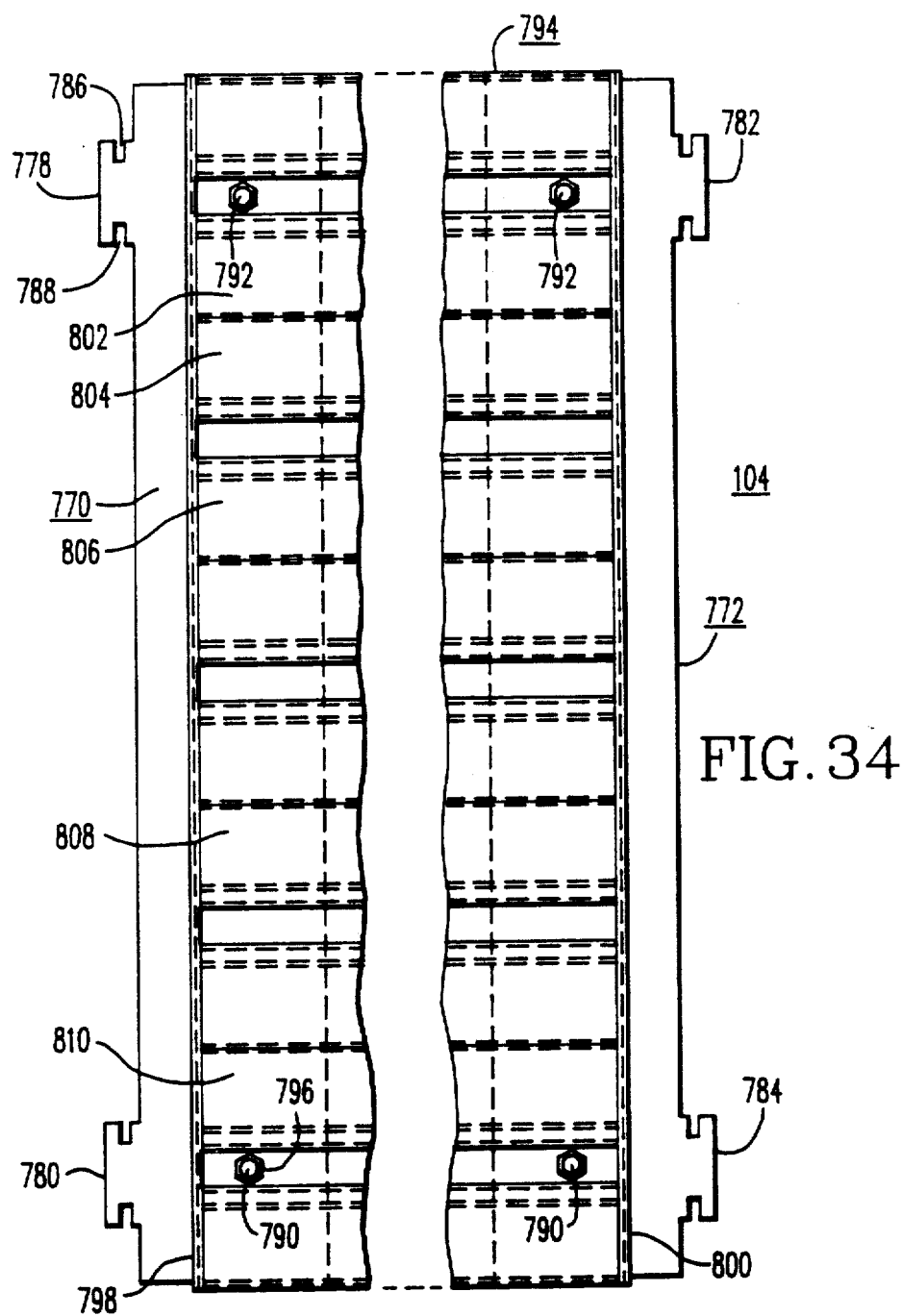
FIG. 34 is a fragmentary front elevational view of a rail tile for supporting upper accessories.
Figure 35:
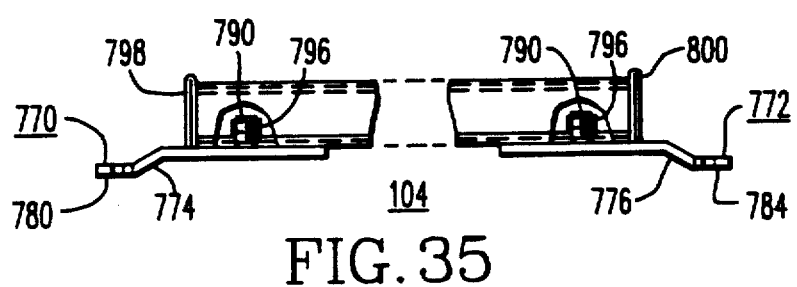
FIG. 35 is a bottom view of the rail tile shown in FIG. 34.
Figure 36:
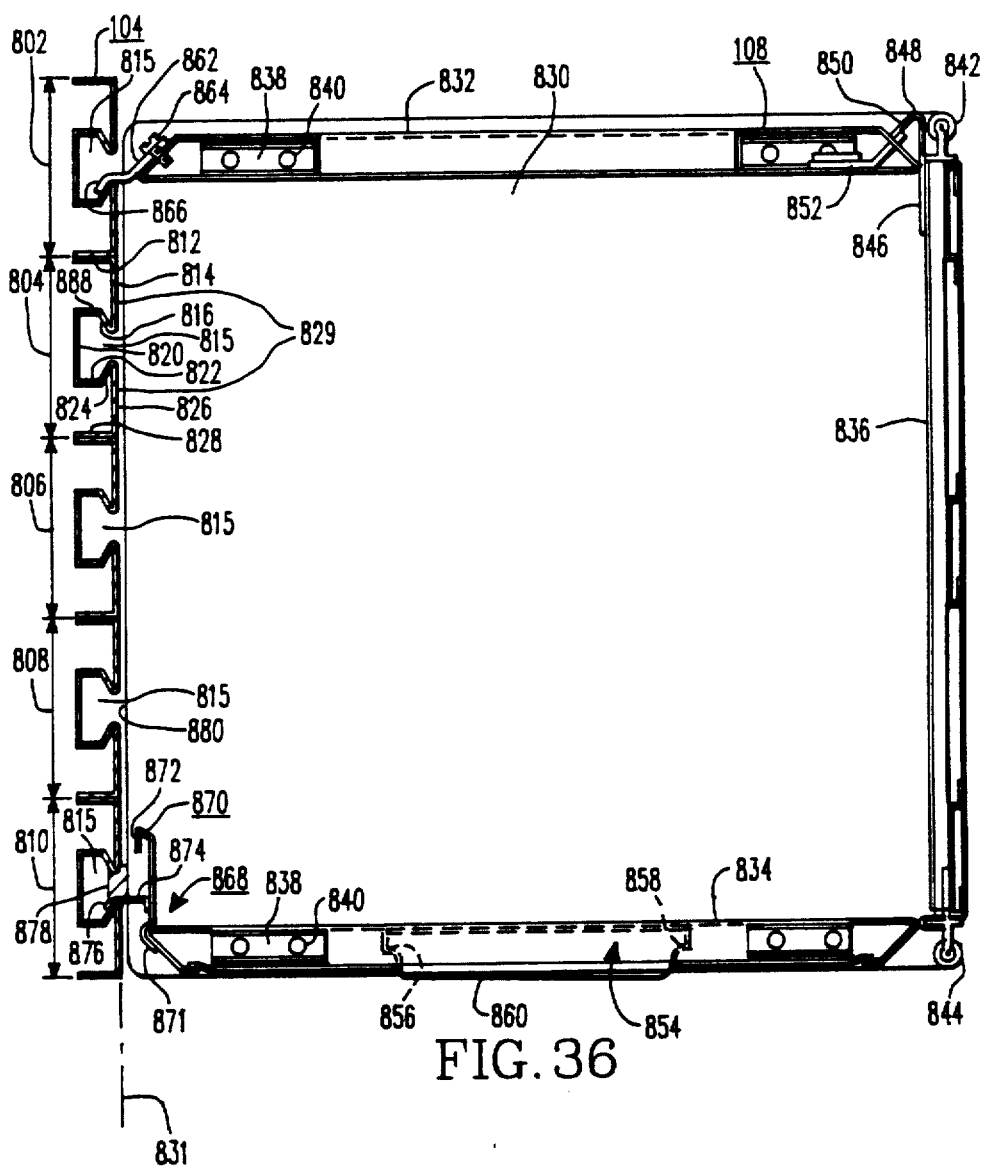
FIG. 36 illustrates a side elevational view of an upper storage unit mounted on the rail tile shown in FIGS. 34 and 35.

Rail mounts 104 and 106 shown in FIG. 1 are of like construction, with FIGS. 34, 35 and 36 illustrating rail mount 104 in detail. Rail mount 104 includes first and second upstanding elongated brackets 770 and 772 at lateral edges thereof. Brackets 770 and 772 are formed with edge offsets 774 and 776. Edge offsets 774 and 776 have symmetrical top and bottom hook projections, with edge offset 774 having hook projections 778 and 780 and edge offset 776 having hook projections 782 and 784. Hook projection 778 is a rectangular projection with rectangular notches 786 and 788 in upper and lower edges thereof, respectively. The remaining hook projections are of like construction. The hook projections are dimensioned to fit into the rail slots described relative to FIG. 19, with rail slots 406 and 408 being lower slots of the lowest of two positions which support a rail mount on opposite sides of the frame 54. Each bracket 770 and 772 includes a bottom and top forwardly projecting stud as indicated at 790 and 792, which are employed to secure the brackets to the rail mount body 794 via nuts 796.

The rail mount body 794 comprises double thickness folded end walls 798 and 800. The end walls 798 and 800 are joined by a vertical series of five sections 802, 804, 806, 808 and 810, as best shown in the side sectional view of FIG. 36. Each section, such as section 804, includes a top horizontal flange 812 which joins an upper face wall 814, the lower edge of which terminates in a box-like dovetail groove 815. Each groove 815 includes a sharply re-bent upper interior wall 816 which extends to top horizontal groove wall 818 which joins a groove back wall 820 extending downwardly to lower groove horizontal wall 822. Such lower wall joins the inclined wall 824 at the groove opening, such inclined wall then joining the bottom face wall 826 which terminates in lower horizontal flange 828. The upper and bottom face walls 814 and 816 define outwardly facing vertical surfaces 829 which are disposed in a common plane 831. The mating top and bottom flanges of the adjacent sections may be spot welded together and the sections welded to the end walls to form a unitary rail mount body 794 providing a plurality of forwardly opening box-like dovetail grooves 815.

During installation of rail mount 104 to frame 54, bracket 770 is secured to the rail mount body 794 by simply inserting the threaded studs 790 and 792 of the bracket 770 through appropriate openings in the rail mount body 794 and then tightening nuts 796. Such openings are provided in the center of the back of the top and bottom dovetail grooves 815 as illustrated in FIG. 36. The rail mount body 794 with its assembled bracket 770 is then positioned in the appropriate vertically spaced slots of one of the stiles of frame 54. Bracket 772 is then positioned in the opposite frame stile and the parts assembled so the studs of the bracket 772 project through openings in the rail mount body 794, and then nuts 796 are threadably engaged with the studs and tightened. Rail mount 104 may be positioned above chair rail 86 in either of two vertical zones. A third uppermost zone is not provided for rail mounts as accessories hanging from a rail mount in this position would be difficult to reach.

As illustrated in FIG. 36, storage cabinet 108 shown in FIG. 1 is secured to rail mount 104 via appropriate brackets and support fixtures. Cabinet 108, for example, may include vertically extending side walls, such as side wall 830, a top wall 832, a bottom wall 834, and a flip top front door 836. The top and bottom walls 832 and 834 may be secured to the side walls 830 via brackets 838 and fasteners 840.

The flip top door 836 may be provided with pulls 842 and 844 which give the top and bottom of the door 836 the same appearance. The interior of the top of door 836 is connected to leaves 846 of hinges 848, with the remaining leaves 850 of the hinges being connected to brackets 852 which are secured to the top 832 of the cabinet 108. Hinges 848 are above the plane of the top wall 832, and the brackets 852 are connected to slides which move horizontally in the top wall so that once door 836 is brought to a horizontal position it may be slid rearwardly to lie over the top wall 832.

The bottom wall 834 is provided with a recess 854 which includes rear and front shoulders 856 and 858 configured to support a lighting fixture 860.

Brackets 862 are fixed to the rear of the top wall 832 via fasteners 864 which have downwardly projecting tongues 866 which fit into the upper box-like dovetail groove 815 of the rail mount 104. A lower support 868 includes a rib 870 which embraces a chisel shaped rear edge 871 of bottom wall 834. The upper edge of rib 870 is folded over as indicated at 872, and projecting rearwardly from the rib 870. A channel shaped support 874 is located at each end, with each support 874 having a depending leg 876 which fits over the lower edge of the bottom box-like dovetail groove 815.

Cabinet 108 may thus be readily mounted on rail mount 104, with anti-dislodgement clips 878 being placed over support 874 to prevent accidental removal. The offset brackets 770 and 772 of rail tile 104 project the rear edge 880 of cabinet 108 outwardly so that the rear edge 880 clears the enlarged columns, such as column 64 in FIG. 1, when cabinet 108 is mounted in the dotted outline position in FIG. 1, spanning column 64 and supported by two rail mounts 104 and 106.

A wide variety of other upper accessories may be similarly mounted on the rail mounts. Examples of such accessories include shelves, paper storage units, bookcases, telephone pads, and lighting fixtures.

Fill options for filling in the openings in the frames below and above the chair rail 86 will now be described, with reference first to FIGS. 37, 38 and 39, which relate to removable opaque inserts. Removable opaque inserts, when desired, are mounted back-to-back within the depth or thickness dimension D of the frame, which is 3.5 inches. The enlarged columns are 4.5 inches in depth, measured in the same direction as the depth D of the frame, providing a 0.5 inch reveal. For purposes of example, the mounting of opaque panel 146 shown in FIG. 3 will be described, which is frame opening 168 defined by columns 142 and 144, chair rail 86 and base rail 84 of frame 134. An opaque panel 882 is mounted on the other side of frame 134, back-to-back with panel 146.

Figure 37:
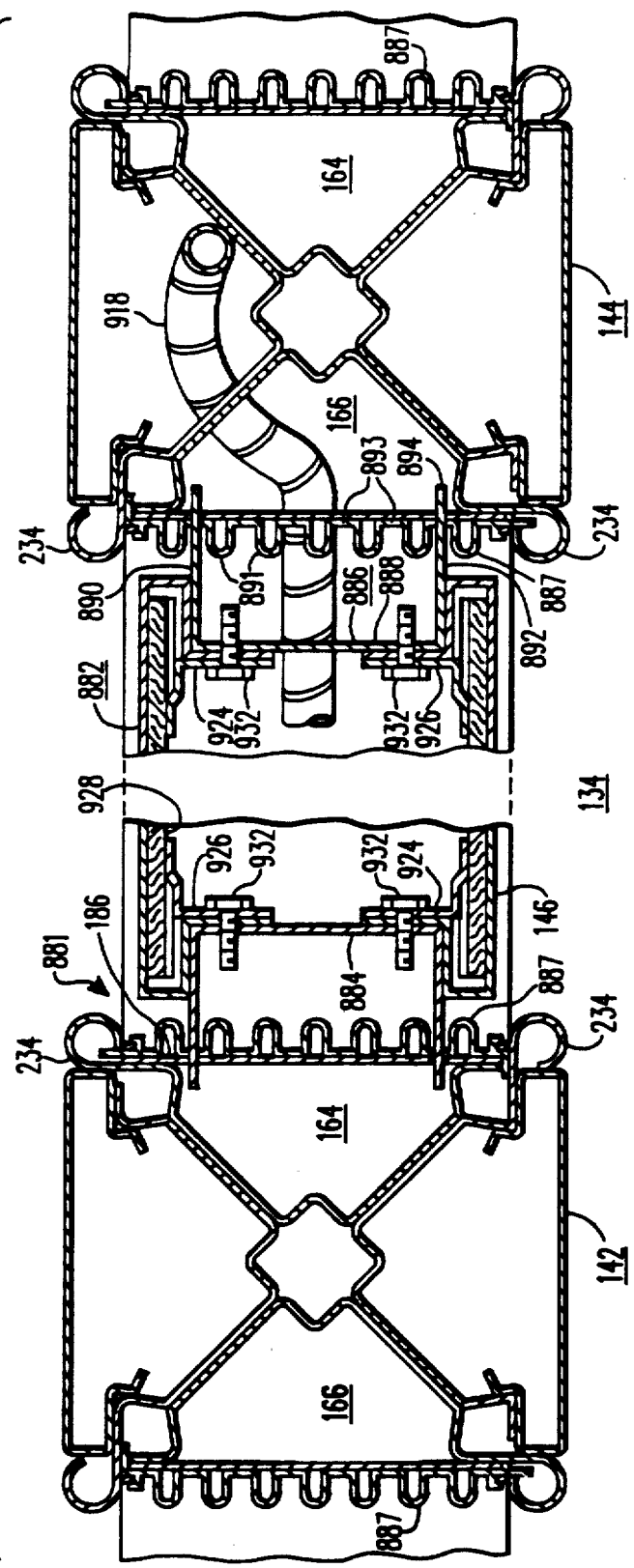
FIG. 37 is a horizontal section between two adjacent columns, illustrating back-to-back fill panels in position between the inner surfaces of the stiles.
Figure 38:
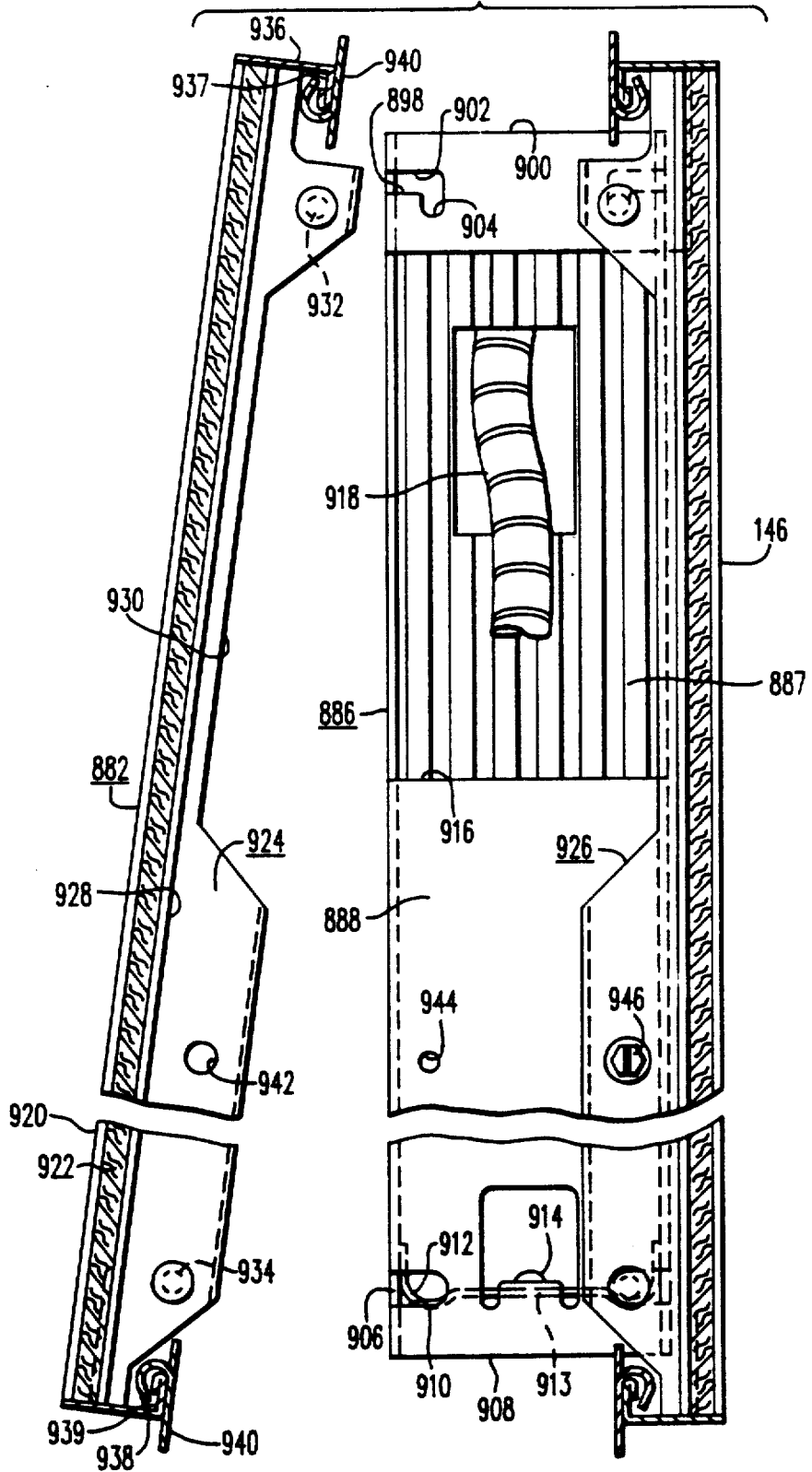
FIG. 38 is an exploded side elevational view illustrating how fill panels are installed using insert channels mounted on the inner facing surfaces of the stiles.
Figure 39:
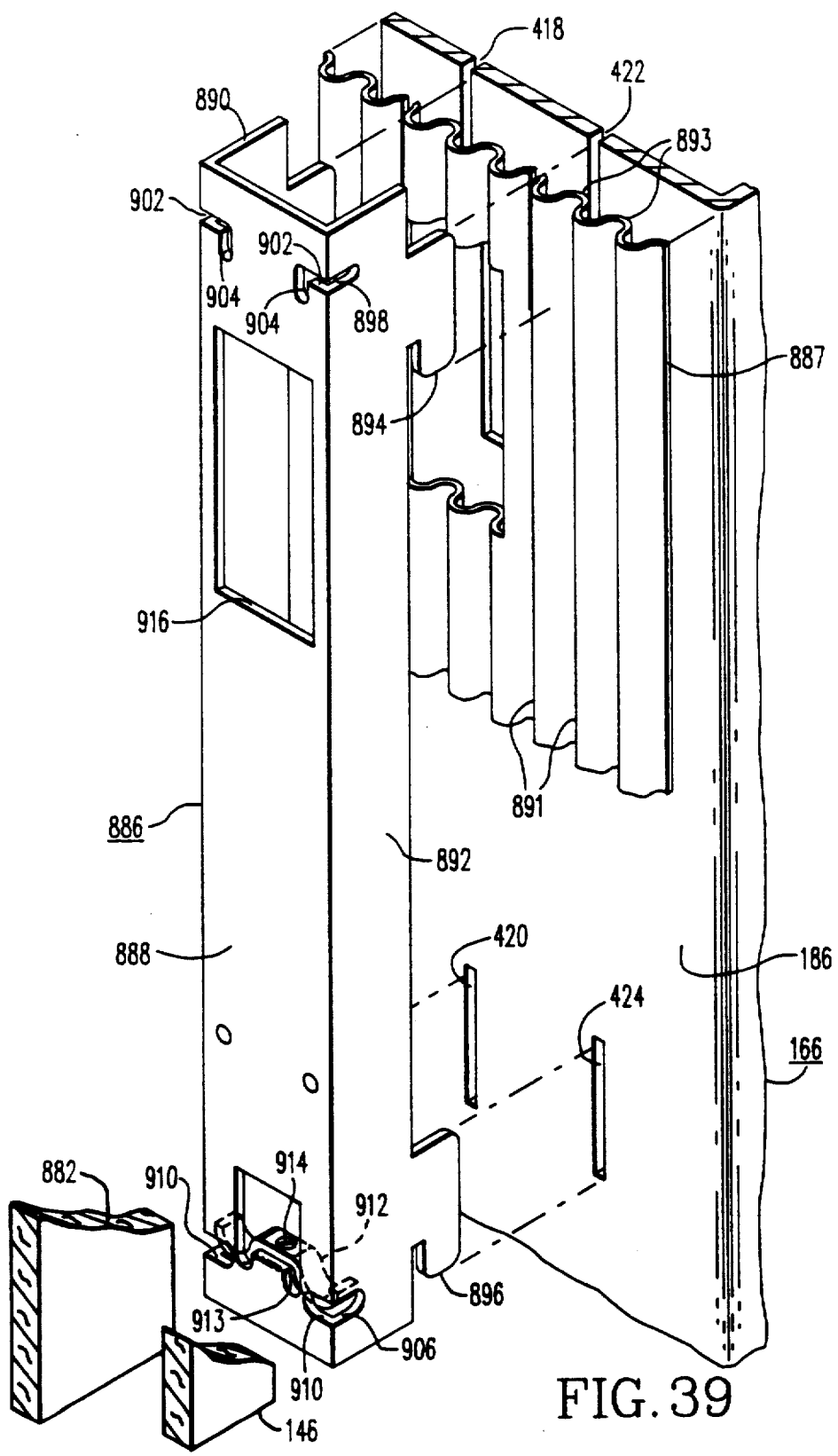
FIG. 39 is an exploded perspective view showing an insert channel and stile.
Figure 40:
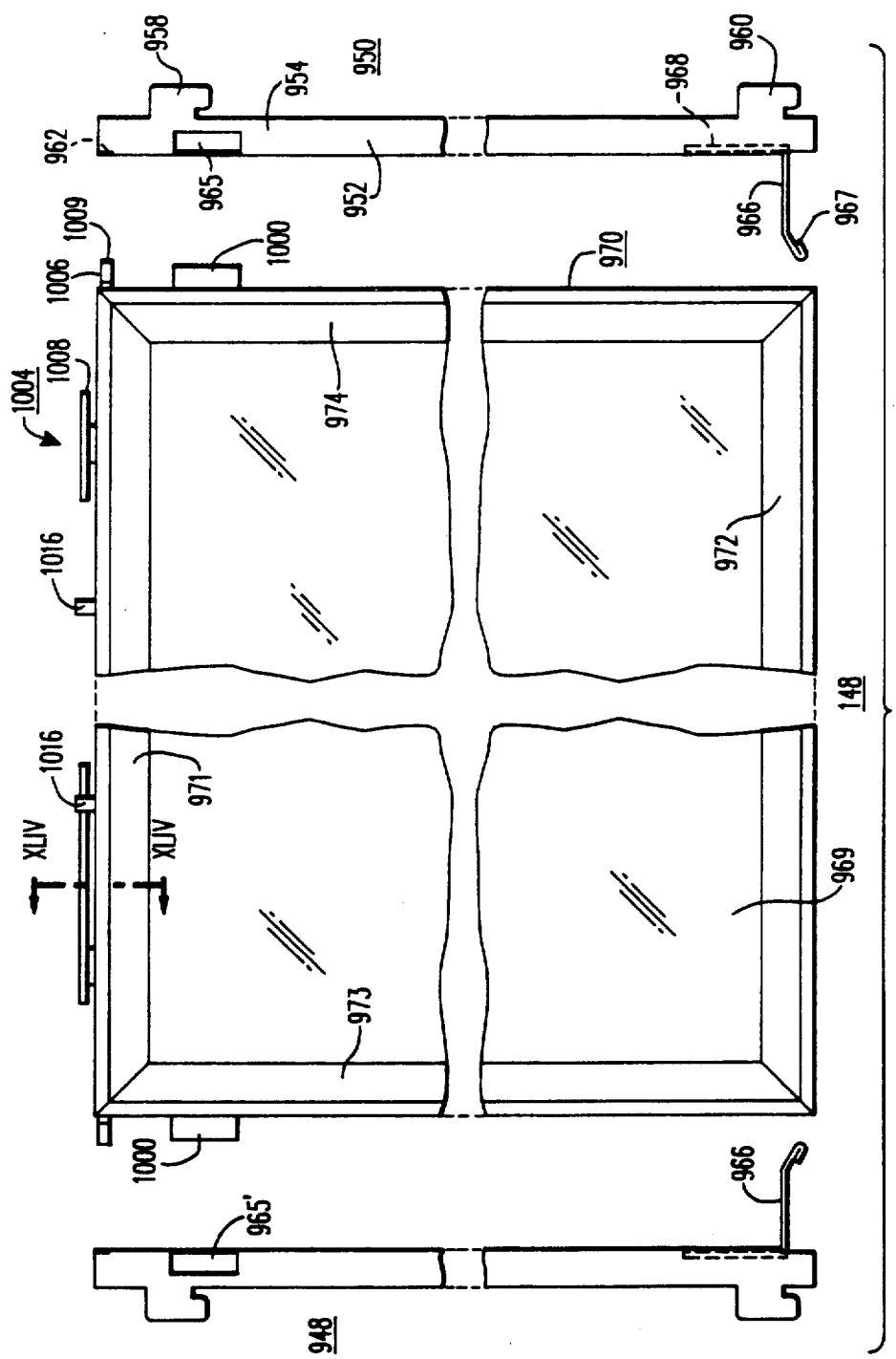
FIG. 40 is a front exploded view of a glazing fill frame and associated glazing channels.
Figure 41:
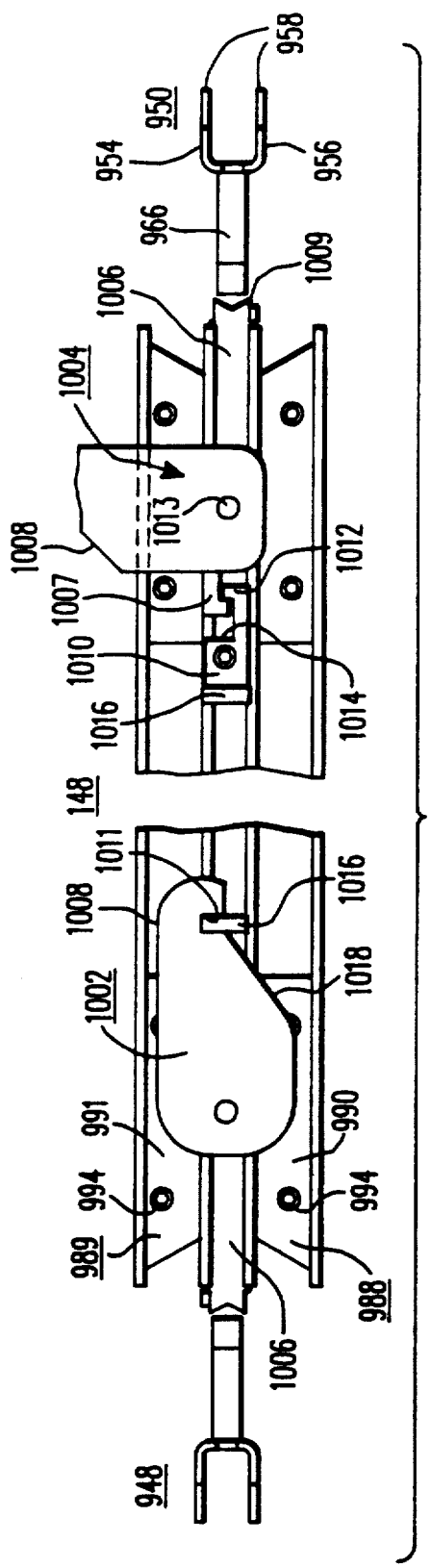
FIG. 41 is a plan view of the glazing fill frame and glazing channels shown in FIG. 40.
Figure 42:
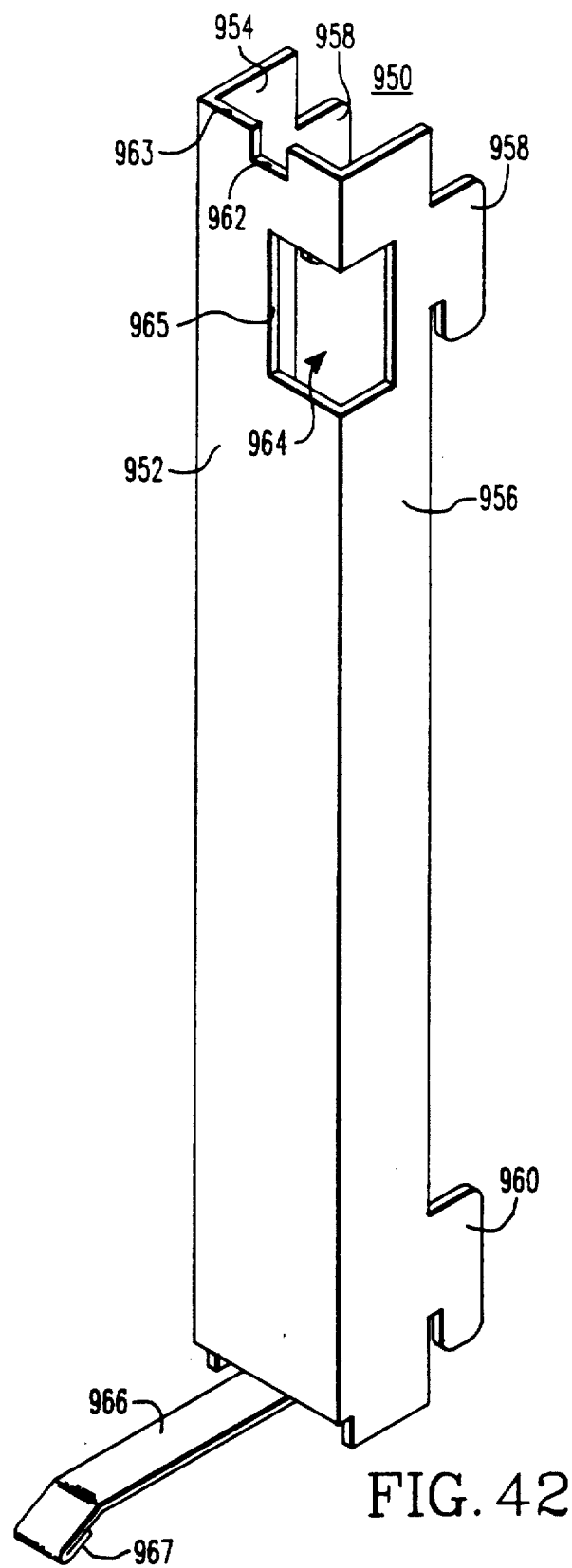
FIG. 42 is a perspective view of one of the glazing channels shown in FIGS. 40 and 41.

Before describing the opaque panel arrangement, it will be noted with reference to FIGS. 37 and 39 that the inner facing surfaces 184 and 186 of the stiles 164 and 166 of each frame include column trim members 887. Each trim member 887 is cut to length from a long plastic extrusion having a plurality of closely spaced ribs 891 interconnected by flat webs 893 which lie flat against inner surface 186 of stile 166. The vertically extending lateral edges of the trim members are configured to snap into position between the edge curls 234. The web portions 893 which interconnect the ribs 891 have a plurality of slots cut therein which are aligned with the slots in inner surface 186 of stile 166. Thus, there are two column trims on each stile inner surface, one below the chair rail 86 and one above it, and they would respectively have the same slot layouts as illustrated in FIG. 19 for the inner surface 186 of stile 166 below and above the chair rail 86. Column trim members 887 conceal the slots in surface 186 of the stiles and they provide each frame with a finished visual accent which presents a pleasing appearance regardless of the degree of fill utilized with a particular frame. The column trim members are always in position on the stiles, making it easy to add or subtract fill options without the necessity of storing or ordering additional parts when fill is added to a frame opening, or storing parts when fill is taken out of a frame opening.

Opaque panel inserts 146 and 882 are mounted within opening 168 via first and second channel brackets 884 and 886 mounted on the parallel inner facing surfaces 184 and 186 of the stiles 164 and 166, over the column trim members 887. Channel brackets 884 and 886 are similar, so only channel bracket 886 will be described in detail. Channel bracket 886 includes a bight 888 and first and second legs 890 and 892, with each leg, such as leg 892 having upper and lower outwardly projecting hooks 894 and 896. The pair of upper hooks 894 project through slots 418 and 422, and the pair of lower hooks 896 project through slots 420 and 424, of the inwardly facing surface 186 of stile 166.

Each leg 890 and 892 of channel bracket 886 includes a horizontal slot 898 spaced downwardly from a top edge 900 of bracket 886, which joins a horizontal slot 902 in bight 888. Slot 902 terminates with a down turned end 904. Each leg 890 and 892 of channel bracket 886 further includes a horizontal slot 906 spaced upwardly from the bottom edge 908 which joins a horizontal slot 910 in bight 888. An elongated leaf spring 912, the center of which is secured with a fastener 914 to an inwardly bent tab 913 of bight 888, has opposite ends thereof disposed in interfering positions relative to the lower slots 910. The bight 888 includes a substantial window 916 through which electrical wiring 918 may pass from column to frame and/or from frame to frame.

Each opaque insert panel, such as panel 882, includes a suitable outer surface, or cover 920, such as a fabric, which is supported by a suitable frame, core or backing 922. Additional sound absorbing material (not shown) may be attached to the inner surface of panel 882. A pair of elongated vertical flanges 924 and 926 are fixed to the frame or backing 922, adjacent the lateral edges thereof, and they extend vertically outward from the inner side 928 of panel 882. Each flange, such as flange 924 shown in FIG. 38, includes a recessed portion 930 to provide clearance for wiring 918.

Upper and lower pin members 932 and 934 are fixed to each flange 924 and 926 such that they extend outwardly towards the adjacent lateral edges of panel 882. Panel 882 includes horizontally extending upper and lower right angle flange members 936 and 938 having inwardly turned legs 937 and 939 which support dual durometer plastic coextrusions 940. Coextrusions 940 have a relative hard portion where it is mounted to flange legs 937 and 939 and relative soft projections which extend outwardly beyond the upper and lower edges of panel 882 to provide light and sound seals. Panel 882 is assembled with channel brackets 884 and 886 by angling the panel such that the top of the panel is closer to the frame opening then the bottom of the panel, placing the upper pins 932 in the top slots 898 and 902, allowing pins 932 to drop into the down turned ends 904, pivoting the panel 882 on pins 932 to swing the bottom of panel 882 towards the frame opening, and snapping the lower pins 934 into slots 906 and 912, past the interfering leaf spring 906. The leaf spring 906 is deflected by pins 934 and it then returns towards its unstressed position to resiliently hold the bottom of panel 886 in assembled position with channel brackets 884 and 886, within a frame opening. To remove a panel, the procedure is reversed, pulling the bottom of the panel outward to overcome the spring bias holding the lower pins 934 in position, pivoting the bottom of the panel outwardly and upwardly, lifting the panel to lift the pins 932 out of the hook-like depression 904, and then moving the panel horizontally away from the channel brackets to withdraw pins 932 from the channel slots 902 and 898.

Each flange 924 and 926 includes an opening 942 which is aligned with an opening 944 in bight 888 of the associated channel bracket when the panel is in assembled relation with the channel brackets. When an office having a lockable door is being enclosed, the panels on the outside of the office are installed first and secured to the associated channels via a fastener 946 disposed through the aligned openings 942 and 944. Thus, an outside panel cannot be removed without first gaining access to the inside of the office.

While the panels 882 and 146 used as an example were the relatively short vertical height panels, when panels are inserted above the chair rail 86, the panels may be the full height of the frame opening 170, two-thirds full height, or one-third full height, as desired. When the opening 170 above chair rail 86 is completely filled, or filled to the same height on both sides of a frame, the panels on opposite sides of a frame may have different heights. For example, one side may have a full height panel and the other side may use three one-third full height panels.

FIGS. 40 through 44 relate to glazing inserts, such as glazing panels 148 and 154 shown in FIG. 3. Unlike opaque fill, which requires panels to be spaced apart in a back-to-back relationship at any opaque panel location, only a single glazing panel is used at any of the accommodating positions above the chair rail 86, with the glass pane being centered within the frame depth D.

For purposes of example, it will be assumed that FIGS. 40 through 44 illustrate glazing insert 148 shown in FIG. 3. Glazing insert 148 is positioned within opening 170 of frame 134 via a pair of vertically elongated glazing channel brackets 948 and 950. Since channel brackets 948 and 950 are similar, except for the position of an opening, only channel bracket 950 will be described in detail. Channel bracket 950 is channel shaped, having a bight 952 and spaced leg portions 954 and 956. Legs 954 and 956 include horizontally aligned upper hooks 958 and horizontally aligned lower hooks 960. The lower hooks 960 of glazing panel 148 fit into the lowest pair of stile slots 414 and 416 shown in FIG. 19, and the upper hooks 958 fit into the uppermost pair of slots which are in the same vertical planes as slots 414 and 416. As hereinbefore stated, there are six pairs of slots in the vertical planes which include slots 414 and 416, which accommodate one, two or three glazing panels, as desired, above the chair rail 86, and two such pairs of slots, 426 and 428, and 430 and 432, below the chair rail 86 which will accommodate one glazing panel.

Glazing channel bracket 950 includes a locking notch 962 in the upper edge 963 of bight 952; a locating recess 964 cooperatively formed in bight 952 and leg 956, with the locating recess having a locating surface 965 aligned with a plane disposed perpendicularly through the center of bight 952; and a support tongue 966 which terminates in a downwardly inclined folded edge 969. Tongue 966 may include an upright leg 968 which is fixed to bight 952. Glazing channel bracket 948 is of like construction except its locating edge 965' is provided by a recess which is a mirror image of recess 964.

Figure 44:
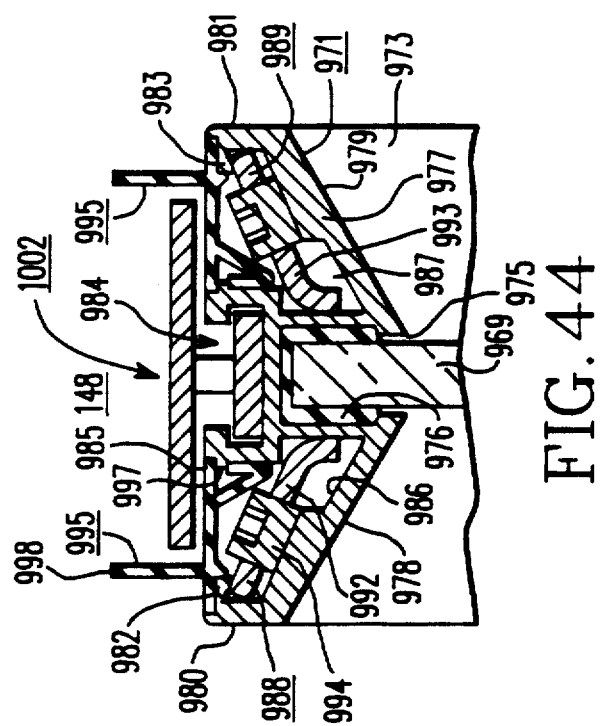
FIG. 44 is a vertical section taken through the top of the glazing frame shown in FIG. 43, with the addition of dual durometer trim.
Figure 43:
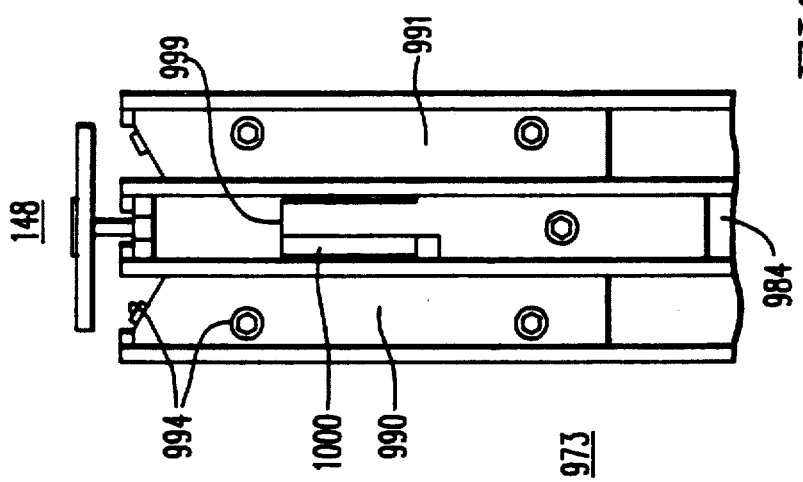
FIG. 43 is a fragmentary end elevational view of the top of the glazing frame shown in FIGS. 40 and 41.

Glazing panel 148 includes a glass pane 969 surrounded by a glazing frame 970. The horizontal and vertical elements of glazing frame 970, including upper and lower horizontal elements 971 and 973 and vertical elements 973 and 974, are miter cut to length from an aluminum extrusion 977. As shown in FIG. 44, which is a cross sectional view of upper horizontal element 971 taken between and in the direction of arrows XLIV - XLIV in FIG. 40, upper horizontal element 971 includes an inwardly facing channel 975 having a vinyl glazing strip 976 which seats glass pane 969. From the glass channel 975, extrusion 977 slopes upwardly via interior walls 978 and 979 to side walls 980 and 981, respectively. The upper edges of side walls 980 and 981 join slightly recessed, inwardly directed chisel edged flanges 982 and 983, respectively. The outer central portion of extrusion 977 defines a T-slot 984 having slightly recessed outer edges 985. The side or outer walls 980 and 981 and the walls of the T-slot 984 and of the channel 975 define first and second inwardly sloping cavities 986 and 987. Adjoining horizontal and vertical elements of the glazing frame 970 are held together at each corner by right angle brackets 988 and 989, the legs of which are angled inwardly to match the slope of the sloping cavities 986 and 987. Referring to FIG. 44, first legs 990 and 991 of the right angle brackets 988 and 989 are inserted into sloping cavities of vertical element 973, as shown in FIG. 43, which is an elevational view of the upper end of vertical element 973, and the remaining second legs 992 and 993 illustrated in FIG. 44 are inserted into sloping cavities 986 and 987. Once the frame elements are placed in position around glass pane 969 with the sloped-leg brackets 988 and 989 in position, set screws 994 disposed through tapped openings in legs 990, 991, 992 and 993 are tightened which lock the bracket legs to the associated extrusion 977, thus locking the frame elements together via the brackets 988 and 989.

As shown in FIG. 44, after the frame elements are locked together, dual durometer seals 995 are seated on the exterior of the frame 970, with relatively harder portions of each seal 995 snapping behind the chisel edge flange 982 and a ridge 997 which extends outwardly from the facing side of the T-slot 984. A softer portion 998 of each seal 995 extends outwardly to form sight and sound seals around the glazing panel 148.

Side frame elements 973 and 974 include stop brackets 999 fixed in the T-slot 984 near the upper end of the vertically oriented side frame element 973, as shown relative to vertical member 973 in FIG. 43. Each stop bracket includes an outwardly projecting stop flange 1000.

Retractable key slide assemblies 1002 and 1004 are mounted in the T-slot 984 of the upper horizontal frame element 971, adjacent to the opposite ends of upper horizontal frame element 971. As shown more clearly relative to assembly 1004, each assembly 1002 and 1004 includes a sliding key 1006 in the T-slot 984 having a pivotable locking lever 1008 pivotally fixed to an upper side thereof. Locking lever 1008 includes a lug-receiving recess 1011 near one end and a pivot pin 1013 near its remaining end. Sliding key 1006 further includes a hook shaped inner end 1007, and an outer locking end 1009. Each assembly 1002 and 1004 further includes a bracket 1010 fixed in T-slot 984 having a hook shaped end 1012 oriented to engage hook shaped end 1007 of sliding key 1006 in an extended locking position of sliding key 1006. Bracket 1010 further includes an intermediate stop surface 1014 which establishes how far sliding key 1006 may be retracted, and an upstanding lug 1016 at the remaining end which rises above T-slot 984.

Locking assembly 1002 is shown in an extending locking position which is obtained by moving swing lever 1008 such that its recess 1011 engages lug 1016. As lever 1008 is pivoted to this locking position, cam surface 1018 moves the sliding key outward until recess 1011 reaches the seating position for lug 1016. To unlock a locking assembly, locking lever 1008 is first pivoted outwardly as shown relative to locking assembly 1004, to unlock the lug 1016 from the lever 1008, and the lever 1008 may they be used to move sliding key 1006 in a retracting direction until key 1006 contacts stop 1014.

Installation of glazing panel 148 first requires the installation of the glazing channels 948 and 950 within the pertinent frame opening, as hereinbefore described. The bottom of the glazing panel 148 then is angled inwardly to position the bottom frame element 972 such that the support fingers 966 of the glazing channels 948 and 950 enter the T-slot 984, holding and initially positioning glazing panel 148. With the sliding keys 1006 retracted, the top of glazing panel 148 is then swung inwardly to a vertical position, with the stop lugs 1000 contacting stop surfaces 965 and 965' to establish the desired vertical position. The sliding keys 1006 are moved to their extended position via the locking levers 1008, during which the locking ends 1009 of the sliding keys 1006 enter the notches 962 at the top of the glazing channels 948 and 952. The locking levers are then pivoted to their locking positions to engage lugs 1016. The glazing panel 148 is removed by reversing the procedure, unlocking and retracting the sliding keys, and swinging the top of panel 148 outwardly until it may be grasped and lifted upwardly off of the support fingers 966.

Figure 46:
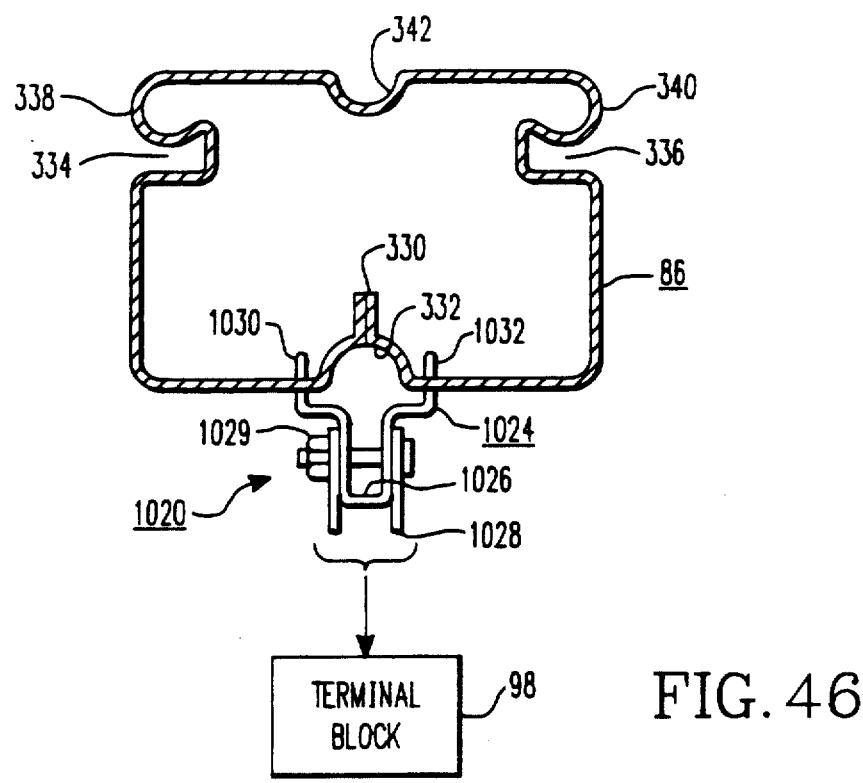
FIG. 46 illustrates an exemplary mounting arrangement for supporting a terminal block below the chair rail.
Figure 47:
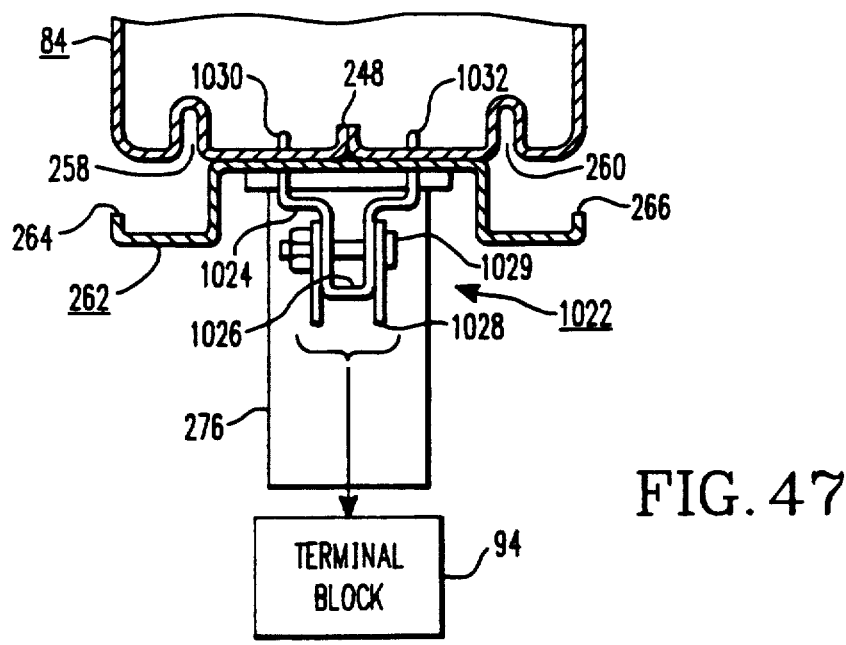
FIG. 47 illustrates an exemplary mounting arrangement for supporting a terminal block below the base rail.

FIGS. 45, 46 and 47 relate to electrical wiring options which may be used to provide electrical power below the base and chair rails 84 and 86, respectively. For purposes of example, a portion of frame 56 shown in FIG. 1 is illustrated, in which a terminal block 98 having one or more electrical receptacles or outlets is illustrated supported by the chair rail 86, and a similar terminal block 94 is supported below the base rail 84. FIGS. 46 and 47 illustrate mounting brackets 1020 and 1022 which may be used to secure terminal blocks 98 and 94 to chair and base rails 86 and 84, respectively. Each mounting bracket 1020 and 1022 includes a yoke hook 1024 having a U-shaped center portion 1026 which is secured to a terminal block bracket 1028 via fasteners 1029. Yoke hooks 1024 have upwardly extending legs 1030 and 1032 which extend upwardly through slots in the bottom of chair rail 86, in the case of mounting bracket 1020, and through slots in hat shaped bracket 262 and in the bottom of the base rail 84 in the case of mounting bracket 1022.

As shown in FIG. 45, electrical power may be supplied to or from terminal block 94 via a plug-in jumper 1034 which may link the panel on the other side of door 60 by proceeding under a door sill 1036. Terminal block 98 is fed through a column wire way in column 64, either vertically downward from a ceiling feed, or, as illustrated, via a plug-in jumper from a plug-in location on terminal block 94. A plug-in jumper 1040 may link terminal block 94 to another terminal block 94 in adjacent panels.

We claim:

1. An office space dividing system comprising rectangular frames, each having first and second end portions, top and bottom portions, and front and back surfaces disposed in parallel front and back planes, respectively, with each of the frames having first and second vertical stiles at the first and second end portions, respectively, with each stile having inner and outer sides which extend between the front and back planes, and horizontal rail portions which interconnect the first and second stiles, characterized by:

each of the outer sides of the first and second stiles being defined by a laterally projecting miter portion which includes first and second miter walls having planes which intersect one another orthogonally and which respectively intersect the front and back planes at 45 degrees, and wherein the first and second miter walls join one another via first and second inwardly directed walls which respectively angle from the first and second miter walls toward the associated panel frame, each of said first and second stiles further including a plate portion joined to the miter portion to form a tubular structure, with the plate portion having vertically extending edges and a surface which extends therebetween which defines the inner side of the associated stile, each miter portion of each stile joining the plate portion inwardly from the vertically extending edges thereof via first and second offset wall portions which extend inwardly from the first and second miter walls, respectively, first and second end flanges which respectively extend outwardly from the first and second offset wall portions towards the front and back planes and lie against said plate portion, one of said first and second edge flanges extending outwardly beyond the associated vertically extending edge of the plate portion and terminating in a circular curled portion.

2. The office space dividing system of claim 1 wherein the first and second inwardly directed walls intersect orthogonally.

3. The office space dividing system of claim 1 wherein the first and second edge flanges are welded to the plate portion.

4. The office space dividing system of claim 1 wherein the circular curled portion curls towards the plate portion, concealing the adjacent vertically extending edge of the plate portion.

5. An office space dividing system comprising rectangular frames, each having first and second end portions, top and bottom portions, and front and back surfaces disposed in parallel front and back planes, respectively, with each of the frames having first and second vertical stiles at the first and second end portions, respectively, with each stile having inner and outer sides which extend between the front and back planes, and horizontal rail portions which interconnect the first and second stiles, characterized by:

each of the outer sides of the first and second stiles being defined by a laterally projecting miter portion which includes first and second miter walls having planes which intersect one another orthogonally and which respectively intersect the front and back planes at 45 degrees, and wherein the first and second miter walls join one another via first and second inwardly directed walls which respectively angle from the first and second miter walls toward the associated panel frame, said miter portions of each stile including a horizontally open notch, with said notches of adjacent panel frames being horizontally aligned, and including clamp means engaging edges of said notches to lock adjoining frames together.

6. The office space dividing system of claim 5 wherein the clamp means comprises a three-part threaded fastener which draws adjoining frames into horizontal alignment and the desired relation to one another.

7. The office space dividing system of claim 6 wherein the miter portions of each stile each include a second notch spaced from the horizontally open notch, with one of the three parts of the three-part threaded fastener including a tapped hole tie plate disposed in an opening collectively defined by said second notches of adjacent frames being joined.

8. The office space dividing system of claim 6 wherein one of the three parts of the three-part threaded fastener includes a wedge clamp connector having vertically extending wedge slots which engage the miter portions of frames being joined.

9. The office space dividing system of claim 8 wherein the remaining parts of the three-part threaded fastener include a tapped hole tie plate, and a draw bolt which extends between the wedge clamp connector and tie plate, with said draw bolt holding the wedge clamp connector such that the wedge slots are firmly seated on the horizontally open notches of the miter portions of the frames being joined.

10. The office space dividing system of claim 9 wherein the miter portions of each stile include a second notch spaced from the horizontally open notch, with the tie plate being disposed in an opening collectively defined by said second notches of frames being joined, and wherein the draw bolt is disposed in a vertically extending opening collectively defined by the first and second inwardly directed walls of the miter portions of frames being joined.

11. The office space dividing system of claim 10 wherein the inwardly directed walls of each miter portion intersect one another orthogonally to define a W-shaped cross sectional configuration, and wherein the opening collectively defined by adjacent miter portions of frames being joined has a substantially square cross sectional configuration.

12. An office space dividing system comprising rectangular frames, each having first and second end portions, top and bottom portions, and front and back surfaces disposed in parallel front and back planes, respectively, with each of the frames having first and second vertical stiles at the first and second end portions, respectively with each stile having inner and outer sides which extend between the front and back planes, and horizontal rail portions which interconnect the first and second stiles, characterized by:

each of the outer sides of the first and second stiles being defined by a laterally projecting miter portion which includes first and second miter walls having planes which intersect one another orthogonally and which respectively intersect the front and back planes at 45 degrees, and wherein the first and second miter walls join one another via first and second inwardly directed walls which respectively angle from the first and second miter walls toward the associated panel frame, said miter portions of each stile including at least first and second spaced pairs of notches, and including first and second clamp means respectively associated with the first and second pairs of notches which lock adjoining panel frames together.

13. The office space dividing system of claim 12 wherein each of the first and second clamp means includes a wedge clamp member disposed in one notch of a pair, a tapped hole tie plate disposed in the remaining notch of a pair, and a tie bolt linkage the wedge clamp member and the tie plate.

14. An office space dividing system comprising rectangular frames, each having first and second end portions, top and bottom portions, and front and back surfaces disposed in parallel front and back planes, respectively, with each of the frames having first and second vertical stiles at the first and second end portions, respectively, with each stile having inner and outer sides which extend between the front and back planes, and horizontal rail portions which interconnect the first and second stiles, characterized by:

each of the outer sides of the first and second stiles being defined by a laterally projecting miter portion which includes first and second miter walls having planes which intersect one another orthogonally and which respectively intersect the front and back planes at 45 degrees, and wherein the first and second miter walls join one another via first and second inwardly directed walls which respectively angle from the first and second miter walls toward the associated panel frame, said miter portions of each stile having a substantially W-shaped cross sectional configuration, with the miter portions of two adjacent frames being disposed adjacent to one another, and including first and second elongated filler members each having a W-shaped cross sectional configuration similar to the cross sectional configuration of the miter portions of the stiles, with said first and second elongated filler members being disposed adjacent to the miter sections of the two frames being joined, such that the W-shaped miter portions and W-shaped filler members collectively define a column having a central opening which is symmetrical about the longitudinal axis of the column.

15. An office space dividing system comprising rectangular frames, each having first and second end portions, top and bottom portions, and front and back surfaces disposed in parallel front and back planes, respectively, with each of the frames having first and second vertical stiles at the first and second end portions, respectively, with each stile having inner and outer sides which extend between the front and back planes, and horizontal rail portions which interconnect the first and second stiles, characterized by:

each of the outer sides of the first and second stiles being defined by a laterally projecting miter portion which includes first and second miter walls having planes which intersect one another orthogonally and which respectively intersect the front and back planes at 45 degrees, and wherein the first and second miter walls join one another via first and second inwardly directed walls which respectively angle from the first and second miter walls toward the associated panel frame, said miter portions of each stile having a substantially W-shaped cross sectional configuration, with the miter portions of three adjacent frames being disposed adjacent to one another, and including an elongated filler member having a W-shaped cross sectional configuration similar to the cross sectional configuration of the miter portions of the stiles, with said elongated filler member being disposed adjacent to the miter sections of the panel frames being joined, such that the W-shaped miter portions and W-shaped filler member collectively define a column having a central opening which is symmetrical about the longitudinal axis of the column.

16. An office space dividing system comprising rectangular frames, each having first and second end portions, top and bottom portions, and front and back surfaces disposed in parallel front and back planes, respectively, with each of the frames having first and second vertical stiles at the first and second end portions, respectively with each stile having inner and outer sides which extend between the front and back planes, and horizontal rail portions which interconnect the first and second stiles, characterized by:

each of the outer sides of the first and second stiles being defined by a laterally projecting miter portion which includes first and second miter walls having planes which intersect one another orthogonally and which respectively intersect the front and back planes at 45 degrees, and wherein the first and second miter walls join one another via first and second inwardly directed walls which respectively angle from the first and second miter walls toward the associated panel frame, said first and second vertical stiles of at least one of the frames being tubular and open ended, at least at the top portion of the panel frame, and including an add-on frame having an inverted U-shaped configuration, said add-on frame including first and second leg portions having a horizontal cross sectional configuration which is the same as the horizontal cross sectional configuration of the first and second stiles, a bight interconnecting said first and second leg portions which functions as an upper rail, and first and second bayonet portions depending from said first and second leg portions, said first and second bayonet portions being snugly telescoped into open ends of the tubular first and second stiles, respectively, of said at least one frame, to provide a vertical extension thereof.

17. The office space dividing system of claim 16 wherein the miter portions of each stile include a horizontally open notch, and the bayonet portions include a notch aligned with the horizontally open notches of the stiles they are telescopically engaged with, and wherein the notches of adjacent panel frames are horizontally aligned, and including clamp means engaging edges of said aligned notches to simultaneously lock adjoining frames together and lock the add-on frame to the at least one frame.

18. The office space dividing system of claim 16 wherein each stile includes two vertically spaced notches near the top portion of the frame, and the bayonet portions include a notch aligned with the uppermost of the two notches of the stiles they are telescopically engaged with, and wherein the two spaced notches of adjacent frames are horizontally aligned, and including clamp means extending between and engaging edges of said aligned vertically spaced notches to simultaneously lock adjoining frames together and lock the add-on frame to the at least one frame.

19. The office space dividing system of claim 18 wherein the clamp means includes a three-part threaded fastener which draws the lower edges of the notches in the first and second bayonets downwardly to force the stiles of the add-on frame tightly against the stiles of the at least one frame.

20. The office space dividing system of claim 19 wherein the three-part threaded fastener includes a tapped hole tie plate disposed in the uppermost of the aligned notches, a wedge clamp connector disposed to engage edges of the lowermost of the aligned notches, and a draw bolt extending between said wedge clamp connector and said tapped hole tie plate.

21. An office space dividing system characterized by:
a base frame having first and second upright hollow stiles at first and second horizontally spaced ends thereof, and an add-on frame section on said base frame having first and second hollow stiles which smoothly continue the external configuration of the first and second stiles of the base frame, with the first and second stiles of the add-on frame having depending bayonet portions which snugly telescope into the hollow first and second stiles of the base portion, at least one additional frame disposed adjacent to the base frame, and interior connecting means simultaneously locking the bayonet portions to the first and second stiles of the base frame, and the at least one additional frame to the base frame, said upright hollow stiles of the base frame and the bayonet portions of the add-on frame section including horizontally aligned notches which define draw edges, said interior connecting means including draw fastener means which engages said draw edges to draw the bayonet portions of the add-on frame downwardly to obtain firm abutment between the first and second hollow stiles of the add-on frame and the first and second upright hollow stiles of the base frame.

22. The office space dividing system of claim 21 wherein the base frame and add-on frame each include a horizontal rail which are vertically spaced from one another, to define, along with predetermined portions of predetermined stiles, a rectangular frame opening, and including a panel member sized to snugly fit within said rectangular frame opening, and means removably mounting said panel member within said rectangular frame opening.

23. The office space dividing system of claim 21 wherein the base frame and add-on frame each include a horizontal rail which are vertically spaced from one another, to define, along with predetermined portions of predetermined stiles, a rectangular frame opening, and including first and second panel members each sized to snugly fit back-to-back within said rectangular frame opening, and means removably and independently mounting said first and second panel members within said rectangular frame opening.

24. An office space dividing system having interconnected rectangular frames having front and back portions disposed in front and back planes, respectively, characterized by:
each of said frames having first and second stiles each having a miter portion which includes first and second outwardly extending walls the planes of which are disposed at 45 degree angles with respect to the front and back planes, with said first and second outwardly extending walls being bent prior to intersecting with one another to form a square recessed corner, and means engaging the square recessed corners of adjacent frames to rigidly hold the panel frames together.

25. The office space dividing system of claim 24 wherein each miter portion has a substantially W-shaped cross-sectional configuration having an edge curl on one vertical thereof.

26. The office space dividing system of claim 25 wherein each miter portion includes a column cover receiving shoulder.

27. The office space dividing system of claim 26 including a four-sided column at each end of each frame constructed of the miter sections of adjoining frames, and including an elongated fill piece member for each side of the column which is devoid of a frame, with said elongated fill piece member having a W-shaped cross-sectional configuration, an edge curl on one edge thereof, and a cover receiving shoulder, all similar to the W-shaped cross-sectional configuration, edge curl and cover receiving shoulder of a miter portion.

28. The office space dividing system of claim 27 including a column cover removably engaging the cover receiving shoulders of each fill piece member, with each fill piece member and associated column cover cooperatively define a wire way vertically through the column.

29. The office space dividing system of claim 28 wherein each column cover is flush with the adjacent edge curls, to maximize the size of the wire way without exceeding the external dimensions of the column defined by the edge curls.

30. An office space dividing system comprising interconnected rectangular frames, each having first and second ends, a top and a bottom, and front and back faces, characterized by:
a four-side column at the end of each frame cooperatively constructed of four mating members, at least one of which is fixed to a frame, which each of said four mating members having first and second wall members having planes disposed at right angles to one another, with the first wall member of one mating member abutting with the second wall member of another mating member, and means for rigidly holding the four mating members together, said first wall member of each of said four mating members including a circular edge curl which projects beyond a face of the frame.

31. The office space dividing system of claim 30 wherein each of the first and second wall members are bent inwardly at an angle of 90 degrees, with said bent portions joining one another in a right angle recessed corner which is spaced inwardly from an imaginary intersection of an unbent continuation of the first and second wall members, thereby spacing each of the four mating members from the longitudinal axis of the column.

32. The office space dividing system of claim 31 wherein the bent portions of the first and second wall members are vertically recessed, with the means for rigidly holding the four mating members together including means clamping mating recessed portions together.

33. The office space dividing system of claim 32 including a column cover disposed between and tangent to two of said edge curls, with said column cover and adjacent wall members cooperatively defining a vertical wire-way in the column.

34. The office space dividing system of claim 33 including a cornice on top of at least certain of said frames which flares outwardly from each face of the associated frame and upwardly, and further including electrical wiring disposed in said cornice.

35. The office space dividing system of claim 30 wherein each frame includes first and second stiles at the first and second ends, and a chair rail which extends between said first and second stiles.

36. The office space dividing system of claim 35 including horizontal electrical wiring supported by the chair rail.

37. The office space dividing system of claim 35 wherein each frame includes first and second stiles at the first and second ends, and a base rail which extends between said first and second stiles.

38. The office space dividing system of claim 37 including means for elevating the frames to provide a space below the base rail, and further including horizontal electrical wiring in the space below the base rail.

39. The office space dividing system of claim 38, wherein the horizontal wiring is at least partially supported by the base rail.

40. The office space dividing system of claim 30 wherein each frame includes first and second stiles at the first and second ends, a base rail which extends between said first and second stiles, furniture adjacent to at least certain of said frames, and means for supporting said furniture from said base rail.

41. The office space dividing system of claim 40 wherein the means for supporting the furniture is horizontally adjustable along the base rail, enabling furniture to be supported thereby without regard to the furniture widths and frame widths.

42. The office space dividing system of claim 30 including a cornice on top of at least certain of said frames which flares outwardly from each face of the associated frame and upwardly, and further including ambient lighting fixtures in said cornice.

43. The office space dividing system of claim 30 including first and second stiles at the first and second ends of each frame having parallel facing surfaces, a chair rail disposed between said parallel facing surfaces, a rail mount between said parallel facing surfaces, and means for supporting said rail mount from said parallel facing surfaces.

44. The office space dividing system of claim 30 including first and second stiles at the first and second ends of each frame having parallel facing surfaces, a base rail, a chair rail, and a top rail disposed between said parallel facing surfaces, at least one panel between said parallel facing surfaces, and means for removably mounting said at least one panel from said parallel facing surfaces.

45. The office space dividing system of claim 44 including a second panel disposed between the parallel facing surfaces, back to back with the at least one panel, and means for removably mounting said second panel from said parallel facing surfaces.

46. An office space dividing system comprising interconnected rectangular frames, each having first and second ends, a top and a bottom, and front and back faces, characterized by:

a four-side column at the end of each frame cooperatively constructed of four mating members, at least one of which is fixed to a frame, with each of said four mating members having first and second wall members having planes disposed at right angles to one another, with the first wall member of one mating member abutting with the second wall member of another mating member, means for rigidly holding the four mating members together, a circular edge curl on the first wall member of each of the four mating members which projects beyond a face of the frame, a column cover disposed between the tangent to two of said edge curls to define a wire-way in the column, a cornice on top of at least certain of said frames which flares outwardly from each face of the associated frame and upwardly, electrical wiring disposed in said cornice, a chair rail in each frame, electrical wiring supported by said chair rail, a base rail in each frame, means for elevating each frame to provide a space below said base rail, electrical wiring in the space below said base rail, and electrical wiring in the cornice and wire-way connected to the electrical wiring supported by the chair rail and the electrical wiring in the space below the base rail.

47. An office space dividing system comprising interconnected rectangular frames, each having first and second ends, a top and a bottom, and front and back faces, characterized by:

a four-side column at the end of each frame cooperatively constructed of four mating members, at least one of which is fixed to a frame, with each of said four mating members having first and second wall members having planes disposed at right angles to one another, with the first wall member of one mating member abutting with the second wall member of another mating member, means for rigidly holding the four mating members together,
a cornice on top of at least certain of said frames which flares outwardly from each face of the associated frame and upwardly,
ambient lighting fixtures in said cornice,
a center septum in said cornice,
and a panel in said septum.

48. The office space dividing system of claim 47 wherein the panel is transparent, enabling light from the lighting fixtures to be transmitted through the panel.

49. The office space dividing system of claim 47 wherein the panel is a clerestory.

50. An office space dividing system comprising interconnected rectangular frames, with each frame having first and second vertical stiles, and rails extending between the first and second stiles, including base and top rails, characterized by:
a four-side column at the end of each frame cooperatively constructed of four mating members, at least one of which is fixed to a frame, with each of said four mating members having first and second wall members having planes disposed at right angles to one another, with the first wall member of one mating member abutting with the second wall member of another mating member,
means for rigidly holding the four mating members together,
said first wall member of each of said four mating members including a circular edge curl which projects beyond a face of the frame,
said base rail being a box-like structure having a top, a bottom, and first and second spaced sides, and a height of about 10 inches, and including adjustable feet extending downwardly from the base beam which place the top of the base rail about 16 inches above floor level,
a work surface,
and horizontally adjustable means for supporting said work surface from said base rail at any desired point there along.

51. The office space dividing system of claim 50 including furniture, and horizontally adjustable means for supporting said furniture from said base rail at any desired there along.

52. The office space dividing system of claim 50 wherein the rails include a chair rail, and wherein the means for supporting the work surface from the base rail includes first and second bracket means which elevates the work surface to approximately the height of the chair rail.

53. The office space dividing system of claim 50 wherein the rails include a chair rail, and including a panel, and means for removably mounting said panel in the space between the base rail and chair rail.

54. The office space dividing system of claim 50 wherein the rails include a chair rail between the base and top rails, and including an electrical terminal block having an electrical receptacle, and means for supporting said terminal block below the chair rail.

55. The office space dividing system of claim 50 including an electrical terminal block having an electrical receptacle, and means for supporting said terminal block below the base rail.

56. The office space dividing system of claim 50 including a cornice supported by the top rail, with said cornice flaring outwardly to provide a width greater than the depth of the top rail.

57. The office space dividing system of claim 50 wherein the rails include a chair rail between the base and top rails, and including panel means, and means on said first and second stiles for removably mounting the panel means above the chair rail.

58. The office space dividing system of claim 57 wherein the panel means includes three equal height panels.

59. The office space dividing system of claim 50 wherein the rails include a chair rail between the base and top rails, and including a rail mount, and means for mounting said rail mount above the chair rail on said first and second stiles.

60. The office space dividing system of claim 59 wherein the first and second vertical stiles have parallel inner surfaces which face one another, with the means for mounting said rail mount including slots in said inner surfaces and hooks on the rail mount which fit in said slots, with said hooks being offset inwardly from the rail mount.

61. The office space dividing system of claim 50 including means interconnecting adjacent frames which create an enlarged column having a thickness greater than the depth of the frame, and including first and second rail mounts mounted on adjoining frames, on opposite sides of the enlarged column, with the rail mounts being dimensioned to enable furniture accessories to extend between the first and second rail mounts and span the enlarged column.

62. The office space dividing system of claim 50 including a cornice on the top rail, electrical wiring in the cornice, and means interconnecting adjacent frames which create a column defining a vertical wire way which communicates with the cornice, with at least certain of the wiring the cornice continuing into the wire way.

63. The office space dividing system of claim 50 wherein the rails include a chair rail disposed between the base and top rails, with the top of the base rail being about one-half the distance from floor level to said chair rail.

64. The office space dividing system of claim 50 wherein the top of the base rail defines a shoulder over which furniture supporting brackets may be hooked.

65. The office space dividing system of claim 64 wherein the bottom of the base rail defines a slot into which the furniture supporting brackets may be secured.

66. The office space dividing system of claim 65 including a furniture supporting bracket having a hook portion hooked over the shoulder and a removable clip portion disposed in the bottom slot.

67. An office space dividing system comprising interconnected rectangular frames, with each frame having first and second vertical mounts horizontal rails which interconnect the stiles, with the stiles and rails defining first and second opposed parallel faces, and with the first and second stiles having inwardly facing surfaces which face and are parallel with one another, characterized by:
a hollow column between adjoining frames which laterally projects beyond the first and second parallel faces of the adjoining frames,
slots in the inwardly facing surfaces,
and first and second rail tiles each having outwardly facing vertical surfaces disposed in a common vertical plane, said first and second rail mounts having offset mounting brackets which engage the slots in the inwardly facing surfaces of the first and second stiles of adjoining frames, positioning the common vertical plane flush with the hollow column, said rail mounts each having a plurality of horizontal dovetail mounting slots, whereby accessories may be hooked into the dovetail mounting slots of the first and second rail mounts and span the enlarged column.

68. The office space dividing system of claim 67 including a storage cabinet having upper and lower hooks disposed in the dovetail slots of the first and second rail mounts.

69. The office space dividing system of claim 68 wherein the storage cabinet has a bottom portion which defines a recess, and including a lighting fixture disposed in said recess.

70. An office space dividing system comprising interconnected rectangular frames, with each frame having first and second vertical stiles, and rails extending between the first and second stiles, including base, chair and top rails, with the stiles and rails defining opposed parallel frame faces which are disposed in spaced vertical planes, characterized by:

said base rail being a box-like structure having a top, a bottom, and first and second spaced slides, and including adjustable feet extending downwardly from the bottom of the base rail which lift the bottom of the base rail a predetermined adjustable dimension above floor level, means providing columns at the stiles of each frame, including means for extending the column beyond the frame faces to provide enlarged wire ways in the column to accommodate vertical movement of electrical wiring to predetermined locations below the chair and base rails, removable base panels for enclosing the space below the base rail, a support bracket fixed to the bottom of the base rail having an inverted U-shaped cross-sectional configuration having depending leg portions which are upwardly flanged to provide upturned edges for at least partially flanged to provide upturned edges for at least partially securing the removable base panels, and a floor channel disposed below the base rail having upstanding leg portions, with the base panels abutting said upstanding leg portions.

71. The office space dividing system of claim 70 wherein the adjustable feet are levelers which extend from the floor channel to the bottom of the base rail.

72. The office space dividing system of claim 70 including enlarged openings in the first and second stiles just below the chair rail to enable electrical wiring to proceed from a column to a frame, and from frame to frame through a column.

73. An office space dividing system comprising interconnected rectangular frames, with each frame having openings defined by first and second vertical stiles and horizontal rails which interconnect the stiles, with the stiles and rails defining first and second opposed parallel faces, and with the first and second stiles having inwardly facing surfaces which face the openings, characterized by:

at least one pair of channel brackets, means for mounting said at least one pair of channel brackets within a frame opening on the inwardly facing surfaces of the first and second stiles, at least one panel insert, and means for removably mounting said at least one panel insert on said channel brackets to at least partially close the associated frame opening, said means for mounting said panel insert to the channel brackets including upper and lower slots in the channel brackets and upper and lower pins on the panel insert, with the upper slots in the channel brackets having a downwardly facing hook configuration for gravity assisted pivotable retention of the upper pins of the panel insert, and with the lower slots in the channel brackets being horizontal, and spring means aligned with the lower slots for spring retention of the lower pins of the panel insert as the panel insert is pivoted into assembled relation with the channel brackets, and a flexible peripheral seal around the panel insert which engages the frame when the insert is in assembled relation with the channel brackets.

74. The office space dividing system of claim 73 wherein the means for mounting said channel brackets include slots disposed in the inwardly facing surfaces of the first and second stiles, and hooks on the channel brackets which hook into said slots.

75. The office space dividing system of claim 74 including flanges on the panel insert, with the peripheral seal including co-extrusion members secured to said flanges.

76. The office space dividing system of claim 73 including at least one additional panel insert, and means for removably mounting said at least one additional panel insert on the at least one pair of channel brackets, back to back with the at least one panel insert.

77. The office space dividing system of claim 76 including means for securing one of the panel inserts to the channel brackets, requiring the remaining panel insert to be removed prior to the removal of the secured panel insert.

78. An office space dividing system comprising interconnected rectangular frames, with each frame having openings defined by first and second vertical stiles and horizontal rails which interconnect the stiles, with the stiles and rails defining first and second opposed parallel faces, and with the first and second stiles having inwardly facing surfaces which face the openings, characterized by:

at least one pair of channel brackets, means for mounting said at least one pair of channel brackets within a frame opening on the inwardly facing surfaces of the first and second stiles, at least one panel insert, and means for removably mounting said at least one panel insert on said channel brackets to at least partially close the associated frame opening, said at least one panel insert including a glazing frame, and including locking keys extending from said glazing frame to removably lock said frame to the channel brackets.

79. The office space dividing system of claim 78 including swing levers on the glazing frame linked to the locking keys, with said swing levers extending and retracting the locking keys.

80. The office space dividing system of claim 79 wherein the swing levers include a cam surface terminating in a notch to move and lock the keys in an extended position.

81. The office space dividing system of claim 78 wherein the glazing frame includes first and second side and upper and lower frame pieces, with at least the lower frame piece defining an upwardly extending channel, and including support fingers on the channel brackets which support the glazing frame.

82. The office space dividing system of claim 76 including at least one stop flange projecting from the glazing frame and a stop surface on a channel bracket which cooperatively position the locking keys for extension and engagement with the channel brackets.

83. The office space dividing system of claim 78 including peripheral seals disposed about the glazing frame.

84. The office space dividing system of claim 83 wherein the peripheral seals are coextrusions which include an outwardly extending flexible portion and a more firm support portion.

85. An office space dividing system comprising rectangular frames, with each frame having vertical stiles and horizontal rails, including a top rail above door or entryway height, characterized by:
- a spanning top rail aligned with the top rail of at least one of the rectangular frames,
- a cornice mounted on the top rail of said at least one frame,
- and a spanning cornice on said spanning top rail which uniformly continue the cornice associated with the at least one frame,
- said spanning cornice being adjustable in length, having first and second spaced cornice sections, a center piece which telescopically engages the first and second spaced cornice sections, and at least one cornice fill section disposed between the first and second spaced cornice sections, about the center piece,
- said spanning top rail being a tubular member having first and second ends respectively connected to a vertical stile of the at least one rectangular frame via a bracket having upper and lower outwardly extending legs, with the upper leg fixedly supporting the bight of a U-shaped support member having leg portions which extend into and are fixed to the tubular spanning top rail, and with the lower leg aiding in the support of the spanning top rail.

86. The office space dividing system of claim 85 including a plurality of uniformly spaced cornice fill sections disposed between the first and second spaced cornice sections, about the center piece.

87. An office space dividing system comprising rigidly interconnected rectangular frames each having first and second stiles and interconnected rails, including a top rail above door or entryway height, characterized by:
- a four-side column at the end of each frame cooperatively constructed of four mating members, at least one of which is fixed to a frame, with each of said four mating members having first and second wall members having planes disposed at right angles to one another, with the first wall member of one mating member abutting with the second wall member of another mating member,
- means for rigidly holding the four mating members together,
- said first wall member of each of said four mating members including a circular edge curl which projects beyond a face of the frame,
- an upwardly open, outwardly flared cornice on the top rail of at least certain of the frames,
- and ambient lighting fixtures in said cornice on the top rail of at least certain of the frames.

88. The office space dividing system in claim 87 including a central upstanding septum in the cornice.

89. The office space dividing system of claim 88 wherein the lighting fixtures are disposed on opposite sides of the septum.

90. The office space dividing system of claim 88 including a clerestory extension supported by and rising upwardly from the septum.

91. The office space dividing system of claim 87 including means interconnecting adjacent frames which define columns having vertically extending wire passages therein, and including electrical wiring in the cornice which extends into the wiring passages of the columns.

92. The office space dividing system of claim 87 including means interconnecting adjacent frames which define columns having vertically extending wire passages therein, and including an upstanding enclosed wire way supported by at least one of said columns adapted to pass wiring from a point above the upstanding wire way to a wire passage in the at least one column.

* * * * *